US012560814B2

(12) United States Patent　　(10) Patent No.:　US 12,560,814 B2
Gelman et al.　　　　　　　　　(45) Date of Patent:　　Feb. 24, 2026

(54) HOLOGRAPHIC DISPLAY

(71) Applicant: Real View Imaging Ltd., Yokneam (IL)

(72) Inventors: Shaul Alexander Gelman, Raanana (IL); Carmel Rotschild, Ganei-Tikva (IL); Shlomo Alon-Braitbart, Haifa (IL); Aviad Kaufman, Zikhron-Yaakov (IL)

(73) Assignee: Real View Imaging Ltd., Yokneam (IL)

( * ) Notice: Subject to any disclaimer, the term of this patent is extended or adjusted under 35 U.S.C. 154(b) by 0 days.

(21) Appl. No.: 17/589,940

(22) Filed: Feb. 1, 2022

(65) Prior Publication Data

US 2022/0155601 A1　　May 19, 2022

Related U.S. Application Data

(62) Division of application No. 16/078,653, filed as application No. PCT/IL2017/050226 on Feb. 22, 2017, now abandoned.

(Continued)

(51) Int. Cl.
*G03H 1/08*　　　(2006.01)
*G02B 27/00*　　　(2006.01)
(Continued)

(52) U.S. Cl.
CPC ..... *G02B 27/0172* (2013.01); *G02B 27/0093* (2013.01); *G02B 27/0103* (2013.01);
(Continued)

(58) Field of Classification Search
CPC ............ G02B 27/0103; G02B 27/0172; G02B 2027/074; G02B 2027/0178;
(Continued)

(56) References Cited

U.S. PATENT DOCUMENTS 3,800,298 A　　3/1974　Ogura et al.
4,978,952 A　　12/1990　Irwin
(Continued)

FOREIGN PATENT DOCUMENTS

GB　　　2472773　　　3/2011
GB　　　2507462　　　5/2014
(Continued)

OTHER PUBLICATIONS

Office Action Dated May 30, 2022 From the Israel Patent Office Re. Application No. 268831. (4 Pages).
(Continued)

*Primary Examiner* — Audrey Y Chang

(57)　　　　　　ABSTRACT

A method of displaying a Computer Generated Holographic (CGH) image by a display, including setting pixel values of a Spatial Light Modulator (SLM) included in a Head Mounted Display (HMD), producing a interference based holographic image at a first location by projecting coherent light onto the SLM, and re-imaging the holographic image from the first location to form a holographic image in front of an eye of a viewer wearing the HMD. Related apparatus and methods are also described.

18 Claims, 42 Drawing Sheets

Related U.S. Application Data

(60) Provisional application No. 62/410,494, filed on Oct. 20, 2016, provisional application No. 62/298,070, filed on Feb. 22, 2016, provisional application No. 62/298,036, filed on Feb. 22, 2016.

(51) Int. Cl.

| | | |
|---|---|---|
| *G02B 27/01* | (2006.01) | |
| *G03H 1/22* | (2006.01) | |
| *G06F 3/01* | (2006.01) | |
| *G06T 15/00* | (2011.01) | |

(52) U.S. Cl.

CPC ....... *G02B 27/0179* (2013.01); *G03H 1/2205* (2013.01); *G03H 1/2249* (2013.01); *G03H 1/2294* (2013.01); *G06F 3/013* (2013.01); *G06T 15/005* (2013.01); *G02B 2027/0134* (2013.01); *G02B 2027/0138* (2013.01); *G02B 2027/014* (2013.01); *G02B 2027/0174* (2013.01); *G02B 2027/0178* (2013.01); *G02B 2027/0187* (2013.01); *G03H 2001/2236* (2013.01); *G03H 2001/2284* (2013.01); *G03H 2223/12* (2013.01); *G03H 2223/18* (2013.01); *G03H 2223/24* (2013.01); *G03H 2226/05* (2013.01); *G03H 2227/02* (2013.01); *G03H 2270/55* (2013.01); *G06T 2200/04* (2013.01)

(58) Field of Classification Search

CPC ......... G02B 2027/0187; G03H 1/2294; G03H 1/2205; G03H 2001/2284; G03H 2223/12; G03H 2223/18; G03H 2223/24

USPC .............................................. 359/32, 23, 15

See application file for complete search history.

(56) References Cited

U.S. PATENT DOCUMENTS

| | | | |
|---|---|---|---|
| 5,334,991 A | 8/1994 | Wells et al. | |
| 5,369,511 A | 11/1994 | Amos | |
| 5,673,146 A | 9/1997 | Kelly | |
| 5,844,709 A | 12/1998 | Rabinovich et al. | |
| 5,883,743 A | 3/1999 | Sloan | |
| 6,101,007 A | 8/2000 | Yamasaki et al. | |
| 6,876,878 B2 | 4/2005 | Zhdanov | |
| 6,906,836 B2 | 6/2005 | Parker et al. | |
| 7,259,898 B2 | 8/2007 | Khazova et al. | |
| 7,522,344 B1 | 4/2009 | Curatu et al. | |
| 7,639,208 B1 | 12/2009 | Ha et al. | |
| 7,675,684 B1 | 3/2010 | Weissman et al. | |
| 8,159,733 B2 | 4/2012 | Christmas et al. | |
| 8,213,064 B2 | 7/2012 | Yona et al. | |
| 8,243,133 B1 | 8/2012 | Northcott et al. | |
| 8,500,284 B2 * | 8/2013 | Rotschild .............. | G06F 3/0346 |
| | | | 353/7 |
| 8,570,656 B1 | 10/2013 | Weissman | |
| 8,576,276 B2 | 11/2013 | Bar-Zeev et al. | |
| 8,976,170 B2 | 3/2015 | Lee et al. | |
| 8,982,471 B1 | 3/2015 | Starner et al. | |
| 9,164,588 B1 | 10/2015 | Johnson et al. | |
| 9,223,152 B1 * | 12/2015 | Kress ........................ | G01J 1/32 |
| 9,225,969 B2 | 12/2015 | Aguirre-Valencia | |
| 10,656,720 B1 | 5/2020 | Holz | |
| 2003/0197933 A1 | 10/2003 | Sudo et al. | |
| 2004/0047013 A1 | 3/2004 | Cai et al. | |
| 2004/0066547 A1 | 4/2004 | Parker et al. | |
| 2004/0150888 A1 | 8/2004 | Domjan et al. | |
| 2004/0174605 A1 | 9/2004 | Olsson | |
| 2005/0013005 A1 | 1/2005 | Rogers | |
| 2006/0176242 A1 | 8/2006 | Jaramaz et al. | |
| 2007/0177275 A1 | 8/2007 | McGuire, Jr. | |
| 2007/0258624 A1 | 11/2007 | Mochida | |
| 2007/0273798 A1 * | 11/2007 | Silverstein ............. | H04N 9/315 |
| | | | 348/752 |

| | | | |
|---|---|---|---|
| 2008/0013793 A1 | 1/2008 | Hillis et al. | |
| 2008/0174659 A1 | 7/2008 | McDowall | |
| 2009/0002787 A1 | 1/2009 | Cable et al. | |
| 2009/0164930 A1 | 6/2009 | Chen et al. | |
| 2009/0237759 A1 | 9/2009 | Maschke | |
| 2009/0238060 A1 | 9/2009 | Yasuda et al. | |
| 2010/0067077 A1 * | 3/2010 | Kroll ................... | G03H 1/2294 |
| | | | 359/22 |
| 2010/0110368 A1 | 5/2010 | Chaum | |
| 2010/0110386 A1 | 5/2010 | Handschy et al. | |
| 2010/0133424 A1 | 6/2010 | Lindsay | |
| 2010/0238270 A1 | 9/2010 | Bjelkhagen et al. | |
| 2011/0128555 A1 | 6/2011 | Rotschild et al. | |
| 2011/0157667 A1 * | 6/2011 | Lacoste ............... | G03H 1/0808 |
| | | | 359/9 |
| 2012/0052946 A1 | 3/2012 | Yun | |
| 2012/0068913 A1 * | 3/2012 | Bar-Zeev ............... | G09G 3/001 |
| | | | 345/8 |
| 2012/0139817 A1 | 6/2012 | Freeman | |
| 2012/0140038 A1 | 6/2012 | Bi et al. | |
| 2012/0188619 A1 | 7/2012 | Song et al. | |
| 2012/0224062 A1 | 9/2012 | Saeedi et al. | |
| 2013/0016413 A1 | 1/2013 | Perez et al. | |
| 2013/0137076 A1 | 5/2013 | Perez et al. | |
| 2013/0222384 A1 | 8/2013 | Futterer | |
| 2013/0265622 A1 | 10/2013 | Christmas et al. | |
| 2013/0300728 A1 | 11/2013 | Reichow et al. | |
| 2013/0326364 A1 | 12/2013 | Latta et al. | |
| 2014/0002367 A1 | 1/2014 | Glückstad et al. | |
| 2014/0002444 A1 | 1/2014 | Bennett | |
| 2014/0033052 A1 | 1/2014 | Kaufman et al. | |
| 2014/0146394 A1 | 5/2014 | Tout et al. | |
| 2014/0160543 A1 | 6/2014 | Putilin et al. | |
| 2014/0372944 A1 | 12/2014 | Mulcahy et al. | |
| 2015/0016777 A1 | 1/2015 | Abovitz et al. | |
| 2015/0153572 A1 | 6/2015 | Miao et al. | |
| 2015/0168914 A1 | 6/2015 | Gelman et al. | |
| 2015/0206350 A1 | 7/2015 | Gardes et al. | |
| 2015/0234095 A1 | 8/2015 | Schowengerdt | |
| 2015/0234351 A1 * | 8/2015 | Alon-Braitbart ........ | G03H 1/32 |
| | | | 359/9 |
| 2015/0250450 A1 | 9/2015 | Thomas et al. | |
| 2015/0332508 A1 | 11/2015 | Jovanovic | |
| 2015/0378080 A1 | 12/2015 | Georgiou et al. | |
| 2016/0018639 A1 | 1/2016 | Spitzer et al. | |
| 2016/0026253 A1 | 1/2016 | Bradski et al. | |
| 2016/0033771 A1 | 2/2016 | Tremblay et al. | |
| 2016/0077344 A1 | 3/2016 | Burns | |
| 2016/0143528 A1 | 5/2016 | Wilf et al. | |
| 2016/0147308 A1 | 5/2016 | Gelman et al. | |
| 2016/0148430 A1 | 5/2016 | Lin et al. | |
| 2016/0216515 A1 | 7/2016 | Bouchier et al. | |
| 2016/0223986 A1 | 8/2016 | Archambeau et al. | |
| 2016/0260441 A1 | 9/2016 | Muehlhausen et al. | |
| 2016/0343164 A1 | 11/2016 | Urbach et al. | |
| 2016/0360187 A1 | 12/2016 | Smithwick et al. | |
| 2016/0366399 A1 | 12/2016 | Tempel et al. | |
| 2016/0379606 A1 | 12/2016 | Kollin et al. | |
| 2017/0052373 A1 | 2/2017 | Memmott et al. | |
| 2017/0078651 A1 | 3/2017 | Russell | |
| 2017/0078652 A1 | 3/2017 | Hua et al. | |
| 2017/0082976 A1 | 3/2017 | Schwerdtner | |
| 2017/0123204 A1 * | 5/2017 | Sung ................... | G03H 1/2294 |
| 2017/0185037 A1 | 6/2017 | Al. | |
| 2018/0267323 A1 | 9/2018 | Tsurumi | |
| 2019/0004478 A1 | 1/2019 | Gelman et al. | |
| 2019/0049899 A1 | 2/2019 | Gelman et al. | |
| 2019/0056693 A1 | 2/2019 | Gelman et al. | |
| 2019/0155033 A1 | 5/2019 | Gelman et al. | |
| 2020/0003969 A1 | 1/2020 | Yamashita et al. | |
| 2020/0184865 A1 | 6/2020 | Loevsky et al. | |
| 2020/0201038 A1 | 6/2020 | Gelman et al. | |
| 2020/0409306 A1 | 12/2020 | Gelman et al. | |

FOREIGN PATENT DOCUMENTS

| | | |
|---|---|---|
| WO | WO 2005/045531 | 5/2005 |
| WO | WO 2006/008734 | 1/2006 |

(56)　　　　　　References Cited

FOREIGN PATENT DOCUMENTS

| WO | WO 2009/126264 | 10/2009 |
|----|----------------|---------|
| WO | WO 2009/156752 | 12/2009 |
| WO | WO 2011/018655 | 2/2011 |
| WO | WO 2012/062681 | 5/2012 |
| WO | WO 2012/166593 | 12/2012 |
| WO | WO 2013/112705 | 8/2013 |
| WO | WO 2013/163347 | 10/2013 |
| WO | WO 2014/106823 | 7/2014 |
| WO | WO 2014/155288 | 10/2014 |
| WO | WO 2014/186620 | 11/2014 |
| WO | WO 2015/004670 | 1/2015 |
| WO | WO 2015/164402 | 10/2015 |
| WO | WO 2016/010289 | 1/2016 |
| WO | WO 2016/105281 | 6/2016 |
| WO | WO 2016/105282 | 6/2016 |
| WO | WO 2016/105285 | 6/2016 |
| WO | WO 2016/144459 | 9/2016 |
| WO | WO 2016/156614 | 10/2016 |
| WO | WO 2007/145156 | 8/2017 |
| WO | WO 2017/145154 | 8/2017 |
| WO | WO 2017/145155 | 8/2017 |
| WO | WO 2017/145156 | 8/2017 |
| WO | WO 2017/145158 | 8/2017 |
| WO | WO 2018/154564 | 8/2018 |
| WO | WO 2018/211494 | 11/2018 |

OTHER PUBLICATIONS

Notice of Allowance Dated May 12, 2020 from the US Patent and Trademark Office Re. U.S. Appl. No. 16/078,639. (15 pages).
Notice of Allowance Dated Aug. 24, 2020 from the US Patent and Trademark Office Re. U.S. Appl. No. 16/106,249. (12 pages).
Official Action Dated Mar. 3, 2021 From the US Patent and Trademark Office Re. U.S. Appl. No. 16/487,867. (40 Pages).
Official Action Dated Apr. 16, 2020 from the US Patent and Trademark Office Re. U.S. Appl. No. 16/106,249. (39 pages).
Official Action Dated Feb. 16, 2021 From the US Patent and Trademark Office Re. U.S. Appl. No. 16/078,653. (22 Pages).
Official Action Dated Nov. 2, 2020 from the US Patent and Trademark Office Re. U.S. Appl. No. 16/078,653. (51 pages).
Official Action Dated Dec. 22, 2021 from US Patent and Trademark Office Re. U.S. Appl. No. 16/487,867. (16 pages).
Official Action Dated Jul. 23, 2021 from the US Patent and Trademark Office Re. U.S. Appl. No. 16/078,653. (22 pages).
Official Action Dated Dec. 27, 2019 From the US Patent and Trademark Office Re. U.S. Appl. No. 16/078,638. (32 pages).
Official Action Dated Oct. 28, 2019 From the US Patent and Trademark Office Re. U.S. Appl. No. 16/078,639. (29 Pages).
Restriction Official Action Dated May 18, 2020 from the US Patent and Trademark Office Re. U.S. Appl. No. 16/078,653. (8 pages).
Restriction Official Action Dated Oct. 6, 2020 from the US Patent and Trademark Office Re. U.S. Appl. No. 16/487,867. (6 pages).
Bimber "Holographics Combining Holograms With Interactive Computer Graphics", Retrieved From Holographer.org, 32 P., Apr. 2004.
Bimber "HoloGraphics: Combining Holograms With Interactive Computer Graphics", Retrieved From Holographer.org, p. 1-9, Apr. 2004.
Bimber "Merging Graphics and Holograms", Journal of Holography and Speckle , 3(2): 1-7, Dec. 2006.
Bimber et al. "Interacting With Augmented Holograms", Integrated Optoelectronic Devices, 2005: 41-54, Apr. 21, 2005.
Duchowski et al. "Measuring Gaze Depth With an Eye Tracker During Stereoscopic Display", Proceeding of the ACM SIGGRAPH Symposium on Applied Perception in Graphics and Visualization, APGV'11, Toulouse, France, Aug. 27-28, 2011, p. 15-22, Aug. 27, 2011.
Galeotti et al. "In-Situ Visualization of Medical Images Using Holographic Optics", Proceedings of the Augmented Environments for Medical Imaging Including Augmented Reality in Computer- Aided Surgery (AMI ARCS), at Medical Image Computing and Computer-Assisted Intervention (MICCAI), New York City, p. 93-103, Sep. 10, 2008.
Goodman "Computer-Generated Holograms", Introduction to Fourier Optics, 3rd Ed., Chap.9.9: 355-359, 2005.
Jud et al. "Motion Tracking Systems. An Overview of Motion Tracking Methods", Studies on Mechatronics, Swiss Federal Institute of Technology Zurich, Switzerland, ETH, Chap. 1-5: 1-81, Spring 2011.
Liao et al. "3-D Augmented Reality for MRI-Guided Surgery Using Integral Videography Autostereoscopic Image Overlay", IEEE Transactions on Biomedical Engineering, XP011343257, 57(6): 1476-1486, Jun. 2010.
Moon et al. "Holographic Head-Mounted Display With RGB Light Emitting Diode Light Source", Optics Express, 22(6): 6526-6534, Published Online Mar. 13, 2014.
Nicolau et al. "An Augmented Reality System for Liver Thermal Ablation: Design and Evaluation on Clinical Cases", Medical Image Analysis, 13(3): 494-506, Available Online Feb. 20, 2009.
Nicolau et al. "Augmented Reality in Laparoscopic Surgical Oncology", Surgical Oncology, 20(3): 189-201, Sep. 2011.
Ych "Optics of Periodic Layered Media: Bragg Reflectors", Optical Waves in Layered Media, Chap.6.3: 128-134, Feb. 2005.
Official Action Dated Sep. 23, 2022 from US Patent and Trademark Office Re. U.S. Appl. No. 16/487,867. (8 pages).
Official Action Dated Feb. 15, 2022 From the US Patent and Trademark Office Re. U.S. Appl. No. 17/015,126. (40 Pages).
Restriction Official Action Dated Mar. 4, 2022 From the US Patent and Trademark Office Re. U.S. Appl. No. 16/613,442. (7 Pages).
Advisory Action Dated Aug. 23, 2022 From the US Patent and Trademark Office Re. U.S. Appl. No. 16/487,867. (3 Pages).
Notice of Allowance Dated Sep. 6, 2022 from US Patent and Trademark Office Re. U.S. Appl. No. 17/023,443. (16 pages).
Official Action Dated Mar. 16, 2022 from US Patent and Trademark Office Re. U.S. Appl. No. 17/023,443. (52 pages).
Final Official Action Dated May 9, 2022 from US Patent and Trademark Office Re. U.S. Appl. No. 16/487,867. (20 pages).
Official Action Dated Sep. 29, 2022 from US Patent and Trademark Office Re. U.S. Appl. No. 17/015,126. (27 pages).
Communication Pursuant to Article 94(3) EPC Dated Feb. 8, 2021 From the European Patent Office Re. Application No. 17714566.1. (6 Pages).
Communication Pursuant to Article 94(3) EPC Dated Jul. 19, 2019 From the European Patent Office Re. Application No. 17714566.1. (5 Pages).
Communication Pursuant to Article 94(3) EPC Dated Mar. 25, 2021 From the European Patent Office Re. Application No. 17712554.9. (5 Pages).
Communication Pursuant to Article 94(3) EPC Dated Mar. 27, 2020 From the European Patent Office Re. Application No. 17714566.1. (5 Pages).
Communication Pursuant to Article 94(3) EPC Dated Apr. 28, 2020 From the European Patent Office Re. Application No. 17712554.9. (5 Pages).
Communication Pursuant to Article 94(3) EPC Dated Jul. 30, 2019 From the European Patent Office Re. Application No. 17712554.9. (5 Pages).
Communication Relating to the Results of the Partial International Search and Provisional Opinion Dated May 8, 2017 From the International Searching Authority Re. Application No. PCT/IL2017/050226. (16 Pages).
Communication Relating to the Results of the Partial International Search and the Provisional Opinion Dated May 15, 2017 From the International Searching Authority Re. Application No. PCT/IL2017/050228. (14 Pages).
Final Official Action Dated Aug. 3, 2021 from the US Patent and Trademark Office Re. U.S. Appl. No. 16/487,867. (18 pages).
International Preliminary Report on Patentability Dated Sep. 6, 2019 From the International Bureau of WIPO Re. Application No. PCT/IL2018/050186. (11 Pages).
International Preliminary Report on Patentability Dated Sep. 7, 2018 From the International Bureau of WIPO Re. Application No. IL2017/050228. (11 Pages).

(56) References Cited

OTHER PUBLICATIONS

International Preliminary Report on Patentability Dated Sep. 7, 2018 From the International Bureau of WIPO Re. Application No. PCT/IL2017/050225. (10 Pages).

International Preliminary Report on Patentability Dated Sep. 7, 2018 From the International Bureau of WIPO Re. Application No. PCT/IL2017/050226. (14 Pages).

International Preliminary Report on Patentability Dated Nov. 28, 2019 From the International Bureau of WIPO Re. Application No. PCT/IL2018/050509. (16 Pages).

International Search Report and the Written Opinion Dated May 4, 2017 From the International Searching Authority Re. Application No. PCT/IL2017/050225. (16 Pages).

International Search Report and the Written Opinion Dated Sep. 7, 2017 From the International Searching Authority Rc. Application No. PCT/IL2017/050226. (21 Pages).

International Search Report and the Written Opinion Dated Jul. 9, 2018 From the International Searching Authority Re. Application No. PCT/IL2018/050186. (19 Pages).

International Search Report and the Written Opinion Dated Aug. 10, 2017 From the International Searching Authority Re. Application No. IL2017/050228. (17 Pages).

International Search Report and the Written Opinion Dated Sep. 25, 2018 From the International Searching Authority Re. Application No. PCT/IL2018/050509. (24 Pages).

International Search Report and the Written Opinion Dated Apr. 26, 2017 From the International Searching Authority Re. Application No. PCT/IL2017/050224. (14 Pages).

International Search Report and the Written Opinion Dated Jun. 29, 2017 From the International Searching Authority Re. Application No. PCT/IL2017/050226. (20 Pages).

Interview Summary Dated Oct. 22, 2021 From the US Patent and Trademark Officc Rc. U.S. Appl. No. 16/487,867. (2 Pages).

Interview Summary Dated Mar. 23, 2020 from the US Patent and Trademark Office Re. U.S. Appl. No. 16/078,638. (3 pages).

Interview Summary Dated Oct. 5, 2020 from the US Patent and Trademark Office Re. U.S. Appl. No. 16/078,638. (3 pages).

Notice of Allowance Dated Jun. 1, 2020 from the US Patent and Trademark Office Re. U.S. Appl. No. 16/078,638. (6 pages).

Official Action Dated Jul. 14, 2022 from US Patent and Trademark Office Re. U.S. Appl. No. 16/613,442. (56 pages).

* cited by examiner

102

105

102

105

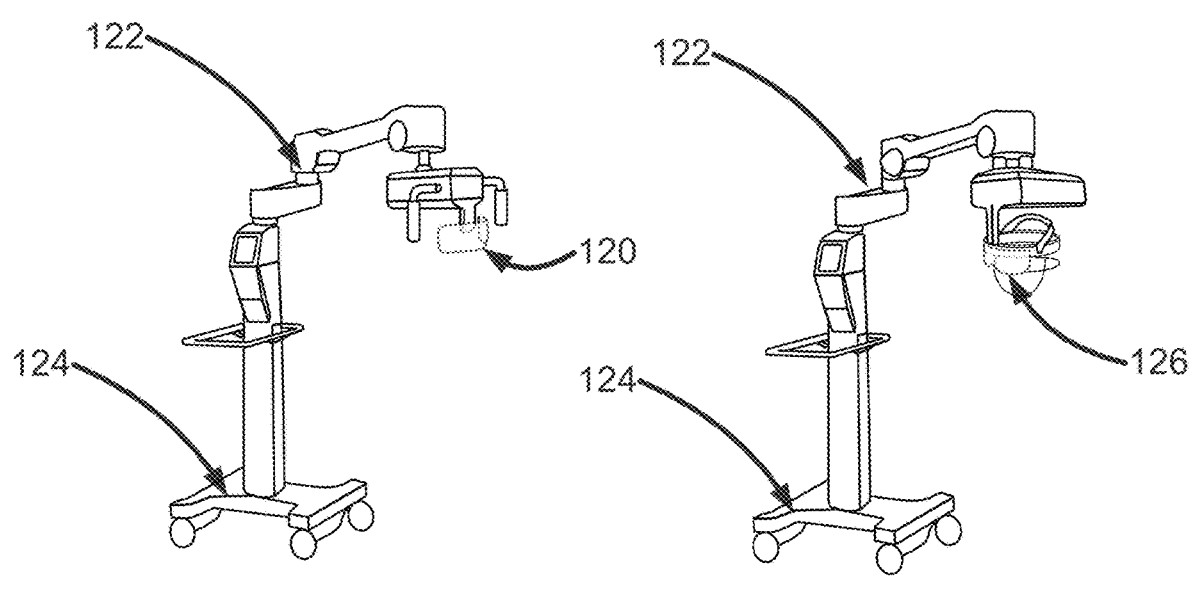
FIGURE 1C          FIGURE 1D
FIGURE 1E
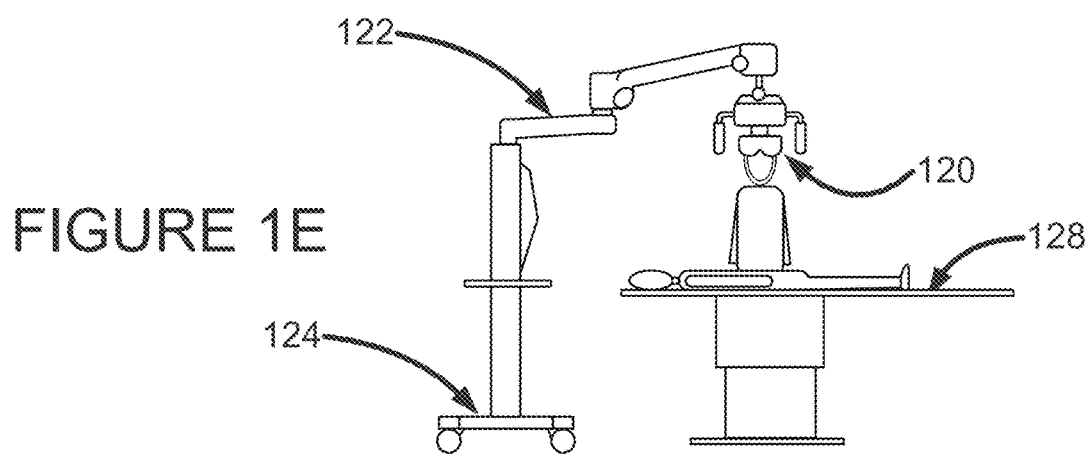
FIGURE 1F
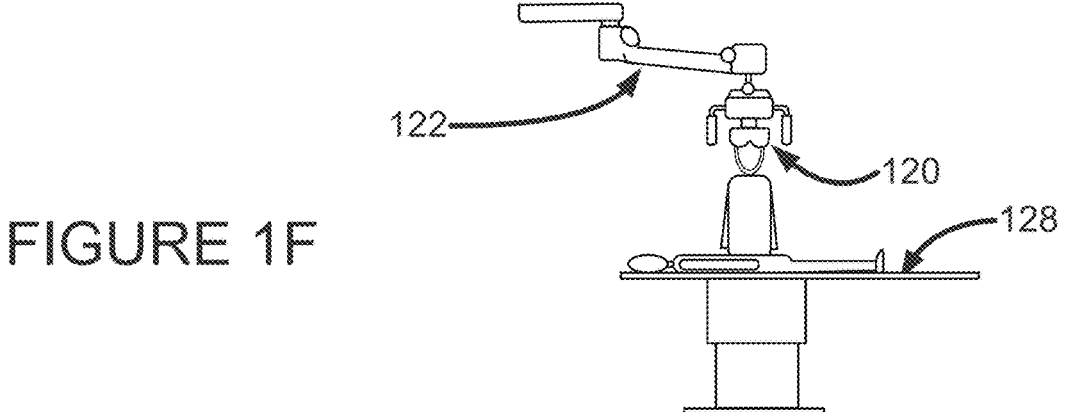

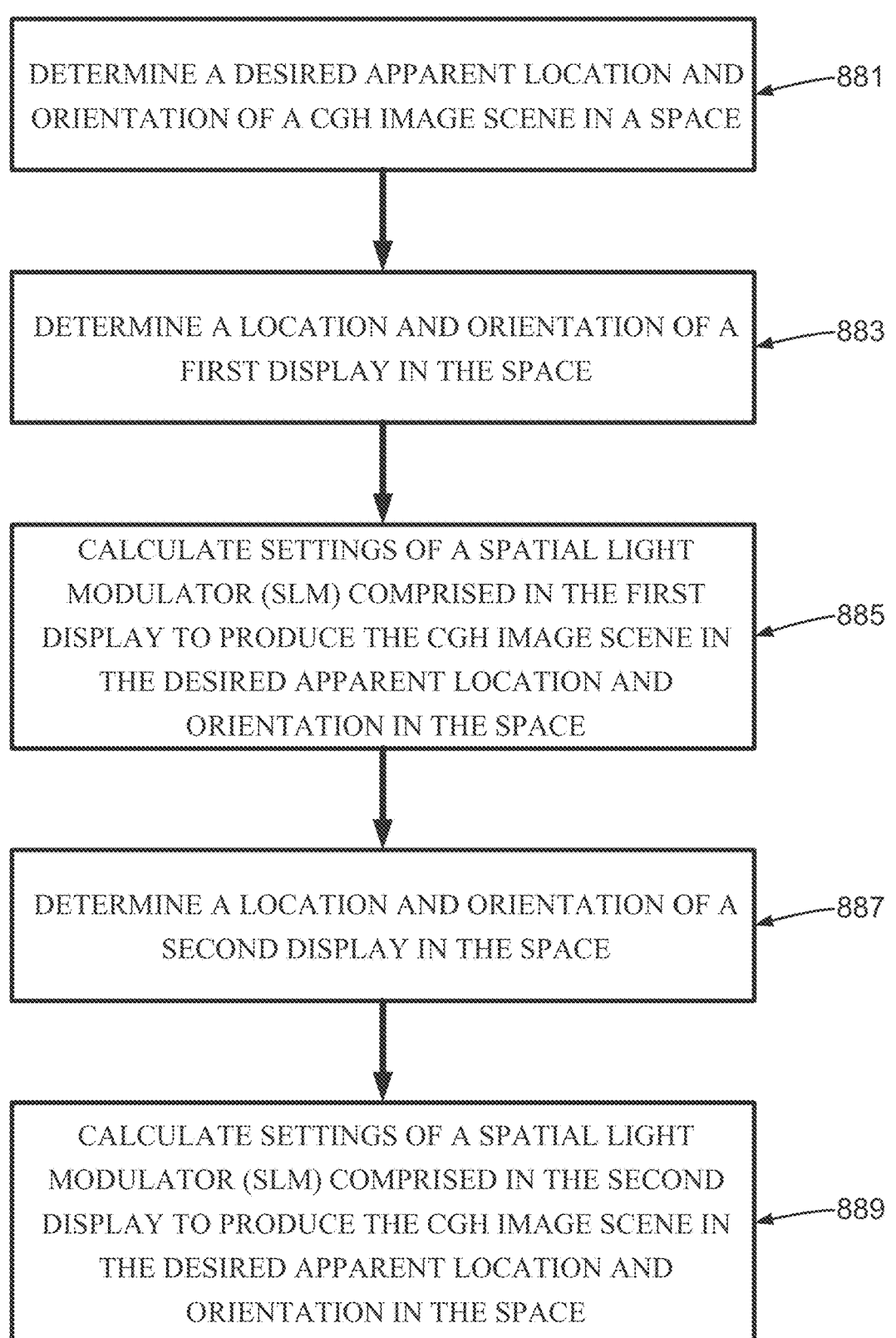

DETERMINE A DESIRED APPARENT LOCATION AND ORIENTATION OF A CGH IMAGE SCENE IN A SPACE — 881

DETERMINE A LOCATION AND ORIENTATION OF A FIRST DISPLAY IN THE SPACE — 883

CALCULATE SETTINGS OF A SPATIAL LIGHT MODULATOR (SLM) COMPRISED IN THE FIRST DISPLAY TO PRODUCE THE CGH IMAGE SCENE IN THE DESIRED APPARENT LOCATION AND ORIENTATION IN THE SPACE — 885

DETERMINE A LOCATION AND ORIENTATION OF A SECOND DISPLAY IN THE SPACE — 887

CALCULATE SETTINGS OF A SPATIAL LIGHT MODULATOR (SLM) COMPRISED IN THE SECOND DISPLAY TO PRODUCE THE CGH IMAGE SCENE IN THE DESIRED APPARENT LOCATION AND ORIENTATION IN THE SPACE — 889

FIGURE 8B

SET VALUES OF PIXELS OF A SPATIAL LIGHT MODULATOR INCLUDED IN A HEAD MOUNTED DISPLAY — 1102

PRODUCE A HOLOGRAPHIC IMAGE BY INTERACTION OF LIGHT WITH THE PIXELS AT A FIRST LOCATION — 1104

RE-IMAGE THE HOLOGRAPHIC IMAGE FROM THE FIRST LOCATION TO FORM A HOLOGRAPHIC IMAGE IN FRONT OF AN EYE OF A VIEWER WEARING THE HEAD MOUNTED DISPLAY — 1106

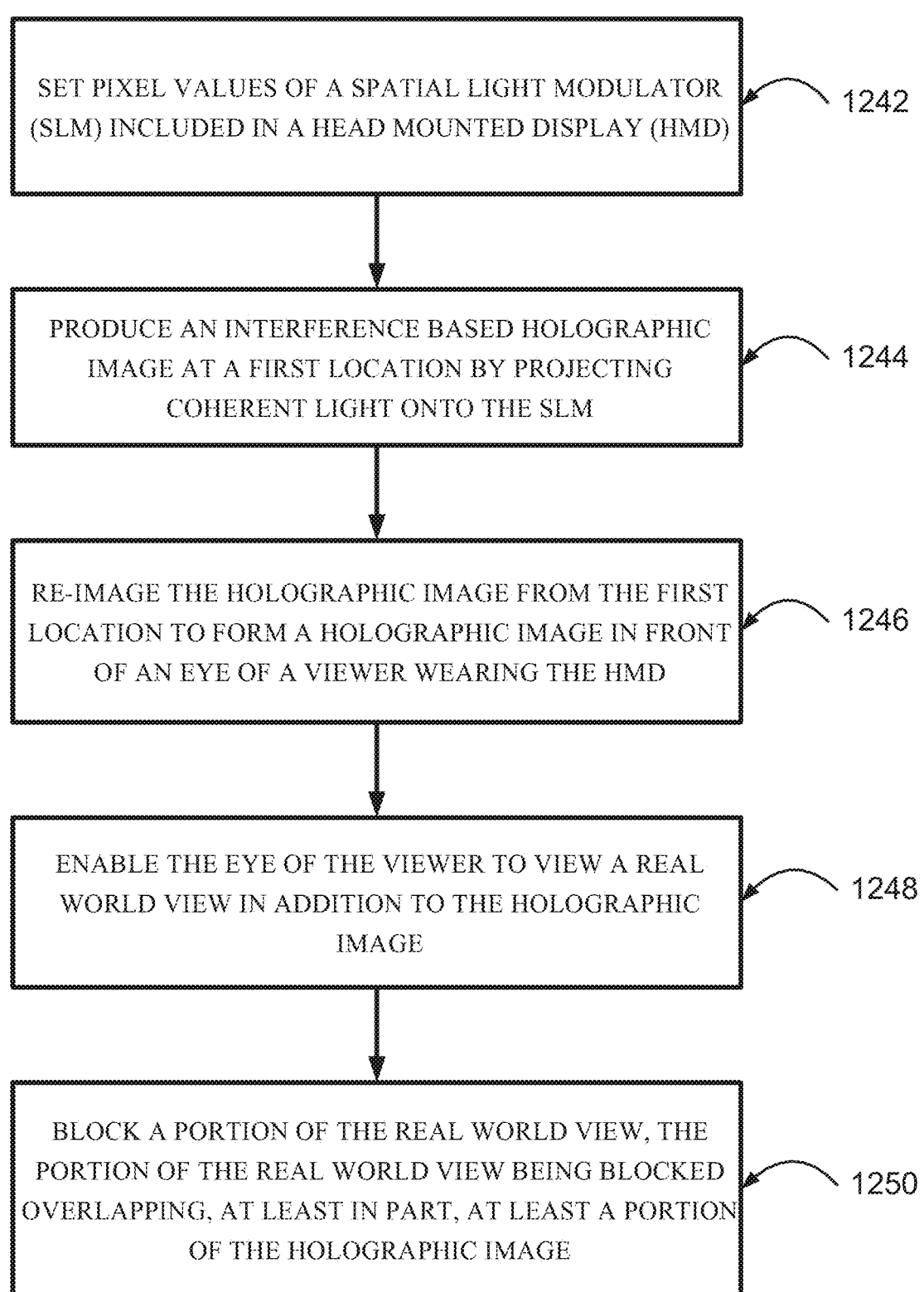

SET PIXEL VALUES OF A SPATIAL LIGHT MODULATOR (SLM) INCLUDED IN A HEAD MOUNTED DISPLAY (HMD) — 1242

PRODUCE AN INTERFERENCE BASED HOLOGRAPHIC IMAGE AT A FIRST LOCATION BY PROJECTING COHERENT LIGHT ONTO THE SLM — 1244

RE-IMAGE THE HOLOGRAPHIC IMAGE FROM THE FIRST LOCATION TO FORM A HOLOGRAPHIC IMAGE IN FRONT OF AN EYE OF A VIEWER WEARING THE HMD — 1246

ENABLE THE EYE OF THE VIEWER TO VIEW A REAL WORLD VIEW IN ADDITION TO THE HOLOGRAPHIC IMAGE — 1248

BLOCK A PORTION OF THE REAL WORLD VIEW, THE PORTION OF THE REAL WORLD VIEW BEING BLOCKED OVERLAPPING, AT LEAST IN PART, AT LEAST A PORTION OF THE HOLOGRAPHIC IMAGE — 1250

FIGURE 12D

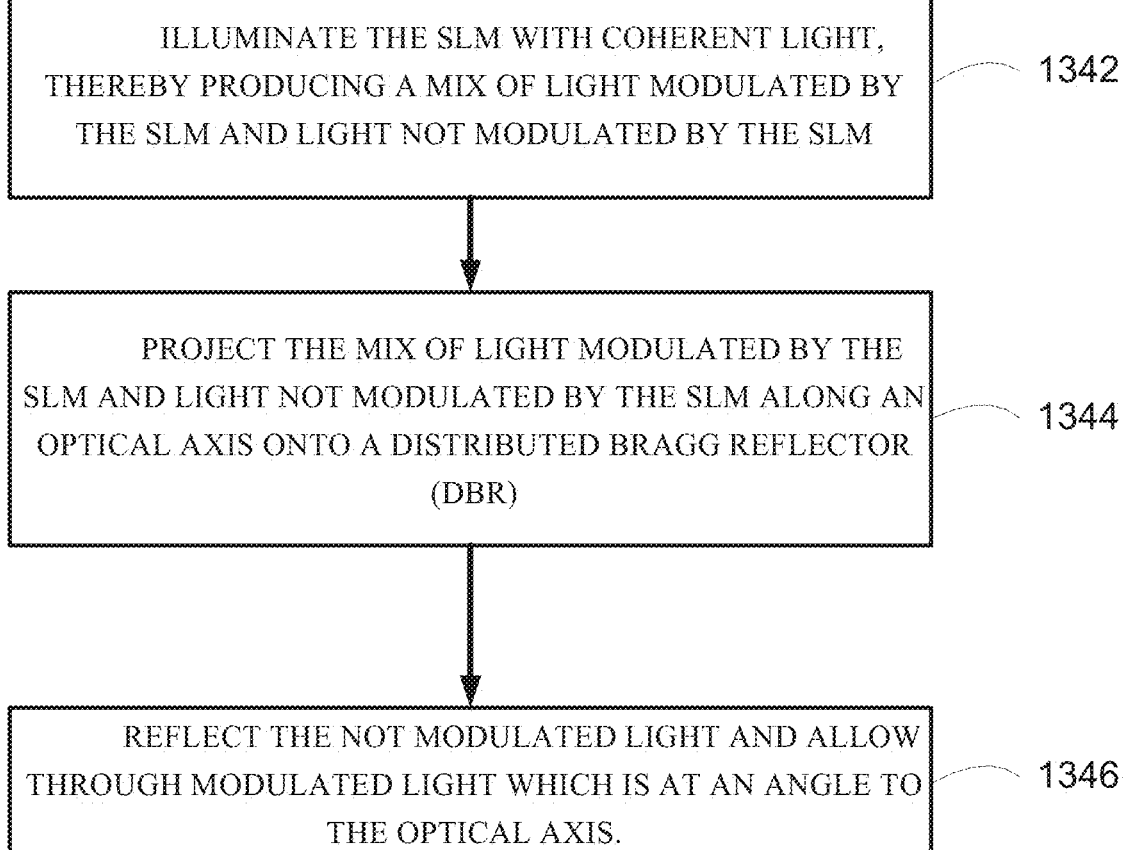

ILLUMINATE THE SLM WITH COHERENT LIGHT, THEREBY PRODUCING A MIX OF LIGHT MODULATED BY THE SLM AND LIGHT NOT MODULATED BY THE SLM — 1342

PROJECT THE MIX OF LIGHT MODULATED BY THE SLM AND LIGHT NOT MODULATED BY THE SLM ALONG AN OPTICAL AXIS ONTO A DISTRIBUTED BRAGG REFLECTOR (DBR) — 1344

REFLECT THE NOT MODULATED LIGHT AND ALLOW THROUGH MODULATED LIGHT WHICH IS AT AN ANGLE TO THE OPTICAL AXIS. — 1346

FIGURE 13C

ILLUMINATE A SLM WITH COHERENT LIGHT, THEREBY PRODUCING MODULATED LIGHT — 1425

PASS THE MODULATED LIGHT THROUGH AN APODIZATION FILTER, PRODUCING APODIZED MODULATED LIGHT — 1427

USE THE APODIZED MODULATED LIGHT TO PRODUCE A HOLOGRAPHIC IMAGE — 1429

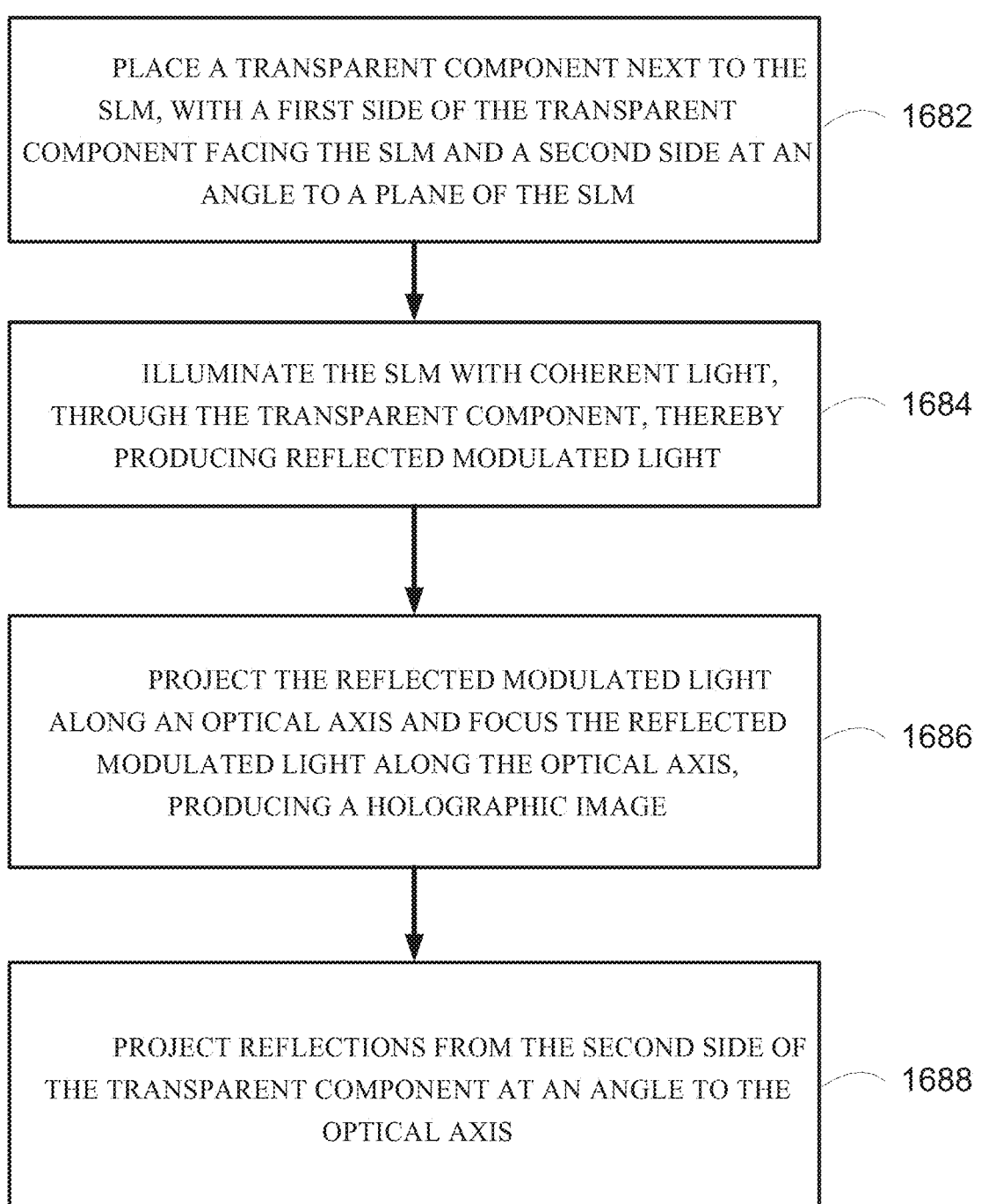

PLACE A TRANSPARENT COMPONENT NEXT TO THE SLM, WITH A FIRST SIDE OF THE TRANSPARENT COMPONENT FACING THE SLM AND A SECOND SIDE AT AN ANGLE TO A PLANE OF THE SLM — 1682

ILLUMINATE THE SLM WITH COHERENT LIGHT, THROUGH THE TRANSPARENT COMPONENT, THEREBY PRODUCING REFLECTED MODULATED LIGHT — 1684

PROJECT THE REFLECTED MODULATED LIGHT ALONG AN OPTICAL AXIS AND FOCUS THE REFLECTED MODULATED LIGHT ALONG THE OPTICAL AXIS, PRODUCING A HOLOGRAPHIC IMAGE — 1686

PROJECT REFLECTIONS FROM THE SECOND SIDE OF THE TRANSPARENT COMPONENT AT AN ANGLE TO THE OPTICAL AXIS — 1688

FIGURE 16B

DISPLAY A FIRST HOLOGRAPHIC IMAGE AT A CENTER OF A DISPLAYED SCENE — 2002

DISPLAY A FIRST ADDITIONAL IMAGE PERIPHERAL TO THE FIRST HOLOGRAPHIC IMAGE — 2004

HOLOGRAPHIC DISPLAY

RELATED APPLICATIONS

This application is a division of U.S. patent application Ser. No. 16/078,653 filed on Aug. 22, 2018, which is a National Phase of PCT Patent Application No. PCT/IL2017/050226 having International Filing Date of Feb. 22, 2017, which claims the benefit of priority under 35 USC § 119(e) of U.S. Provisional Patent Application Nos. 62/410,494 filed on Oct. 20, 2016, 62/298,070 filed on Feb. 22, 2016 and 62/298,036 filed on Feb. 22, 2016. The contents of the above applications are all incorporated by reference as if fully set forth herein in their entirety.

FIELD AND BACKGROUND OF THE INVENTION

The present invention, in some embodiments thereof, relates to a display for projecting a Computer Generated Hologram (CGH) image to a viewer via an optical element close to the viewer's eye or eyes, such that the CGH image appears to the viewer as beyond the optical element, and more specifically, in some embodiments the optical element may be at least semi-transparent, so that the viewer may see the real world simultaneously with seeing the CGH image.

The present invention, in some embodiments thereof, relates to a Head Mounted Display (HMD), and to methods of using one or more head mounted displays to display holograms.

Glasses displaying augmented reality are being developed for use in various applications, including gaming, social platform, CAD, art, medicine and more. Technology for such augmented reality devices is presently based on displaying three-dimensional images by binocular disparity with a fixed focal plane usually at infinity. However, binocular disparity is unsuitable for displaying images at close range to a viewer, such as less than 2 meters, where variations in focal planes/depth resolution are easily recognized by the viewer and will result in poor usability and difficulties in interaction with multiple focal planes of a projected image. In contrast, display of a holographic image at close range, such as a hand's reach, possesses all the depth cues of human vision perception and offers a "real" visual experience. Furthermore, such an image, floating in the air at touching distance, such that a viewer can reach with a hand or tool into an image enable a natural interaction of the user with the image, supporting interactions similar to interactions with real objects in real life.

Additional background art includes:

PCT Patent Application Publication number WO 2015/004670 of Gelman et al.

PCT Patent Application Publication number WO 2014/020603 of Gelman et al.

U.S. Pat. No. 8,500,284 to Rotschild et al.

U.S. Patent Application Publication Number 2014/0033052 of Kaufman et al.

U.S. Patent Application Publication 2013/0326364 of Latta et al.

An article titled "Motion Tracking Systems, An overview of motion tracking methods, Spring Term 2011" published by the Autonomous Systems Lab of the Swiss Federal Institute Of Technology, Zurich.

An article titled "Measuring Gaze Depth with an Eye Tracker During Stereoscopic Display" by Andrew T. Duchowski, Brandon Pelfrey, Donald H. House, and Rui Wang.

The disclosures of all references mentioned above and throughout the present specification, as well as the disclosures of all references mentioned in those references, are hereby incorporated herein by reference.

SUMMARY OF THE INVENTION

The present invention, in some embodiments thereof, relates to a display for projecting a Computer Generated Hologram (CGH) image to a viewer via an optical element close to the viewer's eye or eyes, such that the CGH image appears to the viewer as beyond the optical element, and more specifically, in some embodiments the optical element may be at least semi-transparent, so that the viewer may see the real world simultaneously with seeing the CGH image.

The present invention, in some embodiments thereof, relates to a Head Mounted Display (HMD), and to methods of using one or more head mounted displays to display holograms to one or more viewers.

In some embodiments, the present invention may include a display on an adjustable arm such that a viewer may pull the display to be in front of the viewer's eyes to view the CGH image.

The term "holographic image" is used in the present specification and claims to mean an "interference based holographic image".

It is specifically noted that the terms "real image" and "virtual image" are used herein as "holographic real image" and "holographic virtual image" respectively, and as "CGH real image" and "CGH virtual image" respectively and have the same meaning as commonly understood by one of ordinary skill in the art to which the invention pertains.

According to an aspect of some embodiments of the present invention there is provided a method of displaying a Computer Generated Holographic (CGH) image by a display, including setting pixel values of a Spatial Light Modulator (SLM) included in a Head Mounted Display (HMD), producing a holographic image at a first location by projecting coherent light onto the SLM, and re-imaging the holographic image from the first location to form a holographic image in front of an eye of a viewer wearing the HMD.

According to some embodiments of the invention, the re-imaging the holographic image from the first location to form a holographic image includes re-imaging the holographic image from the first location to form a holographic virtual image.

According to some embodiments of the invention, further including imaging the SLM to a vicinity of the eye of the viewer.

According to some embodiments of the invention, the imaging the SLM to the vicinity of the eye of the viewer includes imaging the SLM to a location of a first image of the SLM, and re-imaging the image of the SLM from the location of the first image of the SLM to a location at the vicinity of the eye of the viewer.

According to some embodiments of the invention, the re-imaging the image of the SLM from the location of the first image of the SLM to the location at the vicinity of the eye of the viewer includes adjusting a tilt of a mirror at the first location of the holographic image.

According to some embodiments of the invention, a field of view of the CGH image is enlarged by projecting different parts of the field of view at different times.

According to some embodiments of the invention, further including jittering a location of imaging the image of the SLM in a direction across the viewer's eye.

According to some embodiments of the invention, when the location of imaging the image of the SLM is jittered across the viewer's eye, the setting pixel values of the SLM is updated to compensate for the jittering.

According to some embodiments of the invention, further including adjusting a distance at which the image of the SLM is focused around the vicinity of the viewer's pupil.

According to some embodiments of the invention, the SLM is attached to a controllable tilt mechanism.

According to some embodiments of the invention, a real image of the SLM is imaged on an optical component selected from a group consisting of a controllable tilting mirror, a controllable tilting partially transmitting mirror, a controllable tilting partially reflecting partially transmitting mirror, a controllable tilting prism, a controllable image redirection element, and a controllable beam deflector.

According to some embodiments of the invention, the re-imaging the holographic image from the first location to form a holographic image in front of the eye of the viewer includes forming the holographic image at an arm's length in front of the viewer.

According to some embodiments of the invention, further including using a sensor mounted on the display and arranged to read a location of an object inserted into a same space as the holographic virtual image displayed in front of the eye of the viewer.

According to some embodiments of the invention, the sensor reads the location of the object based, at least in part, on detecting one or more markings on the object.

According to some embodiments of the invention, the sensor reads the location of the object based, at least in part, on identifying a location of a feature in the object. According to some embodiments of the invention, the feature is at least one of as edge of the object, a three dimensional feature in the object, a specific color in the object, or a specific texture in the object.

According to some embodiments of the invention, projecting a holographic image onto a first location includes imaging a real image of the holographic image on an optical component selected from a group consisting of a controllable tilting mirror, a controllable tilting prism, a controllable image redirection element, and a controllable beam deflector.

According to some embodiments of the invention, further including tracking a direction in which the HMD is pointing, when a change in the direction the HMD is pointing is detected, adjusting the re-imaging the holographic image from the first location toward an eye of a viewer so as to make the holographic image appear at a same location as prior to the change.

According to some embodiments of the invention, the adjusting the re-imaging the holographic image includes controlling a tilt of a mirror at a location of the SLM.

According to some embodiments of the invention, the adjusting the re-imaging the holographic image includes controlling a tilt of a mirror at a location of a real image of the SLM.

According to some embodiments of the invention, the setting pixel values of the SLM includes setting a first set of pixel values of the SLM for producing a first portion of the holographic image, the producing the holographic image at a first location by projecting coherent light onto the SLM includes projecting the first portion of the holographic image onto the first location, and re-imaging the first portion of the holographic image from the first location to form a first portion of the holographic image at a first location in front of the eye of the viewer, and further including setting second set of pixel values of the SLM for producing a second portion of the holographic image, producing the second portion of the holographic image by projecting coherent light onto the SLM and projecting the second portion of the holographic image onto the first location, and re-imaging the second portion of the holographic image from the first location to form a second portion of the holographic image at a second location in front of the eye of the viewer, the second location in front of the eye of the viewer being adjacent to the first location in front of the eye of the viewer, such that the second portion of the holographic image appears adjacent to the first portion of the holographic image.

According to some embodiments of the invention, the re-imaging of the second portion of the holographic image to form a second portion of the holographic image at a second location in front of the eye of the viewer, the second location in front of the eye of the viewer being adjacent to the first location in front of the eye of the viewer includes controlling an adjustable optical component so as to shift a direction of the re-imaging of the second portion of the holographic image.

According to some embodiments of the invention, the adjustable optical component is at the first location of the holographic image.

According to some embodiments of the invention, the adjustable optical component is optically adjacent to the first location of the holographic image.

According to some embodiments of the invention, the adjustable optical component is at the first image of the SLM location.

According to some embodiments of the invention, the adjustable optical component is optically adjacent to the first image of the SLM.

According to some embodiments of the invention, further including tracking an orientation in space in which the HMD is pointing, when a change in the orientation is detected, setting pixel values of the SLM to make the holographic image appear at a same location as prior to the change.

According to some embodiments of the invention, further including tracking a location of the HMD in space, when a change in the location of the HMD in space is detected, setting pixel values of the SLM to make the holographic image appear at a same location as prior to the change in location.

According to some embodiments of the invention, further including tracking a distance from the HMD to a location in real space where an apparent location of the holographic image is intended to appear, when a change in the distance is detected, setting pixel values of the SLM to produce the holographic image to appear at the changed distance, at the location where the holographic image is intended to appear, and at an apparently unchanged size.

According to some embodiments of the invention, in which the first location of the holographic image corresponds to a location of a direction-adjustable optical element, the re-imaging the holographic image from the first location toward the eye of the viewer includes adjusting a direction of the direction-adjustable optical element to re-image the holographic image from the first location toward the eye of the viewer.

According to some embodiments of the invention, further including tracking a location of a pupil of the eye of the viewer, when a change in location of the pupil is detected, adjusting a location of the imaging an image of the SLM to keep the image of the SLM at a vicinity of the viewer's pupil responsive to the change in location of the pupil.

According to some embodiments of the invention, further including setting pixel values of a second SLM, projecting a second holographic image produced by projecting coherent light onto the second SLM onto a second location, and re-imaging the second holographic image from the second location toward a second eye of the viewer.

According to some embodiments of the invention, further including adjusting re-imaging the holographic image, and adjusting re-imaging the second holographic image, to cause appearance of merging the holographic image and the second holographic image in the viewer's view.

According to some embodiments of the invention, the setting pixel values of the SLM further includes calculating the values of the pixels in a computing unit on-board the HMD.

According to some embodiments of the invention, the setting pixel values of the SLM further includes distributing a calculating of the pixel values between a computer external to the HMD and a computing unit on-board the HMD.

According to some embodiments of the invention, the computer external to the HMD calculates pixel values for a tile smaller than an entire area of the SLM, and the on-board computing unit calculates pixel values of the entire area of the SLM.

According to some embodiments of the invention, further including displaying a holographic image by a plurality of displays, the holographic image being displayed at a same location and same orientation in space for viewers of the plurality of displays.

According to some embodiments of the invention, the displaying a holographic image by a plurality of displays includes the displaying being coordinated by a computer external to the displays.

According to some embodiments of the invention, locations and orientations of the plurality of displays are tracked by the external computer.

According to some embodiments of the invention, the displaying a holographic image by a plurality of displays includes tracking relative locations and orientations of the plurality of displays by a computing unit on-board the displays and by inter-display communication.

According to some embodiments of the invention, the setting pixel values of the SLM included in the display and the producing a holographic image at a first location includes setting pixel values and producing a holographic image including multiple focal planes relative to the viewer's point of view.

According to an aspect of some embodiments of the present invention there is provided a system for displaying a holographic image by a display, the system including a Spatial Light Modulator (SLM), a source of coherent light for projecting onto the SLM for producing a holographic image at a first location, a first optical component at the first location for re-imaging the holographic image from the first location to form a holographic virtual image in front of an eye of a viewer using the display, and a second optical component for imaging an image of the SLM at a vicinity of the eye of the viewer.

According to some embodiments of the invention, further including a second optical component for imaging the image of the SLM at a vicinity of the eye of the viewer.

According to some embodiments of the invention, further including an on-board computing unit for setting values of pixels of the SLM.

According to some embodiments of the invention, further including a direction controller for jittering a direction of imaging the image of the SLM in a direction across the eye of the viewer.

According to some embodiments of the invention, further including a focus controller for jittering a distance at which the image of the SLM is focused around the vicinity of the eye of the viewer.

According to some embodiments of the invention, the producing a holographic image at a first location includes producing a holographic real image, and the re-imaging the holographic image from the first location to form a holographic image in front of the eye of the viewer includes re-imaging the holographic image and producing a holographic virtual image.

According to some embodiments of the invention, further including a direction-tracker for tracking a direction the display is pointing, and a controller for adjusting the re-imaging the holographic image from the first location to form a holographic image in front of the eye of the viewer to make the holographic image appear at a same location responsive to a change in direction detected by the direction-tracker.

According to some embodiments of the invention, further including a controller for setting values of the pixels of the SLM to make the holographic image appear at a same location responsive to a change in direction detected by the direction-tracker.

According to some embodiments of the invention, further including a location-tracker for tracking a change in location of the display, and a controller for setting values of the pixels of the SLM to make the holographic image appear at a same location as prior to the change in location of the display.

According to some embodiments of the invention, the direction controller includes a direction-adjustable optical component selected from a group consisting of a controllable tilting mirror, a controllable tilting prism, a controllable image redirection element.

According to some embodiments of the invention, the direction-adjustable optical component is located at a first location of the holographic image.

According to some embodiments of the invention, the direction-adjustable optical component is located at the image of the SLM.

According to some embodiments of the invention, further including a sensor arranged to read a location of an object inserted into a same space as the holographic virtual image displayed in front of the eye of the viewer.

According to some embodiments of the invention, the sensor arranged to read the location of the object based, at least in part, on detecting one or more markings on the object.

According to some embodiments of the invention, and further including a transparent liquid crystal display between an apparent location of the holographic virtual image and the eye of the viewer, in which the liquid crystal display is configured to block light from a direction of the apparent location of the holographic virtual image to the eye of the viewer, thereby increasing a contrast between the holographic virtual image and a background of the holographic virtual image.

According to some embodiments of the invention, and further including:

a pupil tracker for tracking a location of a pupil of the eye of the viewer;

a controller for adjusting the imaging of the SLM at a vicinity of the eye of the viewer responsive to a change in location of the pupil detected by the pupil tracker.

According to some embodiments of the invention, the first optical component at the first location for re-imaging the holographic image includes a tilt-adjustable component located at the first location, and the controller for adjusting the imaging of the SLM controls the tilt-adjustable component to image the image of the SLM at the viewer's cornea.

According to some embodiments of the invention, further including a second SLM, a second source of coherent light for projecting onto the second SLM for producing a holographic image at a second location, and a second optical component at the second location for re-imaging the holographic image from the second location toward a second eye of the viewer.

According to some embodiments of the invention, further including a second computing unit for setting values of pixels of the second SLM.

According to some embodiments of the invention, the setting values of pixels of the SLM further includes distributing a calculating of the values of the pixels between a computer external to the display and the on-board computing unit.

According to some embodiments of the invention, the computer external to the display is for calculating pixel values for a tile smaller than an entire area of the SLM, and the on-board computing unit is for calculating values of pixels of the entire area of the SLM.

According to some embodiments of the invention, further including displaying a holographic image by a plurality of displays, the holographic image being displayed at a same location and same orientation in space for viewers of the plurality of displays.

According to some embodiments of the invention, the displaying the holographic image by the plurality of displays includes the displaying being coordinated by a computer external to the displays.

According to some embodiments of the invention, locations and orientations of the plurality of displays are tracked by the external computer.

According to some embodiments of the invention, the displaying a holographic image by a plurality of displays includes tracking relative locations and orientations of the plurality of displays by an on-board computing unit and by inter-display communication.

According to some embodiments of the invention, the producing a holographic image at a first location includes producing the holographic image to include multiple focal planes, and the re-imaging the holographic image from the first location to form a holographic virtual image in front of the eye of the viewer wearing the display includes re-imaging the multiple focal planes, relative to the viewer's point of view, to apparent distances in a range from as close as an apparent 30 cm from the eye of the viewer to as far as apparent optical infinity.

According to an aspect of some embodiments of the present invention there is provided a method of displaying a Computer Generated Holographic (CGH) image by a display, including setting pixel values of a Spatial Light Modulator (SLM) included in a Head Mounted Display (HMD), producing a interference based holographic image at a first location by projecting coherent light onto the SLM, and re-imaging the holographic image from the first location to form a holographic image in front of an eye of a viewer wearing the HMD.

According to some embodiments of the invention, further including enabling the eye of the viewer to view a real world view in addition to the holographic image.

According to some embodiments of the invention, further including blocking a portion of the real world view, the portion of the real world view being blocked overlapping, at least in part, at least a portion of the holographic image.

According to some embodiments of the invention, the re-imaging the holographic image from the first location to form a holographic image includes re-imaging the holographic image from the first location to form a holographic virtual image.

According to some embodiments of the invention, further including imaging the SLM to a vicinity of the eye of the viewer.

According to some embodiments of the invention, the imaging the SLM to the vicinity of the eye of the viewer includes imaging the SLM to a location of a first image of the SLM, and re-imaging the image of the SLM from the location of the first image of the SLM to a location at the vicinity of the eye of the viewer.

According to some embodiments of the invention, the re-imaging the image of the SLM from the location of the first image of the SLM to the location at the vicinity of the eye of the viewer includes adjusting a tilt of a mirror at a location of a real holographic image.

According to some embodiments of the invention, a field of view of the CGH image is enlarged by projecting different parts of the field of view at different times.

According to some embodiments of the invention, further including jittering a location of imaging the image of the SLM in a direction across the viewer's eye.

According to some embodiments of the invention, when the location of imaging the image of the SLM is jittered across the viewer's eye, the setting pixel values of the SLM is updated to compensate for the jittering.

According to some embodiments of the invention, further including adjusting a distance at which the image of the SLM is focused around the vicinity of the viewer's pupil.

According to some embodiments of the invention, the SLM is attached to a controllable tilt mechanism.

According to some embodiments of the invention, a real image of the SLM is imaged on an optical component selected from a group consisting of a controllable tilting mirror, a controllable tilting partially transmitting mirror, a controllable tilting partially reflecting partially transmitting mirror, a controllable tilting prism, a controllable image redirection element, and a controllable beam deflector.

According to some embodiments of the invention, the re-imaging the holographic image from the first location to form a holographic image in front of the eye of the viewer includes forming the holographic image at an arm's length in front of the viewer.

According to some embodiments of the invention, further including using a sensor mounted on the display and arranged to read a location of an object inserted into a same space as the holographic virtual image displayed in front of the eye of the viewer.

According to some embodiments of the invention, the sensor reads the location of the object based, at least in part, on detecting one or more markings on the object.

According to some embodiments of the invention, projecting a holographic image onto a first location includes imaging a real image of the holographic image on an optical component selected from a group consisting of a controllable tilting mirror, a controllable tilting prism, a controllable image redirection element, and a controllable beam deflector.

According to some embodiments of the invention, further including tracking a direction in which the HMD is pointing, when a change in the direction the HMD is pointing is detected, adjusting the re-imaging the holographic image from the first location toward an eye of a viewer so as to make the holographic image appear at a same location as prior to the change.

According to some embodiments of the invention, the adjusting the re-imaging the holographic image includes controlling a tilt of a mirror at a location of the SLM.

According to some embodiments of the invention, the adjusting the re-imaging the holographic image includes controlling a tilt of a mirror at a location of a real image of the SLM.

According to some embodiments of the invention, the setting pixel values of the SLM includes setting a first set of pixel values of the SLM for producing a first portion of the holographic image, the producing the holographic image at a first location by projecting coherent light onto the SLM includes projecting the first portion of the holographic image onto the first location, and re-imaging the first portion of the holographic image from the first location to form a first portion of the holographic image at a first location in front of the eye of the viewer, and further including setting second set of pixel values of the SLM for producing a second portion of the holographic image, producing the second portion of the holographic image by projecting coherent light onto the SLM and projecting the second portion of the holographic image onto the first location, and re-imaging the second portion of the holographic image from the first location to form a second portion of the holographic image at a second location in front of the eye of the viewer, the second location in front of the eye of the viewer being adjacent to the first location in front of the eye of the viewer, such that the second portion of the holographic image appears adjacent to the first portion of the holographic image.

According to some embodiments of the invention, the re-imaging of the second portion of the holographic image to form a second portion of the holographic image at a second location in front of the eye of the viewer, the second location in front of the eye of the viewer being adjacent to the first location in front of the eye of the viewer includes controlling an adjustable optical component so as to shift a direction of the re-imaging of the second portion of the holographic image.

According to some embodiments of the invention, the adjustable optical component is at the first location of the holographic image.

According to some embodiments of the invention, the adjustable optical component is optically adjacent to a location of a real holographic image.

According to some embodiments of the invention, further including tracking an orientation in space in which the HMD is pointing, when a change in the orientation is detected, setting pixel values of the SLM to make the holographic image appear at a same location as prior to the change.

According to some embodiments of the invention, further including tracking a location of the HMD in space, when a change in the location of the HMD in space is detected, setting pixel values of the SLM to make the holographic image appear at a same location as prior to the change in location.

According to some embodiments of the invention, further including tracking a distance from the HMD to a location in real space where an apparent location of the holographic image is intended to appear, when a change in the distance is detected, setting pixel values of the SLM to produce the holographic image to appear at the changed distance, at the location where the holographic image is intended to appear, and at an apparently unchanged size.

According to some embodiments of the invention, the first location of the holographic image corresponds to a location of a direction-adjustable optical element, the re-imaging the holographic image from the first location toward the eye of the viewer includes adjusting a direction of the direction-adjustable optical element to re-image the holographic image from the first location toward the eye of the viewer.

According to some embodiments of the invention, further including tracking a location of a pupil of the eye of the viewer, when a change in location of the pupil is detected, adjusting a location of the imaging an image of the SLM to keep the image of the SLM at a vicinity of the viewer's pupil responsive to the change in location of the pupil.

According to some embodiments of the invention, further including setting pixel values of a second SLM, projecting a second holographic image produced by projecting coherent light onto the second SLM onto a second location, and re-imaging the second holographic image from the second location toward a second eye of the viewer.

According to some embodiments of the invention, further including adjusting re-imaging the holographic image, and adjusting re-imaging the second holographic image, to cause appearance of merging the holographic image and the second holographic image in the viewer's view.

According to some embodiments of the invention, the setting pixel values of the SLM further includes calculating the values of the pixels in a computing unit on-board the HMD.

According to some embodiments of the invention, the setting pixel values of the SLM further includes distributing a calculating of the pixel values between a computer external to the HMD and a computing unit on-board the HMD.

According to some embodiments of the invention, the computer external to the HMD calculates pixel values for a tile smaller than an entire area of the SLM, and the on-board computing unit calculates pixel values of the entire area of the SLM.

According to some embodiments of the invention, further including displaying a holographic image by a plurality of displays, the holographic image being displayed at a same location and same orientation in space for viewers of the plurality of displays.

According to some embodiments of the invention, the displaying a holographic image by a plurality of displays includes the displaying being coordinated by a computer external to the displays.

According to some embodiments of the invention, locations and orientations of the plurality of displays are tracked by the external computer.

According to some embodiments of the invention, the displaying a holographic image by a plurality of displays includes tracking relative locations and orientations of the plurality of displays by a computing unit on-board the displays and by inter-display communication.

According to some embodiments of the invention, the setting pixel values of the SLM included in the display and the producing a holographic image at a first location includes setting pixel values and producing a holographic image including multiple focal planes relative to the viewer's point of view.

According to an aspect of some embodiments of the present invention there is provided a system for displaying a interference based holographic image by a display, the system including a Spatial Light Modulator (SLM), a source of coherent light for projecting onto the SLM for producing an interference based holographic image at a first location, a first optical component at the first location for re-imaging the holographic image from the first location to form a holographic virtual image in front of an eye of a viewer using the display, and a second optical component for imaging an image of the SLM at a vicinity of the eye of the viewer.

According to some embodiments of the invention, further including the system enabling the eye of the viewer to view a real world view in addition to the holographic image.

According to some embodiments of the invention, further including a light blocking component for blocking a portion of the real world view.

According to some embodiments of the invention, further including a second optical component for imaging the image of the SLM at a vicinity of the eye of the viewer.

According to some embodiments of the invention, further including an on-board computing unit for setting values of pixels of the SLM.

According to some embodiments of the invention, further including a direction controller for jittering a direction of imaging the image of the SLM in a direction across the eye of the viewer.

According to some embodiments of the invention, further including a focus controller for adjusting a distance at which the image of the SLM is focused around the vicinity of the eye of the viewer.

According to some embodiments of the invention, the producing an interference based holographic image at a first location includes producing a holographic real image, and the re-imaging the holographic image from the first location to form a holographic image in front of the eye of the viewer includes re-imaging the holographic image and producing a holographic virtual image.

According to some embodiments of the invention, further including a direction-tracker for tracking a direction the display is pointing, and a controller for adjusting the re-imaging the holographic image from the first location to form a holographic image in front of the eye of the viewer to make the holographic image appear at a same location responsive to a change in direction detected by the direction-tracker.

According to some embodiments of the invention, further including a controller for setting values of the pixels of the SLM to make the holographic image appear at a same location responsive to a change in direction detected by the direction-tracker.

According to some embodiments of the invention, further including a location-tracker for tracking a change in location of the display, and a controller for setting values of the pixels of the SLM to make the holographic image appear at a same location as prior to the change in location of the display.

According to some embodiments of the invention, the direction controller includes a direction-adjustable optical component selected from a group consisting of a controllable tilting mirror, a controllable tilting prism, a controllable image redirection element.

According to some embodiments of the invention, the direction-adjustable optical component is located at the image of the SLM.

According to some embodiments of the invention, further including a sensor arranged to read a location of an object inserted into a same space as the holographic virtual image displayed in front of the eye of the viewer.

According to some embodiments of the invention, the sensor arranged to read the location of the object based, at least in part, on detecting one or more markings on the object.

According to some embodiments of the invention, further including a transparent liquid crystal display between an apparent location of the holographic virtual image and the eye of the viewer, in which the liquid crystal display is configured to block light from a direction of the apparent location of the holographic virtual image to the eye of the viewer, thereby increasing a contrast between the holographic virtual image and a background of the holographic virtual image.

According to some embodiments of the invention, further including a pupil tracker for tracking a location of a pupil of the eye of the viewer, a controller for adjusting the imaging of the SLM at a vicinity of the eye of the viewer responsive to a change in location of the pupil detected by the pupil tracker.

According to some embodiments of the invention, the first optical component at the first location for re-imaging the holographic image includes a tilt-adjustable component located at the first location, and the controller for adjusting the imaging of the SLM controls the tilt-adjustable component to image the image of the SLM at the viewer's cornea.

According to some embodiments of the invention, further including a second SLM, a second source of coherent light for projecting onto the second SLM for producing a holographic image at a second location, and a second optical component at the second location for re-imaging the holographic image from the second location toward a second eye of the viewer.

According to some embodiments of the invention, further including a second computing unit for setting values of pixels of the second SLM.

According to some embodiments of the invention, the setting values of pixels of the SLM further includes distributing a calculating of the values of the pixels between a computer external to the display and the on-board computing unit.

According to some embodiments of the invention, the computer external to the display is for calculating pixel values for a tile smaller than an entire area of the SLM, and the on-board computing unit is for calculating values of pixels of the entire area of the SLM.

According to some embodiments of the invention, further including displaying a holographic image by a plurality of displays, the holographic image being displayed at a same location and same orientation in space for viewers of the plurality of displays.

According to some embodiments of the invention, the displaying the holographic image by the plurality of displays includes the displaying being coordinated by a computer external to the displays.

According to some embodiments of the invention, locations and orientations of the plurality of displays are tracked by the external computer.

According to some embodiments of the invention, the displaying a holographic image by a plurality of displays includes tracking relative locations and orientations of the plurality of displays by an on-board computing unit and by inter-display communication.

According to some embodiments of the invention, the producing a holographic image at a first location includes producing the holographic image to include multiple focal planes, and the re-imaging the holographic image from the first location to form a holographic virtual image in front of the eye of the viewer wearing the display includes re-imaging the multiple focal planes, relative to the viewer's point of view, to apparent distances in a range from as close as an apparent 30 cm from the eye of the viewer to as far as apparent optical infinity.

According to an aspect of some embodiments of the present invention there is provided a method for coordinating display of an interference based Computer Generated Hologram (CGH) scene among several displays, the method including determining a desired apparent location and orientation of an interference based CGH image scene in a space, determining a location and orientation of a first display in the space, calculating pixel settings for a first Spatial Light Modulator (SLM) included in the first display to produce the interference based CGH image scene in the desired apparent location and orientation in the space, determining a location and orientation of a second display in the space, and calculating pixel settings for a second SLM included in the second display to produce the interference based CGH image scene in the desired apparent location and orientation in the space.

According to an aspect of some embodiments of the present invention there is provided a method of displaying a Computer Generated Holographic (CGH) image by a display, including setting pixel values of a Spatial Light Modulator (SLM) included in a Head Mounted Display (HMD), producing an interference based holographic image at a first location by projecting coherent light onto the SLM, re-imaging the holographic image from the first location to form a holographic image in front of an eye of a viewer wearing the HMD, enabling the eye of the viewer to view a real world view in addition to the holographic image, and blocking a portion of the real world view, the portion of the real world view being blocked overlapping, at least in part, at least a portion of the holographic image.

According to an aspect of some embodiments of the present invention there is provided a method for blocking non-modulated light from a Spatial Light Modulator (SLM) and allowing through modulated light for producing an interference based holographic image, the method including illuminating the SLM with coherent light, thereby producing a mix of light modulated by the SLM and light not modulated by the SLM, and projecting the mix of the modulated light and the not modulated light along an optical axis onto a distributed Bragg reflector (DBR), wherein the DBR reflects the not modulated light and allows through modulated light which is at an angle to the optical axis.

According to some embodiments of the invention, the illuminating the SLM is by a plane wave coherent light propagating at a direction normal to a plane of the SLM, and the projecting the mix of light is at a direction normal to a plane of the DBR.

According to some embodiments of the invention, the DBR allows through modulated light which is at an angle to the optical axis which is greater than 1 milliradian.

According to some embodiments of the invention, DBR planes are tilted at an angle to the optical axis which is greater than 10 degrees.

According to an aspect of some embodiments of the present invention there is provided a display for displaying an interference based holographic image and blocking a Zero Order Diffraction (ZOD) bright spot associated with the holographic image, including a Spatial Light Monitor (SLM), a coherent light illuminator for illuminating the SLM with coherent light, thereby producing a mix of modulated light for displaying an interference based holographic image and not-modulated light, and a distributed Bragg reflector (DBR) for reflecting the not modulated light and allowing through the modulated light for displaying the holographic image.

According to some embodiments of the invention, the DBR is placed between the SLM and any other optical focusing element.

According to some embodiments of the invention, the DBR is designed to allow through modulated light which is at an angle to the optical axis which is greater than 1 milliradian.

According to some embodiments of the invention, DBR planes are tilted at an angle to the optical axis which is greater than 10 degrees.

According to an aspect of some embodiments of the present invention there is provided a method for reducing Zero Order Diffraction (ZOD) bright spot intensity in Spatial Light Modulator (SLM) projection of interference based holographic images including illuminating a SLM with coherent light, thereby producing modulated light, and passing the modulated light through an apodization filter, producing apodized modulated light, and using the apodized modulated light to produce an interference based holographic image.

According to some embodiments of the invention, the apodization provides a smooth reduction of the modulated light intensity from zero intensity along edges of an area of the modulated light, to full intensity away from the edges.

According to some embodiments of the invention, the apodization provides a smooth reduction of the modulated light intensity to 5% intensity along a distance of 2 to 500 wavelengths of the light.

According to some embodiments of the invention, the apodization provides an average of 50% reduction of intensity in an area at a distance of 2 to 500 wavelengths to edges of 5% intensity of the light.

According to some embodiments of the invention, the apodization provides a smooth reduction of the modulated light intensity to 5% intensity along a distance of 1 to 250 microns normal to edges of an area of the modulated light, from full intensity away from the edges.

According to an aspect of some embodiments of the present invention there is provided a method for reducing Zero Order Diffraction (ZOD) bright spot intensity in Spatial Light Modulator (SLM) projection of holographic images including illuminating a SLM with coherent light, by passing the illuminating light through an apodization filter, thereby producing apodized modulated light, and using the apodized modulated light to produce a holographic image.

According to some embodiments of the invention, the apodization provides a smooth reduction of the illuminating light intensity from zero intensity along edges of an area of the illuminating light, to full intensity away from the edges.

According to some embodiments of the invention, the apodization provides a smooth reduction of the illuminating light intensity to 5% intensity along a distance of 2 to 500 wavelengths of the light.

According to some embodiments of the invention, the apodization provides an average of 50% reduction of the illuminating light intensity in an area at a distance of 2 to 500 wavelengths to edges of 5% intensity of the illuminating light.

According to an aspect of some embodiments of the present invention there is provided a display for displaying a holographic image and reducing an intensity of a Zero Order Diffraction (ZOD) bright spot associated with the holographic image, including a Spatial Light Monitor (SLM), a coherent light illuminator for illuminating the SLM thereby producing modulated light for displaying a holographic image, and an apodization filter for apodizing the modulated light thereby producing apodized modulated light, thereby producing apodized modulated light for producing a holographic image with a reduced intensity ZOD bright spot.

According to some embodiments of the invention, the apodization filter is placed between the coherent light illuminator and the SLM.

According to some embodiments of the invention, the apodization filter is placed closer to a face of the SLM than to the coherent light illuminator.

According to some embodiments of the invention, the apodization filter is placed adjacent to a face of the SLM.

According to some embodiments of the invention, the apodization filter is placed at a distance corresponding to not less than a Fresnel number 50 from the SLM.

According to some embodiments of the invention, the apodization filter is placed at a location of an image of the SLM.

According to some embodiments of the invention, the apodization filter is placed at a distance corresponding to not less than a Fresnel number 50 from the location of the image of the SLM.

According to some embodiments of the invention, an image of the apodization filter is imaged at the SLM.

According to some embodiments of the invention, the apodization filter is imaged at a distance not greater than 70 millimeters from the SLM.

According to some embodiments of the invention, the apodization filter provides a smooth reduction of intensity of light passing through the apodization filter to 5% intensity along edges of the apodization filter, from full intensity away from the edges.

According to some embodiments of the invention, the apodization filter provides a smooth reduction of the intensity of light passing through the apodization filter to 5% intensity along edges of the apodization filter, from full intensity, along a distance of 2 to 500 wavelengths of the light.

According to some embodiments of the invention, the apodization filter provides an average of 50% reduction of intensity of light passing through the apodization filter in an area at a distance of 2 to 500 wavelengths from edges of the apodization filter.

According to an aspect of some embodiments of the present invention there is provided a method for directing light reflected from a Spatial Light Modulator (SLM) away from a direction of projecting a holographic image generated by the SLM, the method including placing a transparent component next to the SLM, with a first side of the transparent component facing the SLM and a second side at an angle to a plane of the SLM, illuminating the SLM with coherent light, through the transparent component, thereby producing reflected modulated light, and projecting the reflected modulated light along an optical axis and focusing the reflected modulated light along the optical axis, producing a holographic image, wherein reflections from the second side of the transparent component are reflected at an angle to the optical axis larger than a diffraction angle of the transparent component.

According to some embodiments of the invention, further including matching an index of refraction of the transparent component with an index of refraction matched of the SLM.

According to some embodiments of the invention, the placing the transparent component includes placing a plurality of transparent components, each one of the transparent components with a first side facing the SLM and a second side at an angle to a plane of the SLM.

According to some embodiments of the invention, the placing the transparent component includes placing a blazed grating transparent component, the blazed grating including a flat first side facing the SLM and a blazed grating on a second side, the blazing producing a plurality of planes at an angle to a plane of the SLM.

According to some embodiments of the invention, an angle A of the second side of the transparent component to the plane of the SLM is greater than 0.1 degrees.

According to an aspect of some embodiments of the present invention there is provided a display for holographic images including a Spatial Light Modulator (SLM), and a transparent component next to an active side of the SLM, with a first side of the transparent component facing the SLM and a second side at an angle to a plane of the SLM.

According to some embodiments of the invention, a head angle A of the transparent component between the first side of the transparent component and the second side of the transparent component is greater than is greater than $\frac{1}{3}*\theta$diff, where $\theta$diff is an angle of diffraction in the transparent component.

According to some embodiments of the invention, further including the transparent component having an index of refraction matched to an index of refraction of the SLM.

According to some embodiments of the invention, further including placing index matching material between the transparent component and the SLM, to provide index matching between the transparent component and the SLM.

According to some embodiments of the invention, the index matching material is an index matching liquid.

According to some embodiments of the invention, the transparent component includes a transparent electrode.

According to some embodiments of the invention, the transparent component includes a transparent layer attached to the SLM.

According to some embodiments of the invention, the transparent component includes a plurality of transparent components, each one of the transparent components with a first side facing the SLM and a second side at an angle to a plane of the SLM.

According to some embodiments of the invention, the transparent component includes a blazed grating transparent component, the blazed grating including a flat first side facing the SLM and a blazed grating on a second side, the blazing producing a plurality of planes at an angle to a plane of the SLM.

According to some embodiments of the invention, an angle A of the second side of the transparent component to the plane of the SLM is greater than 0.5 degrees.

According to some embodiments of the invention, the SLM includes pixels, each pixel including a wedge shaped transparent component, having a first side facing a first side of the SLM and a second side facing a direction of illumination of the SLM, the second side of the pixel at an angle to a plane of the first side of the pixel.

According to some embodiments of the invention, an optical path difference induced by the wedge shape of the pixel is compensated by varying electric potential along the pixel.

According to an aspect of some embodiments of the present invention there is provided a display for displaying a wide Field of View (FoV) scene including an interference based holographic image within the scene, including a first Spatial Light Modulator (SLM) and an optical system for producing a first holographic image at a center of a displayed scene, and a second image display for producing at least a first additional image adjacent to the first holographic image.

According to some embodiments of the invention, the optical system is configured to display the first holographic image spanning a Field of View (FoV) of a human fovea.

According to some embodiments of the invention, the optical system is configured to display the first holographic image spanning an angle in a range of 5-35 degrees.

According to some embodiments of the invention, further including a viewer pupil tracking component for tracking the viewer's pupil and wherein the viewer pupil tracking component provides data for controlling the first Spatial Light Modulator (SLM) and the optical system for displaying the first holographic image to the viewer's pupil.

According to some embodiments of the invention, the second image display includes a display for producing a stereoscopic image.

According to some embodiments of the invention, the second image display includes an SLM for producing a holographic image.

According to some embodiments of the invention, the optical system for producing the first holographic image and the second image display for producing the first additional image are configured to display the first holographic image and the first additional image spanning an angle in a range of 60-110 degrees.

According to some embodiments of the invention, the first SLM and the optical system for producing the first holographic image includes two SLMs and two optical systems, for producing two first holographic images, one for each one of a viewer's two eyes, and the second image display for producing the at least a first additional image adjacent to the first holographic image includes two second image displays for producing at least two first additional images each one adjacent to each one of the first holographic images.

According to some embodiments of the invention, the two SLMs, the two optical systems, and the two image displays are configured to display the first holographic image and the first additional image to the viewer's two eyes spanning an angle in a range of 90-200 degrees.

According to some embodiments of the invention, the display is a Head Mounted Display (HMD).

According to some embodiments of the invention, further including the optical system enabling a real view of a real world through the optical system, thereby combining a view of the first holographic image, the first additional image and the real world.

According to an aspect of some embodiments of the present invention there is provided a display for displaying a wide Field of View (FoV) scene including an interference based holographic image within the scene, including a first Spatial Light Modulator (SLM) and an optical system for producing a first interference based holographic image, and a second image display for producing at least a first additional image adjacent to the first holographic image.

According to an aspect of some embodiments of the present invention there is provided a method for displaying a wide Field of View (FoV) scene including an interference based holographic image within the scene, including displaying a first interference based holographic image, and displaying a first additional image as part of the displayed scene and adjacent to the first holographic image.

According to some embodiments of the invention, the displaying the first interference based holographic image includes displaying the first interference based holographic image at a center of a displayed scene.

According to some embodiments of the invention, the displaying the first holographic image includes using a first Spatial Light Modulator (SLM) and an optical system for producing the first holographic image.

According to some embodiments of the invention, the displaying the first holographic image includes displaying the first holographic image to span a Field of View (FoV) of a human fovea.

According to some embodiments of the invention, the displaying the first holographic image includes displaying the first holographic image to span an angle in a range of 5-35 degrees.

According to some embodiments of the invention, further including enabling a real view of a real world to be viewable through and around the first holographic image and the first additional image, wherein the first holographic image is displayed at a center of a scene, the second additional image is displayed as part of the scene and adjacent to the first holographic image, and the real view of a real world is also viewable as part of the scene.

According to some embodiments of the invention, further including displaying a second additional image.

According to some embodiments of the invention, the second additional image is displayed adjacent to the first additional image.

According to some embodiments of the invention, the second additional image includes a stereoscopic image.

According to an aspect of some embodiments of the present invention there is provided a method for displaying a wide Field of View (FoV) scene including a holographic image within the scene, including setting pixel values in a Spatial Light Modulator (SLM) for producing a Computer Generated Hologram (CGH), illuminating the SLM with coherent light, thereby producing a first holographic image, setting pixel values in a first additional image display for producing a second, additional image, and illuminating the first additional image display, thereby producing a second additional image, wherein the first holographic image is displayed at a center of a scene, and the second additional image is displayed as part of the scene and adjacent to the first holographic image.

According to some embodiments of the invention, further including tracking a viewer's pupil, and controlling the displaying the first holographic image to display the first holographic image to the viewer's pupil.

According to some embodiments of the invention, further including allowing a real view of a real world to be viewable around the first holographic image and the second, additional image, wherein the first holographic image is displayed at a center of a scene, the second additional image is displayed as part of the scene and adjacent to the first holographic image, and the real view of a real world is also viewable as part of the scene.

According to some embodiments of the invention, the allowing the real view of a real world to be viewable around the first holographic image and the second, additional image includes allowing the real view of a real world to be viewable through and around the first holographic image and the second, additional image.

According to an aspect of some embodiments of the present invention there is provided a method for coordinating display of a Computer Generated Hologram (CGH) scene among several displays, the method including determining a desired apparent location and orientation of a CGH image scene in a space, determining a location and orientation of a first display in the space, calculating pixel settings for a first Spatial Light Modulator (SLM) included in the first display to produce the CGH image scene in the desired apparent location and orientation in the space, determining a location and orientation of a second display in the space, and calculating pixel settings for a second SLM included in the second display to produce the CGH image scene in the desired apparent location and orientation in the space.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions.

Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1C, 1D, 1E and 1F are simplified illustrations of four example embodiments of a display on an adjustable arm according to example embodiments of the invention;

FIG. 8B is a simplified flow chart illustration of an example method for coordinating display of a CGH scene among several displays, according to an example embodiment of the invention;

FIG. 12D is a simplified flow chart illustration of a method of displaying a Computer Generated Holographic (CGH) image by a display;

FIG. 13C is a simplified flow chart illustration of a method for blocking light reflected from a Spatial Light Modulator (SLM) and allowing through light for projecting a holographic image according to an example embodiment of the invention;

FIG. 16B is a simplified flow chart illustration of a method for directing light reflected from a Spatial Light Modulator (SLM) away from a direction of projecting a holographic image generated by the SLM according to an example embodiment of the invention;

DESCRIPTION OF SPECIFIC EMBODIMENTS OF THE INVENTION

Figure 1B:
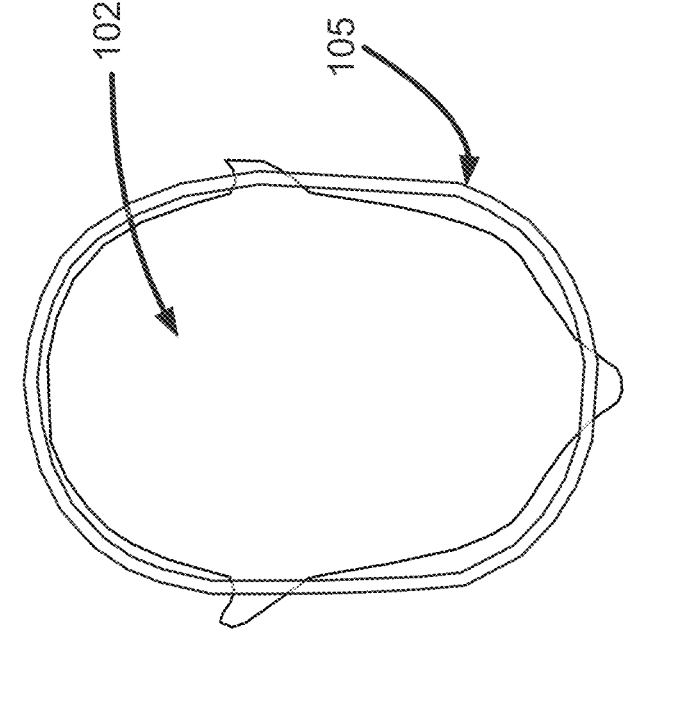
FIGS. 1A and 1B are two views of a head with a Head Mounted Display (HMD) according to an example embodiment of the invention.

The present invention, in some embodiments thereof, relates to a display for projecting a Computer Generated Hologram (CGH) image to a viewer via an optical element close to the viewer's eye or eyes, such that the CGH image appears to the viewer as beyond the optical element, and more specifically, in some embodiments the optical element may be at least semi-transparent, so that the viewer may see the real world simultaneously with seeing the CGH image.

The present invention, in some embodiments thereof, relates to a head mounted display (HMD), and to methods of using one or more head mounted displays to display holographic images to one or more viewers.

In some embodiments, the present invention may include a semi-transparent display which allows in a view of the real world, optionally enabling an augmented reality view of both the real world and computer-generated images displayed by the display. A degree of transparency of the display in front of a viewer's eye(s) is optionally in a range of 5% to 95% transmittance, typically approximately 50%.

In some embodiments, the present invention may include a display mounted on an adjustable arm such that a viewer may pull the display to be in front of the viewer's eyes to view the CGH image.

In some embodiments, an optical element displaying the holographic images is optionally 5 to 70 millimeters in front of a viewer's eye, and optionally 5 centimeters up to 30 centimeters, 2 meters and more.

In some embodiments, the display may provide a wide field-of-view, of 10, 20 degrees of a holographic image, up to 150 degrees of a hybrid holographic image plus stereoscopic image view, and up to 200 degrees of a hybrid holographic image plus stereoscopic and/or monoscopic image view.

It is noted that in the present specification and claims the term HMD is used to mean a head mounted display as well as a holographic display or holographic display glasses or holographic display screen or optical display elements mounted on an adjustable arm. The technology depicted and described as a HMD is meant to apply to a holographic display, to holographic display glasses and to arm-mounted holographic display glasses.

In some embodiments the optical element positioned in front of a viewer's eye may optionally be, by way of some non-limiting examples, a mirror, or a lens, or a diffractive optical element or a spatial light modulator.

An aspect of the invention involves, in a head mounted display, projecting light onto or through a Spatial Light Modulator (SLM), producing a holographic image. The holographic image is focused on a stage, and re-directed from the stage to a viewer's eye, so the image appears to a viewer to be at a specific location in space.

The term "stage" is used in the present specification and claims to mean a location where an image is focused, regardless of whether the location is occupied by an actual component of a display.

In some embodiments, an image of the SLM is imaged onto, or close to, a viewer's pupil. In some embodiments the term close to is between approximately −3 cm and +3 cm in all directions relative to the viewer's pupil.

The language "imaged onto a pupil" and/or "imaged onto an eye" is used throughout the present specification and claims, in various grammatical permutations, to mean imaged approximately at a pupil of an eye, partially overlapping an area of a pupil, approximately at a cornea of an eye, or at a plane adjacent to an eye, such as within approximately +/−1 mm, 2 mm, 5 mm, 10 mm, 15 mm, 20 mm, 25 mm of the cornea of the eye.

In some embodiments, a mirror is controlled to adjust the image of the SLM onto the viewer's pupil.

In some embodiments, an HMD direction-tracking unit detects a direction in which the HMD is pointing, and adjusts the SLM to make a static or dynamic holographic image appear in static coordinates and/or at a same orientation in space when the HMD is moved. Adjustment of location of said holographic image is optionally in one, two, or all three dimensions: azimuth, elevation, distance, and optionally rotation around one two or three axes. In some embodiments, a mirror termed herein a SLM mirror, being located adjacent to a SLM or to an image of the SLM or at an image of the SLM, is optionally tilted to compensate for changes in azimuth and/or elevation of an orientation of the HMD in space. In some embodiments a change of direction, that is azimuth and/or elevation, is adjusted by re-computing the SLM values, optionally in addition to tilting the mirror. In some embodiments, a change of distance from the HMD to an apparent location of said holographic image is adjusted for by re-computing and adjusting the SLM values. In some embodiments, a change of distance from the HMD to an apparent location of said holographic image is adjusted by adjusting an optical component to change a length of an optical path of the imaging and/or re-imaging of the holographic image, optionally in addition to re-computing and adjusting the SLM pixel values.

In some embodiments, a direction-tracking unit detects a direction in which the HMD is pointed, and adjusts a mirror (or optic system) so that the image appears steady in space, compensating for movement of the head. In some embodiments the image shifts less than a human eye is expected to resolve, for example less than 150 micron shift of an image which appears to be 500 millimeters in front of a viewer's eye.

The language "tracking a pupil" is used throughout the present specification and claims, in various grammatical permutations, to mean tracking a direction in which an eye is looking relative to an HMD or relative to a display for projecting a holographic image to a viewer via an optical element close to the viewer's eye or eyes, or tracking a location of the pupil relative to the HMD or the display for projecting a holographic image to a viewer via an optical element close to the viewer's eye or eyes. Such tracking may also be termed gaze tracking.

In some embodiments a holographic image is displayed with a span taking up a field of view of 20 degrees, which is larger than a field of view of a human fovea. In some embodiments tracking a pupil and projecting a holographic image on a pupil is enough to enable at least a portion of the holographic image to be viewed by the fovea, and for the holographic image to appear to a human viewer at a portion of the field of view which provides sharpest acuity of vision.

In some embodiments, a change in a direction in which a viewer's eye is looking with respect to the HMD is compensated for by tilting a mirror at a location of a CGH real image. In some embodiments a change in the eye location with respect to the HMD is compensated by re-computing SLM pixel settings for producing a corresponding CGH, and also, optionally, in some cases, making the CGH image appear in static coordinates in space regardless of a change in the eye location with respect to the HMD, similarly to real objects in space, which appear static, or steady in space, even when an eye is moved.

In some embodiments, a quadratic phase optical element or a lens in front of the SLM is used to produce a Fourier CGH image. A Fourier 3D CGH image is a CGH image produced near a focal plane of a lens.

In some embodiments, the CGH image is a Fresnel CGH, which does not require a lens.

An aspect of the invention involves using two holographic display units in one HMD to direct each one of two holographic images to each one of two viewer's eyes, optionally while also imaging the two SLMs onto each one of a viewer's two pupils.

Optionally multiple SLMs can be imaged to any one viewer's eye or substantially close to the eye, potentially enlarging a viewability space per specific size of a CGH, and/or potentially reducing eye or pupil tracking requirements. In some embodiments substantially close is within +/−3 millimeters on either side of a viewer's pupil or in front or behind a viewer's cornea.

In some embodiments, the CGH images are optionally adjusted so that both eyes see holographic images which overlap, and are fused by the human visual system to be viewed as one holographic image. It is noted that a pair of eyes may be slightly misaligned relative to the HMD. In some embodiments, misalignment in azimuth and elevation are corrected by the HMD tracking a viewer's pupils and positioning a mirror to project a CGH image viewing window on the viewer's pupils, as described elsewhere herein with reference to tracking a viewer's eye or pupil. In some embodiments a mechanical adjustment is performed, side-to-side, elevation, depth, so that the CGH image viewing window overlaps at least part of the viewer's pupil.

In some embodiments, adjustment for inter-pupillary distance (IPD) is optionally done manually.

In some embodiments, adjustment for inter-pupillary distance (IPD) is optionally done by an adjustable mirror at or near the CGH image, optionally at or near an intermediate CGH image within the optical system.

In some embodiments, adjustment of optical path distance to one or to both eyes is optionally done manually, optionally by manually moving an optical element in the optical path.

An aspect of the invention involves enabling a user to see a view of the real world through the display.

In some embodiments the viewing of the holographic image and the real world enables displaying what is termed augmented reality.

An aspect of the invention involves blocking at least a portion of the view of the real world through the display.

In some embodiments blocking at least a portion of the view of the real world is a complete blocking, in some embodiments the blocking is a reduction in intensity of light from the blocked portion of the view of the real world.

In some embodiments the blocking enables improving a contrast of the display of the holographic image by controlling apparent brightness of the background as perceived by the viewer.

An aspect of some embodiments of the invention includes using an optical design in which a holographic image which includes an optical by-product termed a Zero-Order-Diffraction bright spot is improved by reducing a negative effect of the bright spot on the holographic image.

In some embodiments, the bright spot is shifted away from a location of the holographic image, along an optical axis of the holographic image display system or sideways relative to the optical axis. In some embodiments, light for forming the bright spot is directed away from the optical axis of the holographic image display system.

In some embodiments, light for forming the holographic image is apodized, which has an effect of reducing the intensity of the bright spot, and enlarging an area of the reduced-intensity bright spot.

In some embodiments, the bright spot is fully or partially blocked, producing a dark spot. In some embodiments, the dark spot is filled in with light to be less noticeable and to better blend in with the holographic image. In some embodiments, the dark spot is filled in with an image which corresponds to a portion of the holographic image which is included in the dark spot, thereby partially or fully reconstructing the holographic image, without displaying the bright spot.

An aspect of some embodiments of the invention includes using an Distributed Bragg Reflector (DBR) in front of a SLM used to produce a holographic image, to block on-axis not-modulated light coming from the SLM, which produces the ZOD bright spot, while not blocking, or blocking much less, off-axis light which produces the holographic image.

In some embodiments the DBR is placed in front of the SLM and before any other optical focusing element.

An aspect of the invention involves multiple HMDs, potentially worn by multiple different viewers, being coordinated to show a CGH image at a same location and/or same size and/or same orientation in space, to multiple viewers.

In some embodiments, the coordination is responsive to a system tracking directions of the multiple HMDs.

In some embodiments the coordination is by a first HMD identifying a position and/or spatial orientation of a second HMD, e.g. by a Kinect camera and system on said first HMD tracking said second HMD.

An aspect of the invention involves performing remote calculation of values for SLM in a HMD, and transmitting the values by wire or by wireless such as Wi-Fi, RF or Bluetooth to the HMD. In some embodiments, the transmission of SLM values includes transmitting values for a rectangular portion of the SLM, termed herein a tile, smaller than the entire area of the SLM, and the HMD optionally calculating values for the entire area of the SLM using the values of the tile.

An aspect of the invention involves a holographic optical system for a HMD, including two imaging operations, a first imaging operation focusing an image of the SLM to a vicinity of a viewer's eye, and a second imaging operation focusing a virtual CGH image in a field of view of a viewer, optionally at an apparent hand-reach distance, or arm's length of the viewer, such as, for example, 0.25 to 1.5 meters, or up to 2 or 3 meters when a hand wields a tool. It is noted that embodiments of the invention are not limited to apparent hand-reach distances, but rather operate at small and at larger distance, but that the aspect of hand-reach distance is interesting because a holographic image maintains visual depth cues at such distances while other methods, also referred to as pseudo-three-dimensional imaging, such as stereoscopic images, may not maintain visual depth cues at such a distance.

In some embodiments, including variations of the above optical setup and other optical systems, the holographic optical system optionally includes a correction of a CGH image location and apparent orientation corresponding to a change in an orientation and/or location of the HMD, to make the CGH image appear at a specific fixed location and/or orientation in space, whether the hologram is static or dynamic.

In some embodiments SLM mirror is optionally tilted, projecting images of the SLM to different directions, thereby optionally producing a field of view larger than the image of the SLM, potentially enlarging the effective field of view.

In some embodiments SLM mirror is optionally tilted, projecting images of the SLM to different directions, thereby optionally stabilizing the CGH image when the HMD moves.

In some embodiments, such a correction is optionally implemented by tilting a mirror at a location of or close to the image of the SLM, to keep a secondary image of the SLM re-imaged on a viewer's eye.

In some embodiments, the adjustable mirror is close to the image of the SLM within an infinity optics region. In some embodiments, the mirror is placed next to the real SLM at the infinity optics region. In some embodiments, the tilting is a tilting of an actual SLM, not a tilting of a mirror.

In some embodiments, a correction of the CGH image is made in response to a change in a location of a viewer's eye. In some embodiments, such a correction is optionally implemented by tilting a mirror at a location of the CGH image.

It is noted that without a correction for eye movement the image may disappear. It is also noted that without a correction for the head movement the image location in space may shift in an un-realistic fashion.

In some embodiments, a tilting mirror is optionally placed near the SLM and/or near a location of a real image of the SLM at a region in which the real image is in what is termed an infinity optics region, where rays forming the real image are approximately parallel, as is known in the field of optics. Optionally tilting the mirror shifts a location of the image in the view without changing the location of an observing window with respect to the eye. It is noted that at the same time an image of the SLM is re-imaged to the viewer's eye. Optionally the CGH image is re-calculated based on a corrected orientation.

It is noted that in the present specification and claims, a tilting mirror is meant to be understood as a method of deflecting a direction of light, and persons skilled in the art of optics are meant to understand that other methods and components for deflecting a direction of light may be used. Some non-limiting examples include a beam deflector, such as acousto-optic or electro optic based beam deflector; a tilting prism; and other image redirection elements.

In some embodiments, an external system is used for monitoring HMD location and/or orientation in space. Example systems and methods for monitoring/tracking a HMD location and/or orientation in space include optical system and methods such as tracking cameras and acoustic systems and methods, such as described in above-mentioned article titled "Motion Tracking Systems", an overview of motion tracking methods, Spring Term 2011" published by the Autonomous Systems Lab of the Swiss Federal Institute Of Technology, Zurich.

In some embodiments, an on-board system in the HMD is used to determine and track HMD location and/or orientation in space.

In some embodiments, an on-board system in the HMD is used to determine and track eye and/or pupil location relative to the HMD.

In some embodiments an on board system in the HMD is used to monitor hand gestures or object position and orientation, optionally in the image space. Some non-limiting examples of such systems include Kinect gesture recognition, Leap Motion gesture recognition and Intel RealSense technology.

Three dimensional (3D) display is an emerging technology, as is 3D Head Mounted Display (HMD). Current 3D HMDs are based on stereoscopic 3D display. However, in stereoscopic 3D displays a scene is actually at focus at one specific distance, and fools the eye into perceiving distance based on eye convergence. Such displays do not provide an eye with an eye focus accommodation depth cue, resulting in a confusing appearance of a 3D object, resulting in what known in the literature as vergence-accommodation conflict that reduces the viewing and interaction user experience that can sometimes result with nausea or headache for the user.

A holographic display is an optically true display which presents light with light wave phase and intensity information the same as light coming off a real object/scene, for example including all the natural depth cues which are provided by real objects in the real world, such as, by way of a non-limiting example, eye focus accommodation and eye convergence potentially eliminating the vergence-accommodation conflict.

Due to a large pixel size of a Spatial Light Modulator (SLM) relative to optical wavelengths, a Field of View (FoV) of a Computer Generated Holographic (CGH) image produced by a SLM is relatively narrow. In some embodiments a wide FoV is achieved by displaying a central holographic image adjacent to, and/or peripheral to, and/or surrounded by one or more additional images, producing a scene with a wider FoV than just the central holographic image, potentially providing a benefit of a wide FoV display.

Some embodiments of the present invention take advantage of the eye focus accommodation cue being mostly relevant at the center of the FoV, up to approximately 10 degrees from the FoV center, which is also where a human viewer's fovea lies. Away from the center of the human FoV stereoscopic display, some embodiments take advantage of the human vision poor ability to use eye focus accommodation. Apparently, outside the human fovea, spatial resolution is poorer, depth resolution decreases, and eye focus accommodation does not play a role, or plays less of a role, in human perception.

Some embodiments of the invention present an image type which provides more depth cues in one portion of a scene, such as a portion of the scene near a center of the FoV of a viewer, and another image or images of other types, which provide less depth cues, in other portions of the scene.

Some embodiments of the invention present an image type which provides more resolution in one portion of a scene, such as a portion of the scene near a center of the FoV of a viewer, and another image or images of other types, which provide less resolution, in other portions of the scene.

Some embodiments of the invention use a holographic display for displaying a greater number of depth cues, for example both eye focus accommodation and eye convergence, a stereoscopic display for providing an eye convergence cue, and a monoscopic display for providing even less depth cues.

In some embodiments, portions of an image which are close and center are optionally displayed with both eye focus accommodation and eye convergence, portions of an image which are farther from a viewer, or less near a center of the scene may optionally be displayed with an eye convergence cue of a stereoscopic image.

Depth perception by human eye focus accommodation is typically performed at distances between approximately 0.15 and 3 meters from a viewer, optionally between approximately 0.3 and 2 meters from the viewer. In some embodiments of the invention a holographic image at the center of a human field of view provides a depth cue of eye focus accommodation, while a surrounding, optionally stereoscopic, image is produced with focus at a plane approximately 2 meters away from the viewer.

In some embodiments the focus plane of the surrounding image is optionally adjusted or controlled by adjusting one or more optical components, such as a lens.

Because the eye resolution at a FoV outside of the fovea is poorer than within the FoV of the fovea, the depth of focus and depth resolution of the surrounding image is poorer. In some embodiments a surrounding image display optionally presents images, optionally at a focus plane of 0.15 to 3 meters, optionally using stereoscopic illusion. A combination of a Holographic image at a center of the FoV and surrounding image display potentially appears natural to a viewer.

In some embodiments, at an outer edge of the FoV, away from the fovea, even monoscopic display, providing no eye convergence is optionally displayed. Such a display potentially still appears natural to the viewer. By way of a non-limiting example, some of the scene is actually viewed by only one eye.

An aspect of the present invention includes displaying a portion of a scene with higher spatial resolution and/or depth cues near a center of a viewer's FoV, surrounded by one or more portions of the scene further away from the center of the viewer's FoV, optionally with lower resolution and/or providing less or no depth cues.

An aspect of the present invention includes displaying a holographic image near a center of a viewer's FoV, surrounded by and/or adjacent to a non-holographic image optionally further away from the center.

In some embodiments the non-holographic image is a stereoscopic image.

An aspect of the present invention includes displaying a higher resolution holographic image near a center of a viewer's FoV, surrounded by a lower resolution holographic image.

An aspect of the present invention includes displaying a holographic image near a center of a viewer's FoV, surrounded by and/or adjacent to a first image and surrounded still further, and/or adjacent to yet another second non-holographic image.

In some embodiments the central holographic image is a higher resolution holographic image and the first image is a lower resolution holographic image.

In some embodiments the first image is a stereoscopic image.

In some embodiments the second non-holographic image is a monoscopic image.

In some embodiments a combination between different parts of FoV is realized, where at a center of the FoV an image with optionally all depth cues is displayed, while at greater angles away from the center of the FoV only a stereoscopic image is presented, and at the edge of the FoV optionally only a monoscopic image is presented.

In some embodiments a holographic display is used to display and/or project at the center of the FoV, and a non-holographic imaging system such as a LCOS (Liquid Crystal on Silicon) or a LC (Liquid Crystal) display is combined to be viewed at a wider angle from the center of the FoV.

An aspect of the present invention relates to optionally tracking a viewer's pupil, and projecting the holographic display approximately to the center of the pupil. By maintaining the holographic display at the center of the FoV of the viewer, even when the eye changes direction, the image at surrounding portions of the FoV can be displayed at a lower resolution.

In some embodiments the lower resolution display potentially reduces complexity and/or computation time and or optical component quality needed for producing the surrounding image, potentially involving use of a lower-computation power and/or lower speed computation module for producing the surrounding image.

In some embodiments the lower resolution display includes an SLM with larger pixels. In some embodiments a holographic display is used to display and/or project to the fovea, and the surrounding display to project to some or all of the rest of the FoV.

In some embodiments a holographic display is used to display and/or project a holographic image to the fovea and to a surrounding area, to allow for small movements of the eye without the fovea viewing outside the central holographic scene.

In some embodiments, an angular span of the central holographic image is in a range between 2 degrees and 10 or 25 or even 45 degrees or more.

In some embodiments boundaries between the central holographic image and a surrounding image, and/or between the surrounding image and even more peripheral images, are displayed with an accuracy of a pixel. That is, the scene displayed in a surrounding image is a continuation of the more-central image at an accuracy of a pixel of the surrounding image. By way of a non-limiting example, lines which exist in the more-central image are continued in the surrounding, potentially lower resolution image, with an accuracy of a pixel.

In some embodiments boundaries between the central holographic image and a surrounding image, and/or between the surrounding image and even more peripheral images, are displayed with a sub-pixel accuracy. That is, the scene displayed in a surrounding image is a continuation of the more-central image at a sub-pixel accuracy of the surrounding image. By way of a non-limiting example, lines which exist in the more-central image are continued in the surrounding, potentially lower resolution image, with a sub-pixel accuracy.

In some embodiments boundaries between the central holographic image and a surrounding image, and/or between the surrounding image and even more peripheral images, are displayed so as not to be emphasized by a viewer's vision. In some embodiments at least a boundary portion of the surrounding image and/or the more central image is blurred, and or pixel values in at least the boundary portions are interpolated.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
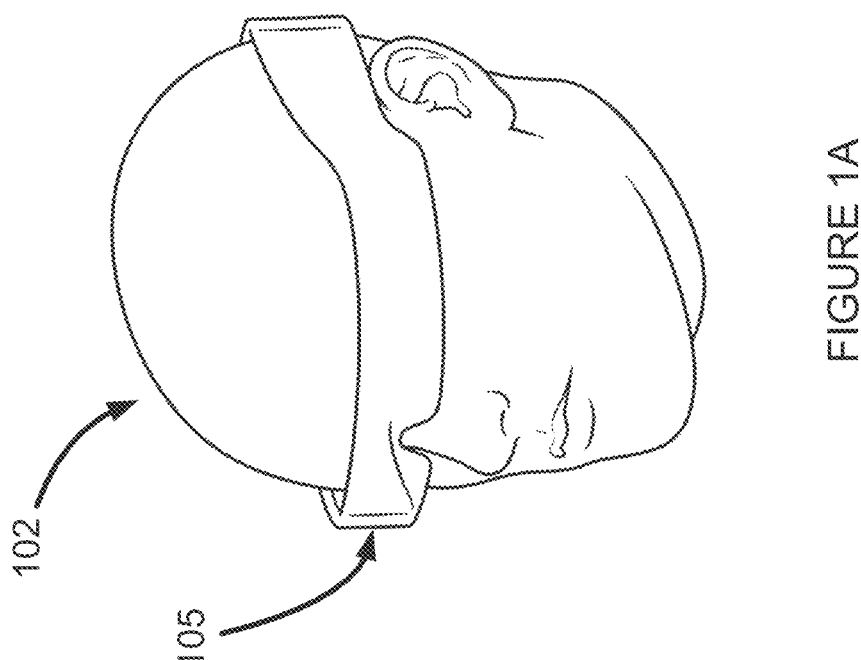

Reference is now made to FIGS. 1A and 1B, which are two views of a head 102 with a Head Mounted Display (HMD) 105 according to an example embodiment of the invention.

FIG. 1A depicts an isometric view and FIG. 1B depicts a top view.

FIGS. 1A and 1B depict an example embodiment of a HMD worn similarly to glasses, allowing a viewer to see through the glasses while also displaying a holographic image.

Reference is now made to FIGS. 1C, 1D, 1E and 1F, which are simplified illustrations of four example embodiments of a display on an adjustable arm according to example embodiments of the invention.

FIG. 1C depicts an example embodiment of a CGH image display 120 on an adjustable arm 122. In some embodiments, the adjustable arm 122 may optionally be mounted on a cart 124. In some embodiments, the adjustable arm 122 may optionally be mounted on a wall or on a ceiling or on a floor.

FIG. 1D depicts another example embodiment of a CGH image display 126. The CGH image display 126 optionally includes a head strap for actually mounting on a viewer's head rather than placing in front of a viewer's eyes. The CGH image display 126 is optionally mounted on an adjustable arm 122 and cart 124 similarly to FIG. 1C.

FIG. 1E depicts an example embodiment of a CGH image display 120, optionally mounted on an adjustable arm 122 and cart 124 similarly to FIG. 1C. The CGH image display 120 is displayed in a setting of a surgical operating room, extending over an operating room table 128, potentially displaying a CGH image produced from a three dimensional data set.

FIG. 1F depicts an example embodiment of a CGH image display 120, optionally mounted on an adjustable arm 122. The adjustable arm 122 in FIG. 1F is optionally mounted on a ceiling, or on a wall. The CGH image display 120 is displayed in a setting of a surgical operating room, extending over an operating room table 128, potentially displaying a CGH image produced from a three dimensional data set.

Figure 1G:
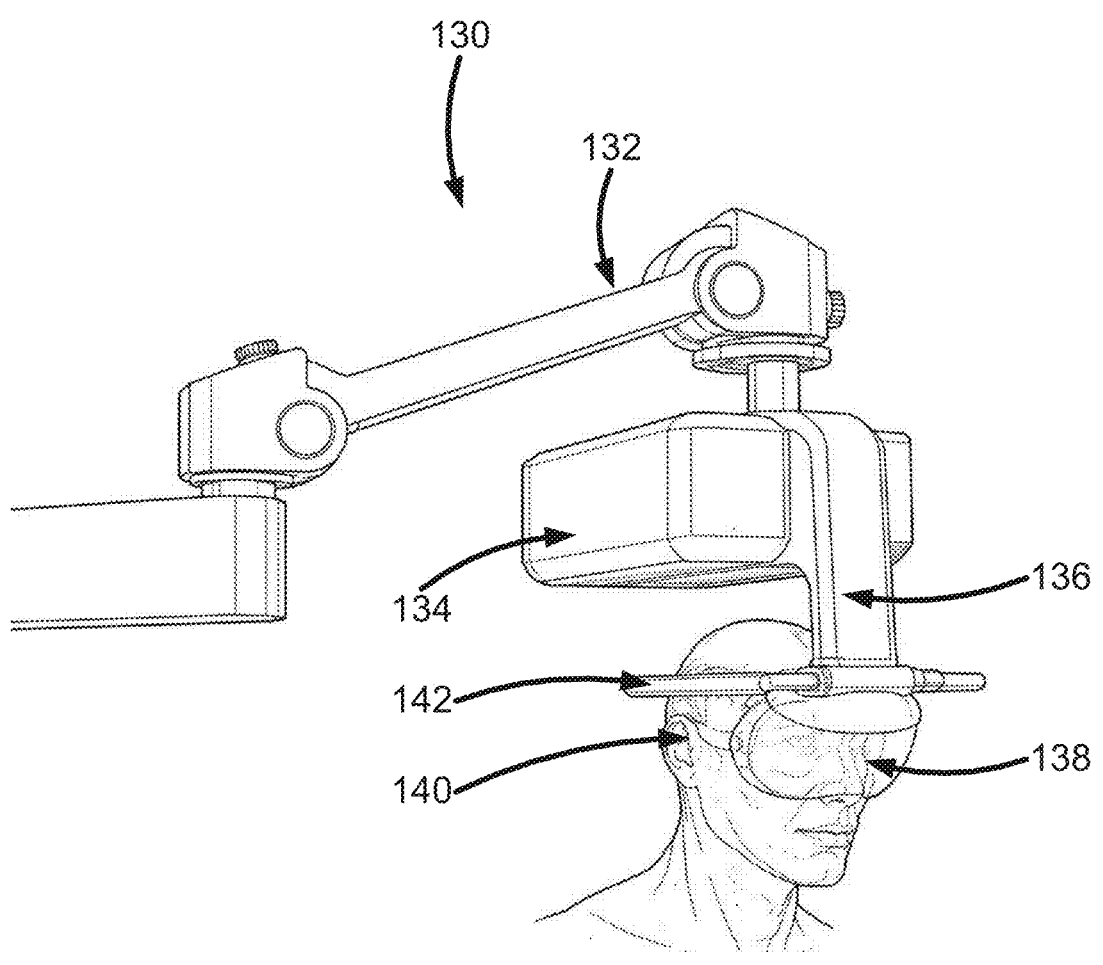
FIG. 1G is a simplified illustration of an example embodiment of a display on an adjustable arm according to an example embodiment of the invention.

Reference is now made to FIG. 1G, which is a simplified illustration of an example embodiment of a display on an adjustable arm according to an example embodiment of the invention.

FIG. 1G depicts a system 130 which includes an optional enclosure 134 large enough to optionally include a computing unit (not shown, intended to be within the enclosure); as well as optical components such as coherent light sources, SLM(s), and optionally additional optical components as described below with reference to following Figures.

FIG. 1G also depicts an optional arm 136 from the enclosure 134 to a display screen 138, potentially containing optical components as described below with reference to following Figures. In some embodiments, the display screen 138 is a mirror, a partially transmitting/partially reflecting mirror, or a volumetric optical component, as described below with reference to following Figures. In some embodiments, the display screen is segmented into two or more display screens. In some embodiments, the display screen is segmented into two display screens, one for each eye. In some embodiments, the two display screens are mounted at different angles. In some embodiments, the location and orientation of the two display screens is configurable.

FIG. 1G also depicts one or more optional handle(s) 142.

FIG. 1G also depicts a viewer 140 using the system 130.

The term "display" is used throughout the present specification and claims to mean at least a display such as a "head mounted display" as depicted in FIGS. 1A-1B and a display on an adjustable arm as depicted in FIGS. 1C-1G.

Figure 2:
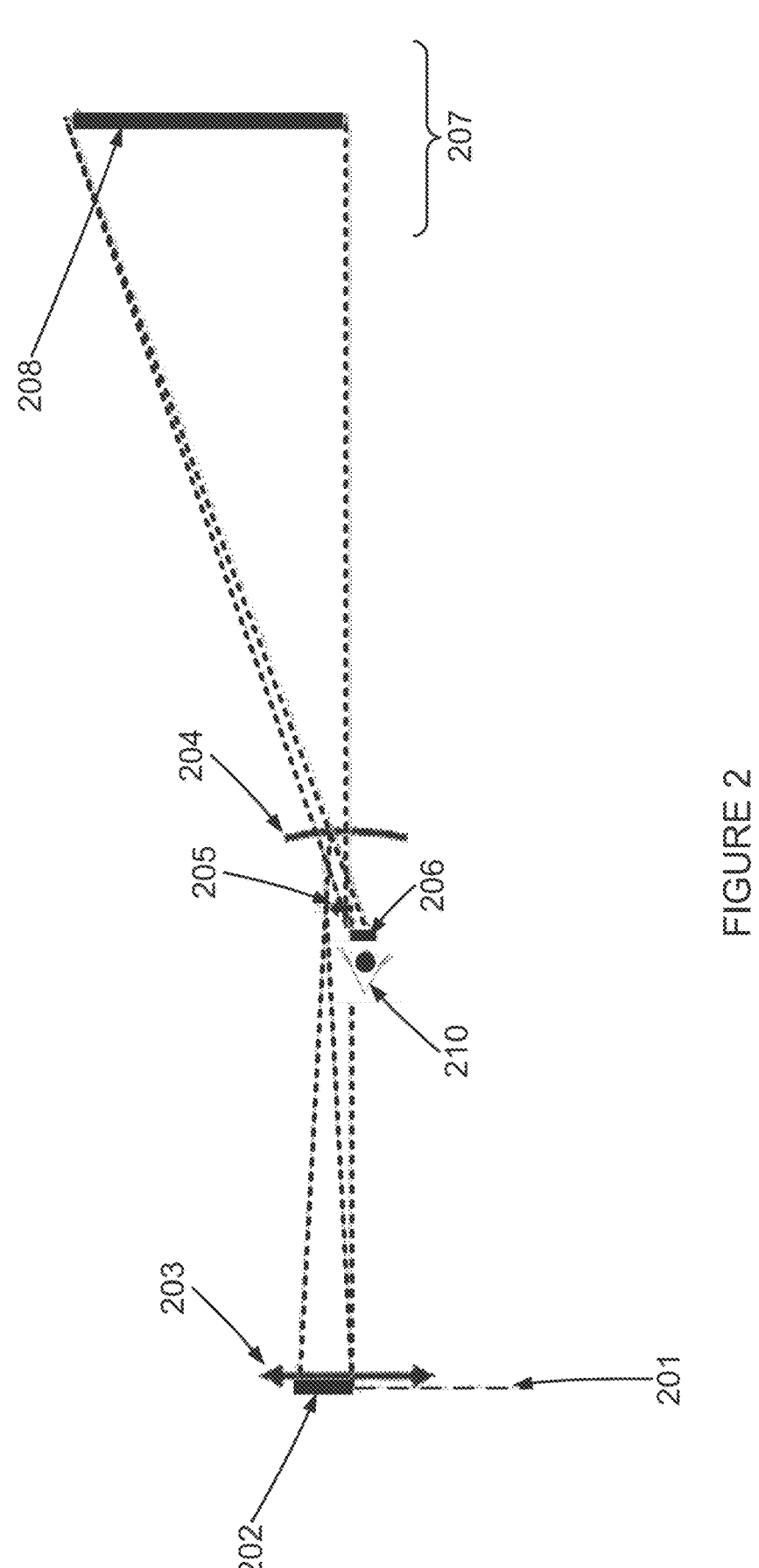
FIG. 2 is a simplified illustration of an optical path in a HMD according to an example embodiment of the invention.

Reference is now made to FIG. 2, which is a simplified illustration of an optical path in a HMD according to an example embodiment of the invention.

FIG. 2 is a simplified ray trace illustration of an optical path of an example embodiment of the invention, before folding the optical path to suit a HMD. FIG. 2 illustrates a few optical principles used in the example embodiment of FIG. 2.

FIG. 2 depicts an optional optical configuration depicted on-axis, for clarity and ease of explanation.

FIG. 2 depicts SLM 202; a focusing lens 203; and a partially-reflecting curved mirror 204.

In some embodiments, the lens 203 is placed next to the SLM 202, providing a case of lensless Fourier transform holography.

In some embodiments, the lens 203 is optionally not present, and the SLM 202 is illuminated by light having a spherical wavefront.

When coherent light (not shown) is modulated by the SLM 202, a Computer Generated Holographic (CGH) image 205, for example a first Fourier holographic image, is formed by the lens 203. The partially-reflecting/partially transmitting curved mirror 204 re-images the CGH image 205 and forms a holographic virtual image at a second location 207, while an image 206 of the SLM 202 is also imaged, in front of the viewer's eye.

In some embodiments, the first CGH image 205 is a holographic real image. In some embodiments, the first CGH image 205 includes a zero-order bright spot. In some embodiments, the zero-order bright spot is suppressed by placing a non-transmissive barrier (a dark spot); at a location of the zero-order bright spot at the first CGH image 205. In some embodiments, the first CGH image 205 is optionally formed at a mirror and a hole is made in the mirror through which the zero order energy passes through and out of the optical path. Optionally the mirror is a partially-transmissive mirror, and a dark spot barrier is located on the mirror and absorbs the zero order energy.

In some embodiments, an apodization filter is placed at a vicinity the SLM or at the vicinity of image of the SLM in order to reduce a zero order spot size.

In some embodiments, a CGH image may be formed surrounding a zero order bright spot location. In some embodiments, the CGH image is shifted sideways from the zero order bright spot location by calculating and projecting the CGH image only at the shifted location. Thus, the CGH image is not at a same location as the zero order spot, and the zero order spot does not ruin the CGH image.

A computer generated hologram (CGH) image is three dimensional, and a CGH scene has a depth dimension as well as side to side dimensions. A zero order bright spot appears at a specific plane along the depth dimension.

In some embodiments, a CGH scene is calculated and the CGH image is projected so that the scene displayed is at a distance beyond the zero order bright spot location. In some embodiments, a CGH scene is calculated and the CGH image is projected so that the scene displayed is at a distance before the zero order bright spot location. In some embodiments, a CGH scene is calculated and the CGH image is projected so that some planes of the scene displayed are at a distance beyond the zero order bright spot location, and some planes of the scene displayed are at a distance before the zero order bright spot location.

Various methods and devices for suppressing a zero order bright spot are also described in above-mentioned U.S. Provisional Patent Application titled "ZERO ORDER SUPPRESSION FOR HOLOGRAPHIC IMAGING".

In some embodiments, the image 206 of the SLM 202 is at a location, or a plane, of a viewer's eye 210, or close to the viewer's eye 210.

The partially-reflecting/partially-transmitting mirror 204 also re-images the CGH image 205 to form a second virtual CGH image 208 at a location 207. It is noted that the location of the second virtual CGH image 208, relative to the viewer's eye, is beyond the last optical element in the unfolded depiction of the example embodiment of FIG. 2.

It is noted that the image 206 of the SLM 202 defines an observing window or viewing window for the viewer's eye 210 to view the CGH image 208.

In some embodiments, the optical parameters of the optical system of FIG. 2 are selected to be such that the location 207 of the second CGH image 208 appears to a viewer to be within arm's reach of the viewer, for example between 15 centimeters and 2 meters from the viewer's eye. Optionally the CGH image may be imaged at distances closer than hand reach relative to the viewer. Optionally the CGH image may contain multiple focal planes relative to the viewer's point of view, optionally projected in parallel as part of one or more CGH images produced by the system. Optionally, multiple planes of the CGH image may be at any distance, including closer than hand reach and up to optical infinity.

In some embodiments a tilt-adjustable mirror, or an equivalent adjustable optical component, is placed at a location of the CGH image 205 in order to enable directing the re-imaging of the second virtual CGH image 208 to be seen by the viewer's eye 210, even if the viewer's eye 210 shifts in relation to the optical system.

In some embodiments a tilt-adjustable mirror, or an equivalent adjustable optical component, is placed at a location of the SLM 202 in order to adjust for changes in orientation of the optical system, which may be moved by its user, relative to a desired position for the second virtual CGH image 208.

In some embodiments a tilt-adjustable mirror, or an equivalent adjustable optical component, is placed at a location of the CGH image 205 in order to optionally adjust for changes in orientation of the optical system, which may be moved by its user, relative to a desired position for the second virtual CGH image 208.

In some embodiments, one or both of the SLM 202 and the lens 203 are optionally tilt-adjustable in order to adjust for changes in orientation of the optical system, which may be moved by its user, relative to a desired position for the second virtual CGH image 208.

It is noted that in the present specification description is provided of optical systems for displaying a CGH image to an eye. Even where not explicitly described, it is to be understood that two such optical systems are meant to be displaying two CGH images to two eyes. In some embodiments, the two CGH images are displayed at a same location and orientation in space relative to a viewer's eyes, to appear as a single image merged by the viewer into one apparent 2D or 3D image. In some embodiments, the two CGH images are two images displayed in a visual field of the viewer, with one eye viewing one CGH image, and a second eye viewing a second CGH image. Optionally, at least part of the optical path can be common to the right and left eye of the viewer.

Figure 3A:
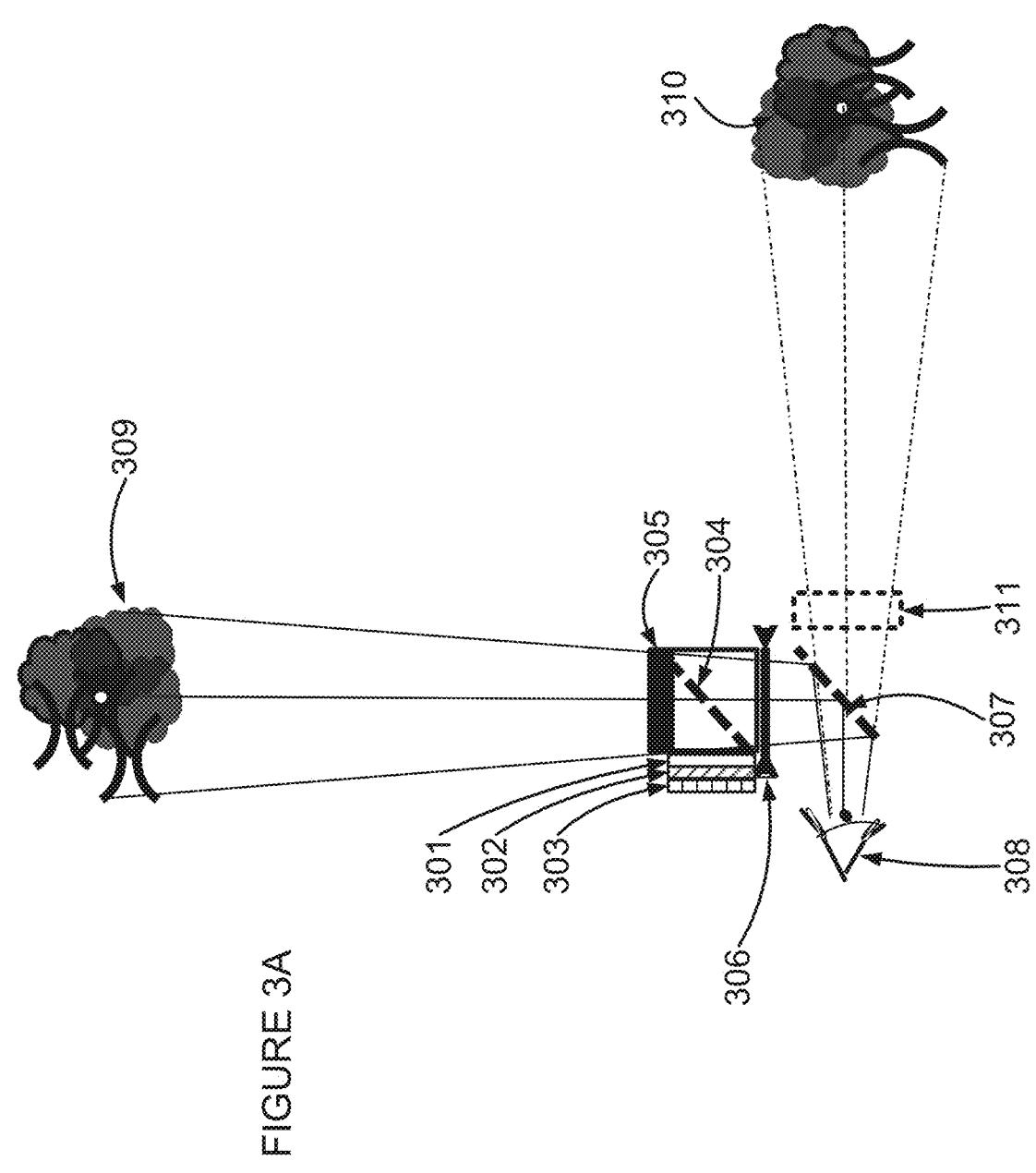
FIG. 3A is a simplified illustration of an optical system according to an example embodiment of the invention.

Reference is now made to FIG. 3A, which is a simplified illustration of an optical system according to an example embodiment of the invention.

FIG. 3A depicts a system with an optical path for producing a CGH image which appears to a viewer to be floating in space directly in front, while most of the components of the system are off to the side.

FIG. 3A depicts a source of coherent light, or, in some embodiments, more than one source of coherent light, projecting coherent light onto a partly reflecting/partly transmitting mirror 304, which reflects the light onto SLM 305.

The SLM 305 is optionally controlled by a computing unit (not shown).

Light reflected from the SLM 305 passes through the partly reflecting/partly transmitting mirror 304, and optionally through additional optical component(s) 306.

Light passing through the additional optical component(s) 306 produces a first CGH image 309, if a viewer were to look toward the optical component(s) 306.

The light passing through the additional optical component(s) 306 is reflected off a mirror 307 and onto a viewer's eye 308.

The viewer sees a second CGH image 310 as floating in space directly in front of the viewer. The mirror 307 has redirected light from a location of a first CGH image 309, and caused the first CGH image 309 to appear at a location of the second CGH image 310, in front of the viewer.

In some embodiments, the first CGH image 309 is a holographic virtual image.

In some embodiments the second CGH image 310, which is the re-directed first CGH image 309, is a holographic virtual image.

Optionally the CGH image contains multiple simultaneous focal planes, that is, objects in focus at multiple distances from the viewer's eye, similarly to real objects in real space at multiple distances. Optionally, the multiple depth focal planes are produced and projected simultaneously. Optionally the focal planes appear at an apparent distance from several centimeters from the viewer and up to optical infinity.

It is noted that in some embodiments three light sources 301 302 303 are used, optionally Red 301 Green 302 Blue 303, in order to produce a color CGH image. In some embodiments, another three-color combination, even a four color, or more combination may be used to produce a color CGH image.

It is noted that in some embodiments the source of coherent light is optionally a laser.

It is noted that the computing unit may optionally be part of a HMD or display, as depicted in FIGS. 1A-1B and 1C-1G, or the computing unit may be separate, communicating with the SLM and providing values for setting pixels of the SLM.

In a simple example embodiment, the additional optical component(s) 306 may optionally be one lens 306, optionally one negative lens 306.

In some embodiments, the mirror 307 may be fully reflective, in which case the viewer's view may optionally include only the CGH image 310, in a scenario sometimes termed "virtual reality".

In some embodiments, the mirror 307 may be a partly reflecting/partly transmitting mirror 307, in which case the viewer's view may optionally include seeing real space in front of the viewer's eye as well as seeing the CGH image 310, in a scenario sometimes termed "augmented reality".

In some embodiments, the partly reflecting/partly transmitting mirror 307 may be a chroic mirror, which reflects at specific wavelengths, and lets light at other wavelengths through. Such a mirror 307 potentially directs most of the colors used to produce the CGH image onto the eye 308, and potentially attenuates little brightness of a full-color scene through the mirror 307. Such a setup can potentially lead to a brightest CGH image/real world scene combined view, at least as far as an effect of the mirror 307 is concerned.

The terms "chroic mirror" is used herein as a mirror which reflects at specific wavelengths, and lets light at other wavelengths through, or conversely, lets light through at specific wavelengths, and reflects at other wavelengths.

In some embodiments, an additional optional component, such as a liquid crystal display 311, is optionally located between an apparent location of the second CGH image 310 and the viewer's eye 308. The liquid crystal display 311 is controlled to optionally block light from a direction of the apparent location of the second CGH image 310 to the viewer's eye 308, and optionally allow light through surrounding the second CGH image 310. The second CGH image 310 is optionally displayed on a dark background. Such blocking potentially increases a contrast between the second CGH image 310 and a background (not shown) of the second CGH image 310, while optionally allowing an unblocked normal viewing of a background surrounding the second CGH image 310.

In some embodiments, optical elements along the path from the SLM 305 to the eye 308 also produce an image (not shown) of the SLM 305 in front of the viewer's eye 308.

In some embodiments, the optical parameters of the optical elements of FIG. 3A are selected to be such that a location of the second CGH image 310 appears within arm's reach of the viewer.

In some embodiments, an optional additional optical component 311 is added between the partially-reflecting/partially transmitting mirror 307 and the second CGH image 310, or an equivalent optical element in other example embodiments such as the curved mirror 204 in FIG. 2. The optional additional optical component enables optional controllable selective shading or complete blocking of parts of a view of the real world in order to avoid an overlap with the second CGH image 310 when the second CGH image 310 should appear as covering over or shading a part of the real world. The optional additional optical element does not block the second CGH image 310 which reflects to the eye 308 without passing through the optical element.

Additional description of example embodiments of a background blocking component such as the optical component 311 is provided below in a section titled "Background Blocking".

In some embodiments the additional optical component is a transparent display, such as an electrically controlled liquid crystal between cross polarizes, optionally without colored pixels as in conventional liquid crystal displays, which can obstruct or lower intensity of a portion of the real world.

Figure 3B:
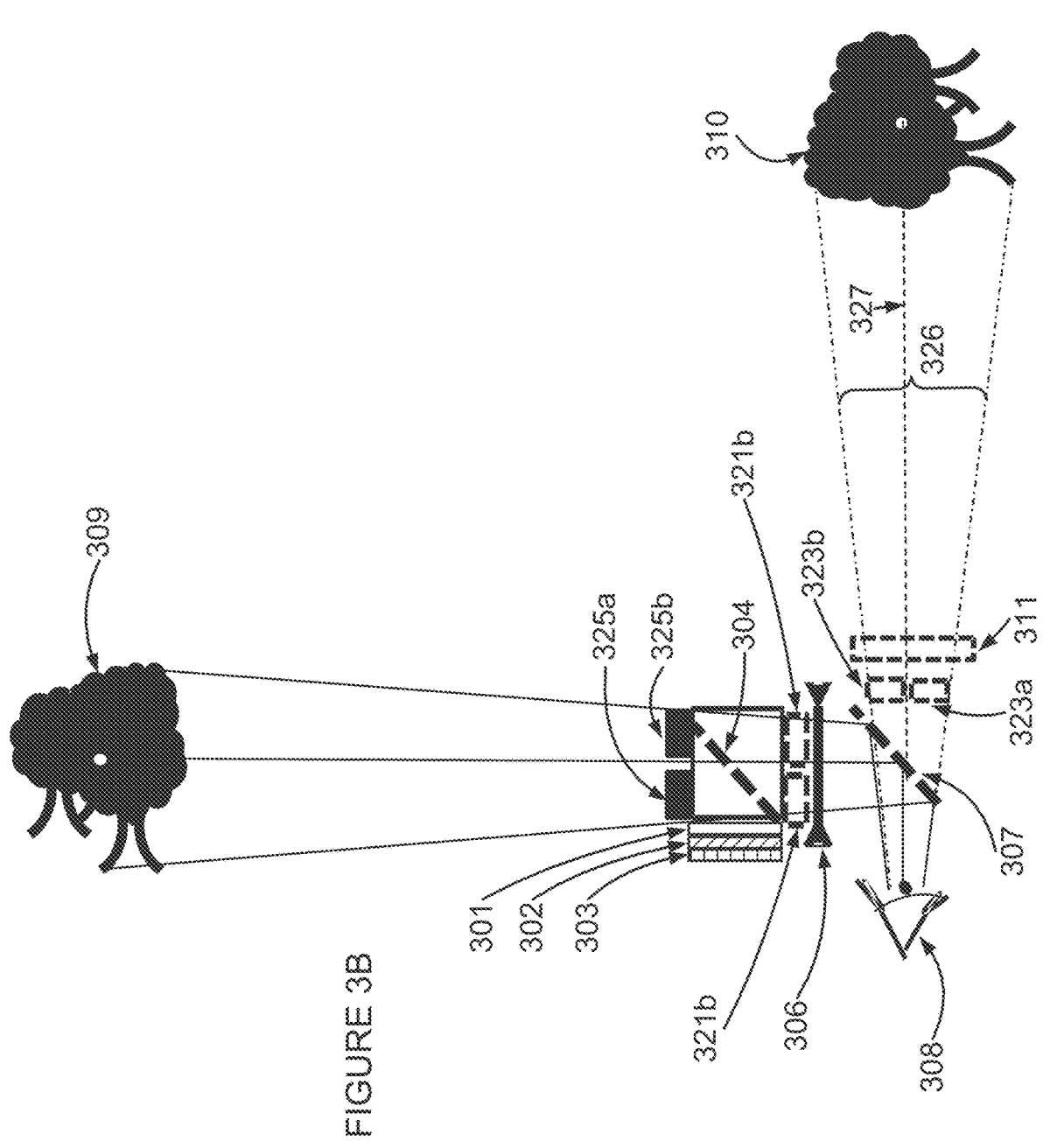
FIG. 3B is a simplified illustration of an optical system using a plurality of SLMs according to an example embodiment of the invention.

Reference is now made to FIG. 3B, which is a simplified illustration of an optical system using a plurality of SLMs according to an example embodiment of the invention.

FIG. 3B depicts a system which exemplifies how using more than one SLM may be used in such a system. FIG. 3B depicts a configuration similar to the configuration of FIG. 3A, yet with a plurality of SLMs 325a 325b.

Components of the system of FIG. 3B are marked with same reference numbers as in FIG. 3A, except that an example of two SLMs 325a and 325b are depicted at a location where one SLM 305 was depicted in FIG. 3A.

The optical elements along the path from the SLMs 325a 325b to the eye 308 produce images of the SLMs 321a 321b along the path from the SLMs 325a 325b to the eye 308.

The images of the SLMs 321a 321b appear to the viewer's eye 308 as viewing windows 323a 323b apparently around a line of sight 327 between the viewer's eye 308 and the second CGH image 310.

The images of SLMs 321a 321b are each an observation window through which the CGH image 310 may be viewed by the viewer's eye 308.

Using more than one SLM 325a 325b next to each other can produce more than one observation window next to each other, thereby enlarging a total area of an effective observation window.

The multiple SLMs may be arranged next to each other in an array, or 1×2 SLMs, 1×3 SLMs, 2×2 SLMs, and, in general, M×N SLMs, where the numbers M and N may be in a range of 1 to at least 10 or 100 or 1,000, and M may be equal or not equal to N.

An array of SLMs can optionally be used to increase an image size and/or to increase an observation window size, the observation window being an image of the SLM array.

Figure 4A:
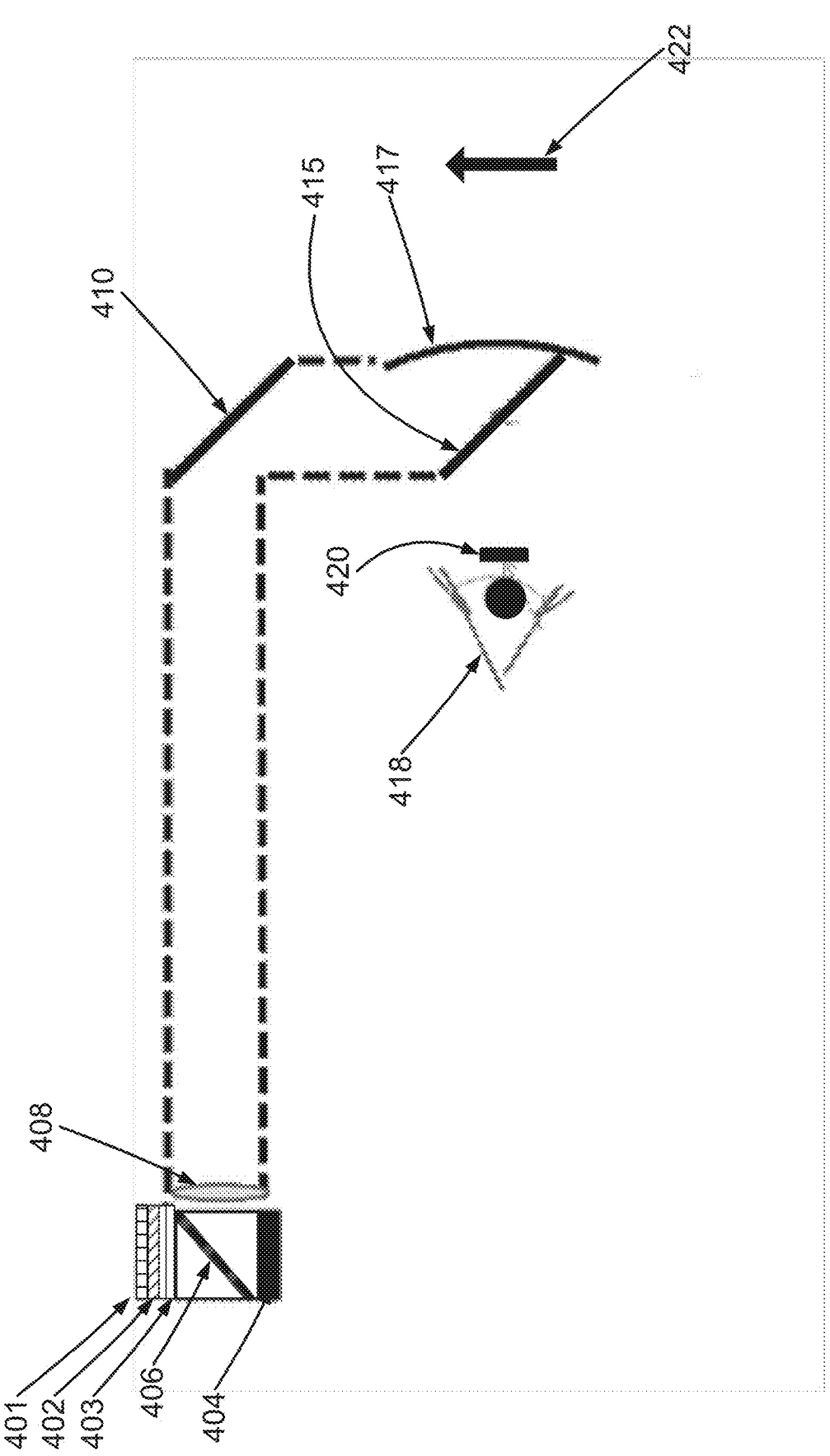
FIG. 4A is a simplified illustration of an optical system in a HMD according to an example embodiment of the invention.

Reference is now made to FIG. 4A, which is a simplified illustration of an optical system in a HMD according to an example embodiment of the invention.

FIG. 4A depicts how a three-color CGH image may be produced.

FIG. 4A depicts a folded optical path which corresponds to locating SLM alongside and/or above a viewer's head, projecting light forward, and folding the optical path to project into the viewer's eye.

FIG. 4A depicts blocks representing coherent light sources in the three colors: a red coherent light source 401, a green coherent light source 402, and a blue coherent light source 403; SLM 404; a partially-reflecting/partially-transmitting mirror 406; a lens 408; a mirror 410; a second partially-reflecting/partially-transmitting mirror 415; and a trichroic (red-green-blue) RGB curved reflector 417, transparent at wavelengths of colors other than RGB.

In some embodiments, the three light sources 401 402 403 are optionally operated sequentially, one at a time, and the SLM 404 is set to pixel values corresponding to each one of the three colors separately.

In some embodiments a rate of cycling through the three colors is optionally 5 full cycles (three colors) per second, 8 full cycles per second (cps), 15 cps, 20 cps, 24 cps, 25 cps, 30 cps, 50 cps, 60 cps, 100 cps and greater.

Coherent light in one, two, or even three colors, from the coherent light sources 402 403 404 is optionally projected through the partially-reflecting/partially-transmitting mirror 406 onto the SLM 404, optionally in a sequential order. The SLM 404 modulates the coherent light, producing a CGH image in the three colors, optionally in a sequential order, optionally synchronized with the illumination order. The CGH image is projected from the SLM 404 to the partially-reflecting/partially-transmitting mirror 406, and reflected from the partially-reflecting/partially-transmitting mirror 406, through the lens 408, toward the mirror 410, from there to the second partially-reflecting/partially-transmitting mirror 415, and reflected from the second mirror 415, where a Fourier CGH image is optionally formed, onto the trichroic (red-green-blue) RGB reflector curved 417, and the three-color CGH image is re-imaged and reflected from the trichroic (red-green-blue) RGB curved reflector 417, through the second partially-reflecting/partially-transmitting mirror 415, onto the viewer's eye 418.

From the viewer's eye 418 the CGH re-image appears to be floating in the air in the line of sight of the viewer, while the viewer's looking direction is toward the trichroic (red-green-blue) RGB reflector 417. In some embodiments, the mirror 417 also images the lens 408 to the viewer's eye 418. Between the SLM 404 and the lens 408, an infinity optics region exists, and the SLM 404 is effectively imaged on the viewer's eye 418 forming an observing window 420. Optionally the RGB reflector 417 images the SLM 404 to the viewer's eye. Optionally the trichroic mirror 417 reflects at narrow RGB wavelengths of light, optionally RGB specific wavelengths with a breadth of a few nano-meters or a few tens nano-meters, and therefore while the RGB waves are reflected to the viewer's eye creating the CGH image, the viewer can still see scenery in front as the reflector also acts as a transmitting element for much of the visible spectrum.

In some embodiments, the viewer also sees a view of the real world straight through the second partially-reflecting/partially-transmitting mirror 415 and through the trichroic (red-green-blue) RGB reflector 417. When a CGH image 422 is projected by the HMD system of FIG. 4A, the viewer sees the CGH image floating in the air as well as a view of the real world.

In some embodiments, the trichroic (red-green-blue) RGB reflector 417 is a reflector partially-reflecting in all wavelengths.

In some embodiments, the trichroic (red-green-blue) RGB reflector 417 is a reflector fully reflecting in all wavelengths, and the viewer sees a CGH image floating in the air but does not have a view of the real world.

In some embodiments, the optical elements along the path from the SLM 404 to the eye 418 also produce an image of the SLM 404 and/or lens 408 at the viewer's eye 418, which is the above-mentioned observing window 420.

In some embodiments, the optical parameters of the optical elements of FIG. 4A are selected to be such that a location of the CGH image appears within arm's reach of the viewer.

In some embodiments, the CGH image is a holographic virtual image.

Figure 4B:
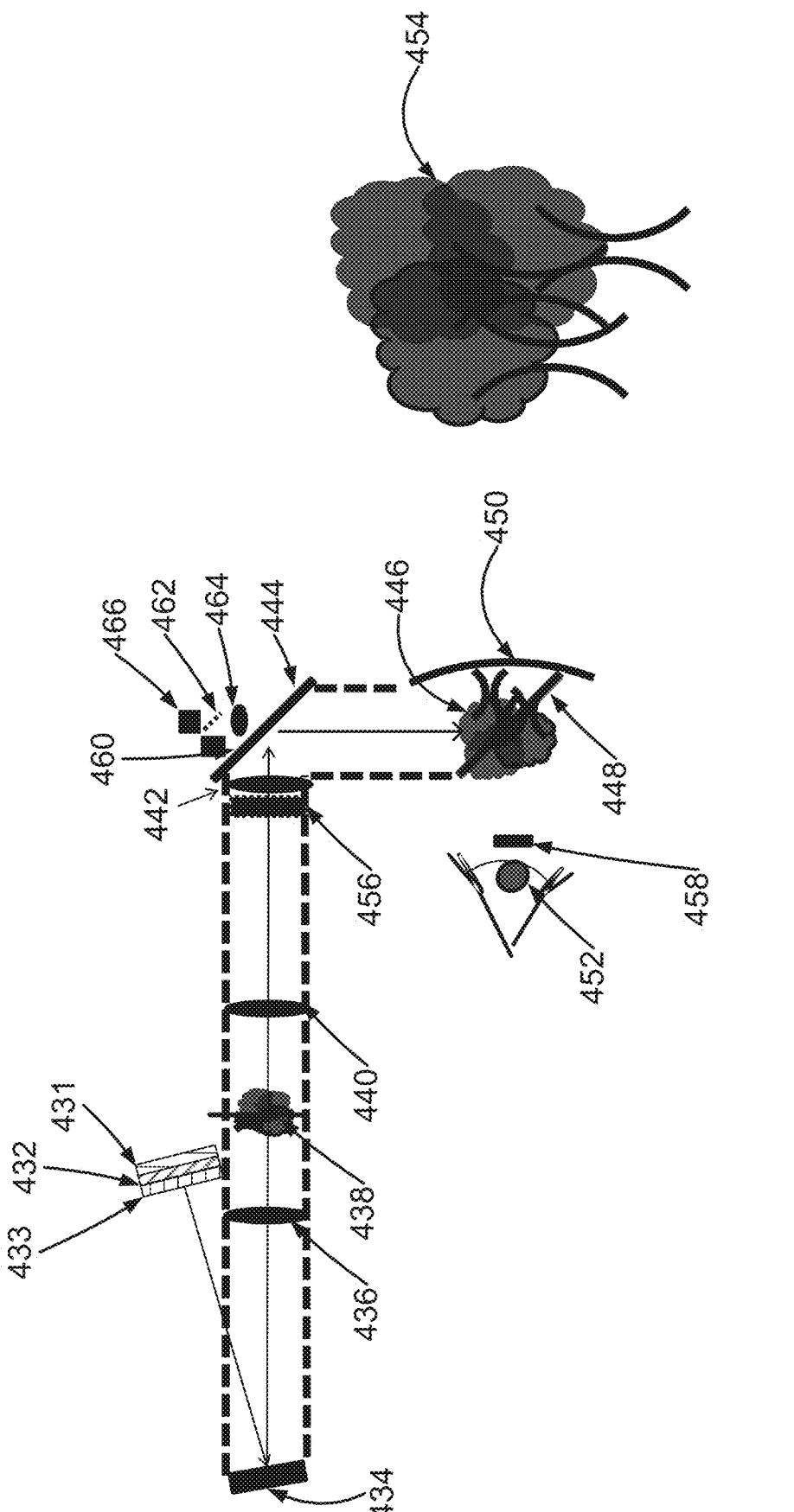
FIG. 4B is a simplified illustration of an optical system in a HMD according to an example embodiment of the invention.

Reference is now made to FIG. 4B, which is a simplified illustration of an optical system in a HMD according to an example embodiment of the invention.

FIG. 4B depicts an example embodiment showing how a three-color CGH image may be produced.

FIG. 4B depicts an optical path starting at three sources of coherent light at three colors: a red source 431; a green source 432; and a blue source 433. The three sources of coherent light 431 432 433 illuminate SLM 434 at an angle, and the light is reflected toward a first lens 436. A first, optionally three-colored, CGH image 438 is formed after the first lens 436. In some embodiments, the SLM may optionally be a transmissive SLM (not shown in FIG. 4B).

In some embodiments, the first CGH image 438 optionally includes a zero-order bright spot. In some embodiment, a transparent optical element (not shown, so as not to interfere with showing the first CGH image 438) having a non-transparent spot for blocking the zero-order bright spot is placed at a location of the first CGH image 438.

Light continues to propagate, through a second lens 440, and optionally forming an image of the SLM at a vicinity of a third lens 442, and continues to propagate off a diagonal mirror 444, and produce a CGH image 446. The CGH image 446 is located at a location of a second diagonal mirror 448.

In some embodiments, the second lens 440 is selected to produce Fourier holographic image as the second CGH image 446.

In some embodiments, the second diagonal mirror 448 is a partially-reflecting/partially-transmitting mirror.

Light continues to propagate, so the CGH image 446 is re-imaged by reflection off the partially-reflective second diagonal mirror 448 onto a trichroic RGB (Red-Green-Blue) curved reflector 450 which reflects at the three red-green-blue source wavelengths and is transparent at other wavelengths. The light continues through the partially-transmissive second diagonal mirror 448 onto a viewer's pupil 452. The viewer sees an apparent CGH image 454 floating directly ahead, in the direction of the trichroic RGB curved reflector 450.

In some embodiments, the three coherent light sources 431 432 433 are optionally operated sequentially, one at a time, and the SLM 434 is set to pixel values corresponding to each one of the three colors separately.

In some embodiments a rate of cycling through the three colors is optionally 5 full cycles (three colors) per second, 8 full cycles per second (cps), 15 cps, 20 cps, 24 cps, 25 cps, 30 cps, 50 cps, 60 cps, 100 cps and greater.

In some embodiments, the viewer also sees a view of the real world straight through the partially-transmissive second diagonal mirror 448 and the trichroic RGB curved reflector 450, since the above-mentioned optical elements are partially-transmissive and transmissive at most wavelengths respectively.

In some embodiments, the optical elements along the path from the SLM 434 to the pupil 452 also produce a first image 456 of the SLM 434 following the second lens 440, and a second image 458 of the SLM 434 is produced by re-imaging the first image 456 of the SLM 434 by curved reflector 450. The second image 458 of the SLM 434 is produced adjacent to or even right on the viewer's pupil 452, even if it does not appear so in FIG. 4B, for the sake of clarity. Optionally the second image 458 is at a vicinity of the viewer's pupil 452. Optionally the lens 442 is imaged to the viewer's pupil 452. It is noted that the second image 458 of the SLM 434 is an observing window such as the observing window 420 of FIG. 4A.

In some embodiments, an adjustable optical component is placed at a location of the image 456 of the SLM 434 in order to adjust for changes in orientation of the optical system, which may be moved by its user, relative to a desired position for the second virtual CGH image 458.

FIG. 4B also depicts components of the HMD used for tracking a location of a viewer's pupil in conjunction with some of the components used for displaying a CGH image.

FIG. 4B depicts a light source 460 for illuminating the viewer's pupil 452, a partially-reflecting/partially-transmitting mirror 462, a lens 464, and a light reception component 466 (a sensor). The mirror 444 is at least partially transparent at the wavelength of the light source 460. The curved trichroic RGB reflector 450 is also reflective at the wavelength of the light source 460. Optionally the reflector 450 is reflective at the wavelength of the light source 460, optionally at Near-Infra-Red wavelength.

In some embodiments, the light source 460 produces Near Infra-Red (Near-IR, or NIR) light. In some embodiments the light reception component 466 (sensor) is designed to detect NIR.

Light from the light source 460 is optionally projected onto the partially-reflecting/partially-transmitting mirror 462; reflected from the partially-reflecting/partially-transmitting mirror 462, through the lens 464, through the mirror 444 onto the second diagonal mirror 448, to the trichroic (red-green-blue) RGB and Near-IR reflector 450; reflected back from the trichroic (red-green-blue) RGB and Near-IR reflector 450 through the second diagonal mirror 448 towards the viewer's eye area approximately at the pupil 452.

In some embodiments, an area in the vicinity of the eye is illuminated and imaged by the Near-IR tracking system. Optionally, the area is between 1 mm$^2$ and 200 mm$^2$.

Light reflected from the viewer's eye or pupil 452 passes through the second diagonal mirror 448; to the trichroic (red-green-blue) RGB and Near-IR reflector 450, which also reflects wavelengths of the light source 460; is reflected back from the trichroic (red-green-blue) RGB and Near-IR reflector 450 onto the second diagonal mirror 448; reflected from the second diagonal mirror 448 to the mirror 444; passes through the mirror 444, through the lens 464, through the partially-reflecting/partially-transmitting mirror 462, onto the light reception component 466.

Non-limiting examples of embodiments contemplated for the light reception components 466 include a camera and a quadrant detector.

In some embodiments, the light reception component 466 is a camera, and a location of the pupil is obtained by image processing, by detecting the pupil.

In some embodiments, calculating a viewing portion of a CGH image may optionally be done by monitoring, in a viewer's eye or eyes, pupil location with respect to the eye ball.

In some embodiments, an observation direction is optionally calculated by triangulation to determine a location of the portion of a CGH image which is observed. A reference to such a method may be found in above-mentioned article titled "Measuring Gaze Depth with an Eye Tracker During Stereoscopic Display" by Andrew T. Duchowski, Brandon Pelfrey, Donald H. House, and Rui Wang.

In some embodiments tracking a viewer's pupil is used for determining control signals to adjust an image so that the image appears static in space.

In some embodiments tracking a viewer's pupil is used for determining what part of a CGH image will be with high resolution (i.e. on a direct optical axis) while the rest of the image may potentially be calculated and projected at a lower resolution.

In some embodiments, when a viewer moves a pupil relative to the HMD, an optical component is optionally used to move an image of the SLM to remain at the viewer's pupil.

In some embodiments, when a viewer moves an eye relative to the HMD, an optical component is optionally used to move an image of the SLM to remain at the viewer's gaze direction.

In some embodiments, when a mirror or some other direction-shifting component in the optical system is used to shift a direction or a location of the image of the SLM, pixel values of the SLM are optionally re-calculated to produce a CGH image corrected for the shift.

In some embodiments, if a viewer's gaze direction moves within an observing window (image of the SLM), no re-calculation is used.

Figure 5:
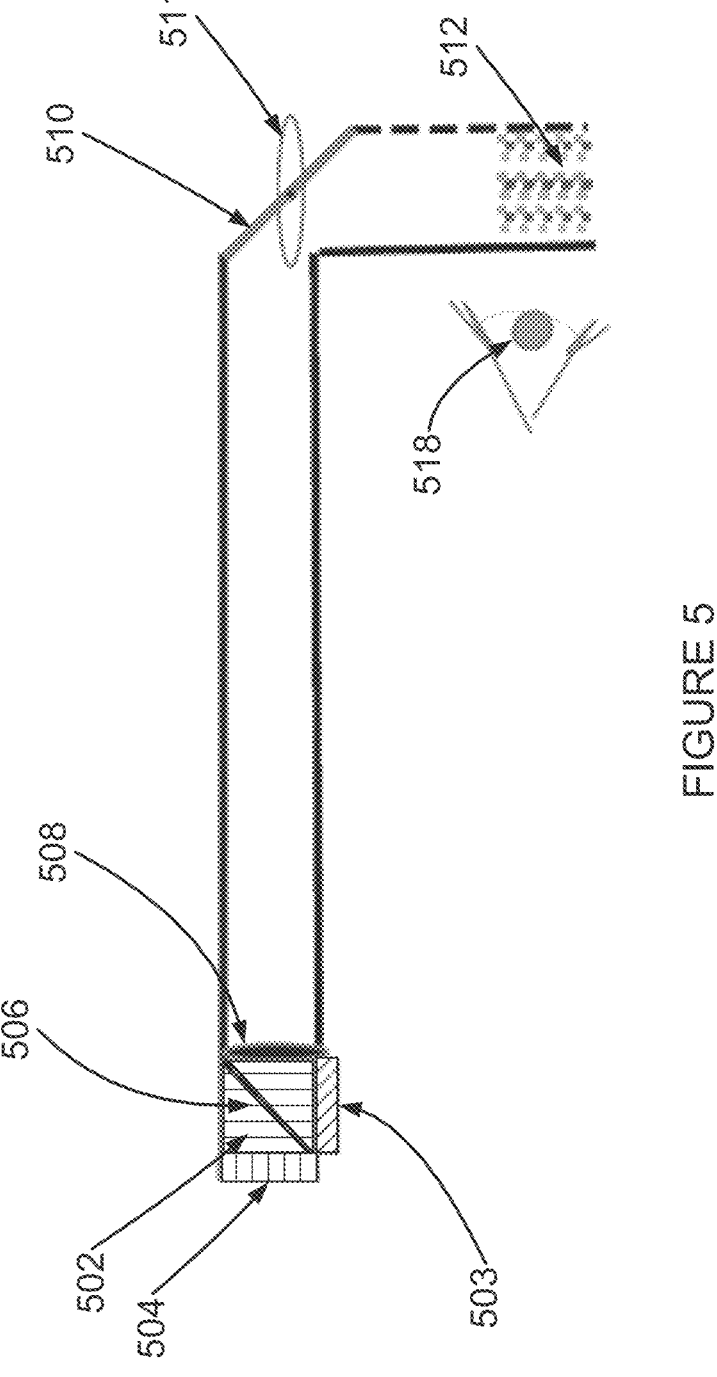
FIG. 5 is a simplified illustration of an optical system in a HMD according to an example embodiment of the invention.

Reference is now made to FIG. 5, which is a simplified illustration of an optical system in a HMD according to an example embodiment of the invention.

FIG. 5 depicts an example embodiment which includes a volumetric holographic element, optionally implemented in a planar waveguide, designed to manipulate three colors used for producing a CGH image, while allowing a viewer's eye to see a view of the real world through the volumetric holographic element. In some embodiments, the volumetric holographic element may be opaque to light impinging from the front, while reflecting light from the side, as depicted in FIG. 5 and described further below, such that a viewer can see a CGH image without seeing the real world ahead, as in an instance of a Virtual Reality display.

The volumetric holographic element of FIG. 5 may optionally be used as an optical element in other embodiments depicted herein, such as those in FIGS. 1A-1F, 3A-3B, 4A-4B, 6, 7, 8A-8C and 9A-9E.

FIG. 5 depicts blocks representing coherent light sources in the three colors, and coherent light from the three light sources is split to three SLMs: a red coherent light source (not shown) for red light reaching a red SLM 502, a green coherent light source (not shown) for green light reaching a green SLM 503, and a blue coherent light source (not shown) for blue light reaching a blue SLM 504; three partially-reflecting/partially-transmitting chroic mirrors 506 (one is shown) have a high reflection (e.g. 50% or greater) at a specific color and low reflection (significantly lower than 50%) at the other two colors; a lens 508; an optionally tilt-controlled mirror 510 and a volume holographic element 512 that is highly reflective at the RGB coherent wavelength and transparent to other wavelength. The volume holographic element 512 may be designed to have an optical power, and may optionally be used to replace the curved reflector 450 of FIG. 4B and the diagonal mirror 448 in FIG. 4B.

Coherent light in one, two, or even three colors, from the three SLMs 502 503 504 is optionally projected through the partially-reflecting/partially-transmitting chroic mirror 506. The SLMs modulate the coherent light, producing a CGH image in one, two, or three colors. The CGH image is projected from the SLM to the partially-reflecting/partially-transmitting chroic mirror 506, and reflected from the partially-reflecting/partially-transmitting chroic mirror 506 through a lens 508, toward the adjustable tilted mirror 510, where a CGH image 511 is formed. From the mirror 510 light reaches the volumetric holographic element 512, and is re-directed from the volumetric holographic element 512 onto a viewer's pupil 518 similarly to an effect of a reflecting mirror such as the mirror 307 depicted in FIGS. 3A and 3B.

In some embodiments the volumetric holographic element 512 optionally includes a holographic lens element which optionally also re-images images of the lens 508 to a location of the viewer's pupil 518. Optionally the holographic lens element also re-images the SLM to the viewer's pupil or close to the pupil. Optionally a distance between the SLM(s) 502 503 504 and the lens 508 is an infinity optics region, therefore imaging the lens 508 to the viewer's pupil 518 is effectively imaging the SLM(s) 502 503 504 to the viewer's pupil 518. Optionally the holographic lens element and the volumetric holographic element 512 are integrated as one optical element.

From the viewer's pupil 518 the CGH image appears to be floating in the air in front of the viewer, in a direction toward the volumetric holographic element 512.

In some embodiments, the viewer also sees a view of the real world straight through the volumetric holographic element 512, similarly to, for example, FIGS. 3A and 3B, 4A and 4B. When a CGH image is projected by the HMD system of FIG. 5, the viewer sees the CGH image floating in the air as well as a view of the real world.

In some embodiments, the volumetric holographic element 512 is selected to deflect trichroic (red-green-blue) RGB light by approximately 90 degrees, and allow other colors of light, such as from real world scenery in front of the viewer, to go straight through towards the viewer's eye. In some embodiments, the volume holographic element 512 also reflects Near-IR radiation.

In some embodiments, the volumetric holographic element 512 deflects all colors by approximately 90 degrees, and does not provide a viewer with a view of the real world.

In some embodiments, the optical parameters of the optical elements of FIG. 5 are selected to be such that a location of the CGH image appears within arm's reach of the viewer. However, the CGH image can be closer than arm's reach or further away than arm's reach.

In some embodiments, the CGH image is a holographic virtual image.

Figure 6:
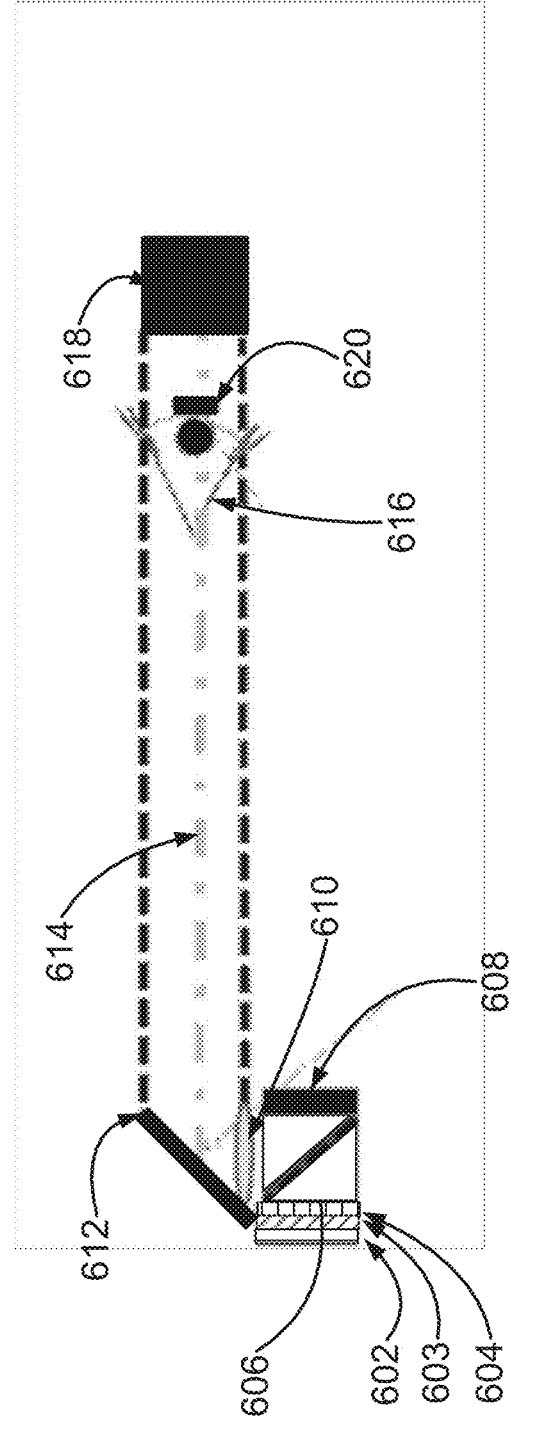
FIG. 6 is a simplified illustration of an optical system in a HMD according to an example embodiment of the invention.

Reference is now made to FIG. 6, which is a simplified illustration of an optical system in a HMD according to an example embodiment of the invention.

FIG. 6 depicts an optional side view of an example embodiment, with SLM depicted lower than the viewer's eye, and an optical path from a mirror adjacent to the SLM to the viewer's eye at a same height as the viewer's eye.

FIG. 6 depicts blocks representing coherent light sources in the three colors: a red coherent light source 602, a green coherent light source 603, and a blue coherent light source 604; a partially-reflecting/partially-transmitting mirror 606; a SLM 608; a lens 610; a mirror 612; and an optical path 614 from the mirror 612 to optical components (not detailed in FIG. 6 so as to prevent confusion in the side view depiction) which direct light toward a viewer's eye 616. One optional optic component which may optionally be used as part of a path to direct light toward the viewer's eye 616 is depicted as a block representing a trichroic (red-green-blue) RGB reflector 618, optionally transparent at wavelengths of colors other than RGB.

Coherent light in one, two, or even three colors, from the coherent light sources 602 603 604 is optionally projected through the partially-reflecting/partially-transmitting mirror 606 onto the SLM 608. The SLM 608 optionally modulates the coherent light, producing a CGH image in the three colors. The CGH image is projected from the SLM to the partially-reflecting/partially-transmitting mirror 606, and reflected from the partially-reflecting/partially-transmitting mirror 606 through the lens 610 and toward the mirror 612, from there to optical components which direct light toward the viewer's eye 616.

From the viewer's eye 616 a CGH image (not shown in FIG. 6) appears to be floating in the air in front of the viewer.

In some embodiments, the viewer also sees a view of the real world straight through those of the optical components which direct light toward the viewer's eye 616 and are in front of the viewer, such as, by way of a non-limiting example, the trichroic (red-green-blue) RGB reflector 618. When a CGH image is projected by the HMD system of FIG. 6, the viewer sees the CGH image floating in the air as well as a view of the real world.

In some embodiments, the optical elements along an optical path from the SLM to the eye also produce an image 620 of the SLM at the viewer's eye 616 or close to the viewer's pupil.

It is noted that the image 620 of the SLM and the viewer's eye 616 as depicted in FIG. 6 are on a different plane than other components depicted in the side view depiction of FIG. 6. The image 620 of the SLM and the viewer's eye 616 are higher, in the side view of FIG. 6, than the other components.

In some embodiments, the optical parameters of the optical elements of FIG. 6 are selected to be such that a location of the CGH image appears within arm's reach of the viewer.

In some embodiments, the CGH image is a holographic virtual image.

In some embodiments, a controller optionally controls tilt of the mirror 612, which shifts a direction in which the image 620 of the SLM 608 appears relative to the viewer's pupil 616. In some embodiments, changing the direction in which the image 620 of the SLM 608 appears relative to the viewer's pupil 616 is used to stabilize a CGH image appearance against a change in orientation of the HMD.

In some embodiments, changing the direction in which the image 620 of the SLM 608 appears relative to the viewer's pupil 616 is used to expand an effective field of view of the CGH image to be greater than an instantaneous field of view of the CGH image.

Optionally, the mirror 612 is jittered rapidly, such as 5, 10, 15, 20, 25 30, 60 or even more times per second, and the viewer's eye perceives an effective field of view greater than an instantaneous field of view.

In some embodiments, controlling the tilt of the mirror 612 is optionally performed in two dimensions, optionally corresponding to left-right and up-down. In some embodiments, controlling the tilt of the second mirror 612 is optionally performed based on control instructions from a processor (not shown).

Figure 7:
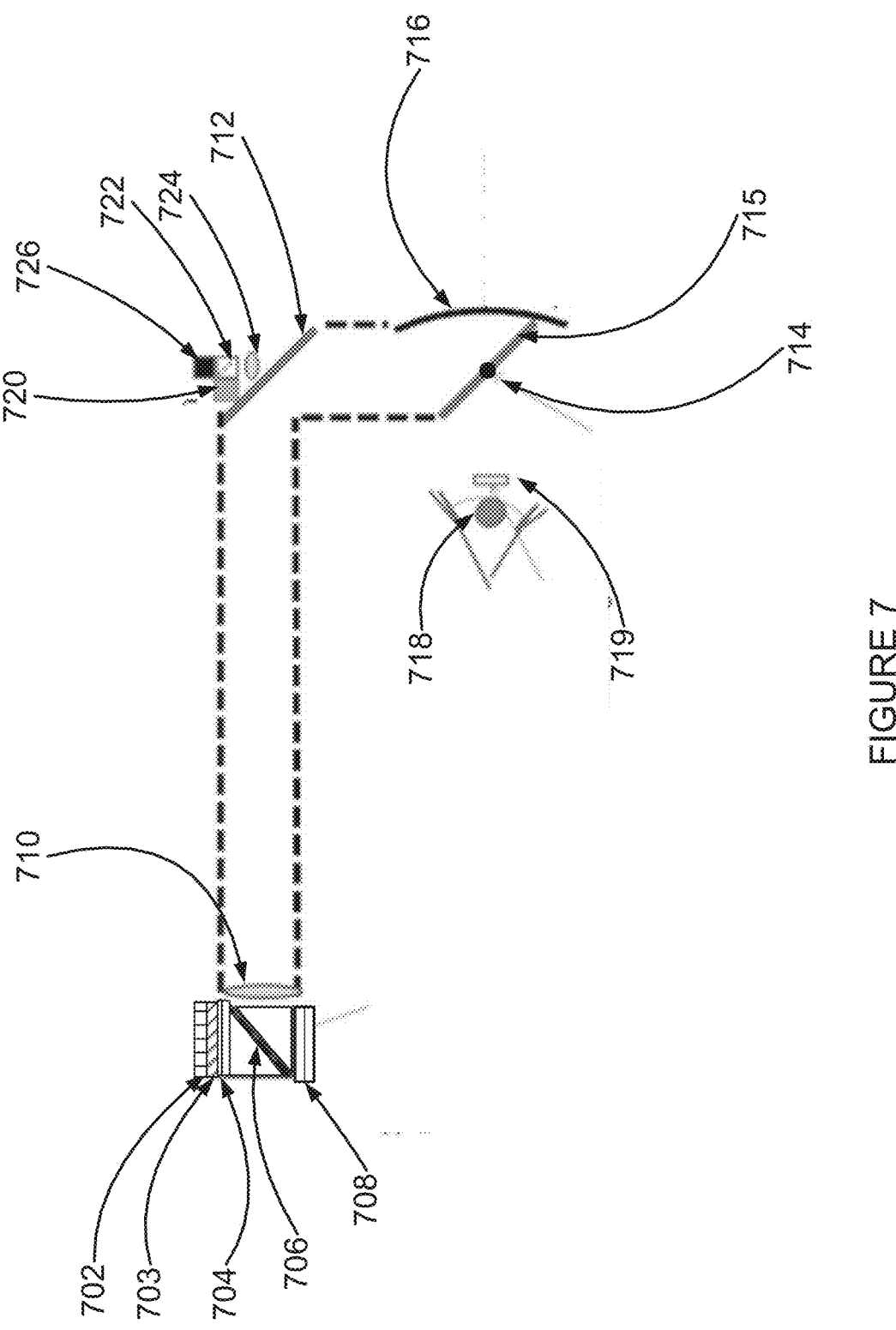
FIG. 7 is a simplified illustration of pupil tracking in a HMD according to an example embodiment of the invention.

Reference is now made to FIG. 7, which is a simplified illustration of an optical system in a HMD according to an example embodiment of the invention.

FIG. 7 depicts an example embodiment with further details provided on components for tracking a location of a viewer's pupil.

FIG. 7 depicts blocks representing coherent light sources in the three colors: a red coherent light source 702, a green coherent light source 703, and a blue coherent light source 704; a first partially-reflecting/partially-transmitting mirror 706, SLM 708, a first lens 710, a second partially-reflecting/partially-transmitting mirror 712; a third partially-reflecting/partially-transmitting mirror 715, and a trichroic (red-green-blue) RGB reflector 716, optionally transparent at wavelengths of colors other than RGB.

Coherent light in one, two, or even three colors, from the coherent light sources 702 703 704 is optionally projected through the first partially-reflecting/partially-transmitting mirror 706 onto the SLM 708. Light from the SLM 708 is projected to the first partially-reflecting/partially-transmitting mirror 706; reflected from the partially-reflecting/partially-transmitting mirror 706 through the first lens 710 toward the second partially-reflecting/partially-transmitting mirror 712; reflected from the second partially-reflecting/partially-transmitting mirror 712 to the third partially-reflecting/partially-transmitting mirror 715; reflected from the third partially-reflecting/partially-transmitting mirror 715 to the trichroic (red-green-blue) RGB reflector 716; reflected back from the trichroic (red-green-blue) RGB reflector 716; and through the third partially-reflecting/partially-transmitting mirror 715 onto a viewer's pupil 718.

In some embodiments, the optical elements along the path from the SLM 708 to the viewer's pupil 718 produce an image 719 of the SLM 708 at or near the viewer's pupil 718.

FIG. 7 also depicts components of the HMD used for tracking a location of a viewer's pupil in conjunction with some of the components used for displaying a CGH image.

FIG. 7 depicts a light source 720 for illuminating the viewer's pupil 718, or optionally illuminating an area around the eye, a partially-reflecting/partially-transmitting mirror 722, a lens 724, and a light reception component 726. The second mirror 712 is at least partially transparent at the wavelength of the light source 720. The curved trichroic RGB mirror 716 is also reflective at the wavelength of the light source 720.

In some embodiments, the light source 720 produces Near Infra-Red (Near-IR) light. In some embodiments, the light reception component 726 is designed to detect NIR.

Light from the light source 720 is optionally projected onto the partially-reflecting/partially-transmitting mirror 722; reflected from the partially-reflecting/partially-transmitting mirror 722, through the lens 724, through the second mirror 712 onto the third partially-reflecting/partially-transmitting mirror 715, to the trichroic (red-green-blue) RGB reflector 716; reflected back from the trichroic (red-green-blue) RGB reflector 716 through the third partially-reflecting/partially-transmitting mirror 715 onto a viewer's pupil 718.

Light reflected from the viewer's pupil 718 passes through the third partially-reflecting/partially-transmitting mirror 715; to the trichroic (red-green-blue) RGB reflector 716, which also reflects wavelengths of the light source 720; is reflected back from the trichroic (red-green-blue) RGB reflector 716 onto the third partially-reflecting/partially-transmitting mirror 715; reflected from the third partially-reflecting/partially-transmitting mirror 715 to the second mirror 712; passes through the second mirror 712, through the lens 724, through the partially-reflecting/partially-transmitting mirror 722, onto the light reception component 726.

In some embodiments, the light source 720 may optionally be located in other locations such that the light source 720 illuminates the eye in a manner which can be detected by the light reception component 726.

In some embodiments, the light reception component 726 may use ambient light falling on the eye in order to track the pupil.

In some embodiments, the light reception component 726 may use illumination at one, two or all the colors of the CGH image, falling on the eye as part of viewing the CGH image, in order to track the pupil.

Various embodiments contemplated for the light reception components 726 include a camera, image sensors, photo-electric sensors, photovoltaic sensors, and a quadrant detector.

In some embodiments tracking the pupil optically is used to produce, on-board the HMD, a signal for controlling tilting a mirror such as the mirror 715 to project the CGH image onto the viewer's pupil 718.

In some embodiments tracking the pupil optically is used to produce signals which are sent to an off-board, relative to the HMD, processor, for the off-board processor to produce and transmit a signal to the HMD for controlling tilting a mirror such as the mirror 715 to project the CGH image onto the viewer's pupil 718.

In some embodiments, tracking the pupil optically is used to produce signals which are sent to an off-board, relative to the HMD, processor, for the off-board processor to produce and transmit SLM pixel settings to the HMD.

In some embodiments, the light reception component 726 detects location of a pupil of the viewer's pupil 718, and optionally produces control instructions to an optical component to shift the image 719 of the SLM 708 onto the location of the viewer's pupil 718.

In some embodiments, a first CGH real image is formed at a location at an adjustable tilted mirror which is controlled to shift the image 719 of the SLM 708 onto the pupil of the viewer's pupil 718. In some embodiments, the mirror at the CGH real image location is the third partially-reflecting/partially-transmitting mirror 715. In some embodiments, a controller optionally controls tilt of the third partially-reflecting/partially-transmitting mirror 715, which shifts the image 719 of the SLM 708 across the viewer's pupil 718. In some embodiments, this adjustable mirror is the second partially-reflecting/partially-transmitting mirror 712.

In some embodiments, the tilting element is re-imaged to a plane of the viewer's eye, even without image of the SLM on the tilting element.

In some embodiments, the image of the SLM is shifted along the optical axis, away from or toward the viewer's eye. Optionally shifting the image of the SLM toward the pupil may be done by shifting of the 708 SLM using a zoom lens (not shown), and/or by extending the distance between the SLM and the CGH image, and/or by lateral shifting of the image of the SLM.

In some embodiments the optical component designed to laterally shift the image 719 of the SLM 708 onto the pupil of the viewer's pupil 718 is a set of two concentric wedges (not shown) or two mirrors (not shown) in a periscope configuration at or near the SLM location. A lateral shift of the image of the SLM may optionally be generated by rotating the periscope configuration or the two wedges thereby shifting the image of the SLM into the viewer's eye.

In some embodiments, the light reception component 726 is connected to the optical component designed to shift the image 719 of the SLM 708 onto the pupil of the viewer's pupil 718, and includes circuitry to control the image of the SLM 719 shifting component, and/or an optional image of the SLM 719 focusing component.

In some embodiments, the lens 724 may be shifted to focus, or zoom in, on the viewer's pupil 718.

Optionally the image of the SLM is shifted along the optical path to minimize a distance between the viewer's pupil 718 and the image of the SLM. In some embodiments, the shifting may be done by shifting the SLM 708 location along the optical path or by changing a location of the SLM's image 719 location along the optical path.

In some embodiments the light reception component 726 optionally sends data regarding location of the pupil of the viewer's pupil 718 to a processor (not shown) off-board the HMD, and the off-board processor optionally sends control instructions to control the image of the SLM 719 shifting component to bring the image 719 of the SLM 708 onto the pupil of the viewer's pupil 718.

In some embodiments, a location of the CGH image is optically designed to be at the third partially-reflecting/partially-transmitting mirror 715.

In some embodiments, a location of the CGH image is optically designed to be at the third partially-reflecting/partially-transmitting mirror 715, and a specific portion 714 of the third partially-reflecting/partially-transmitting mirror 715 is designed to be non-transmitting, to block a zero-order effect of displaying the CGH image. In some embodiments, the non-transmitting zero-order blocker is at a center of the third partially-reflecting/partially-transmitting mirror 715.

Figure 8A:
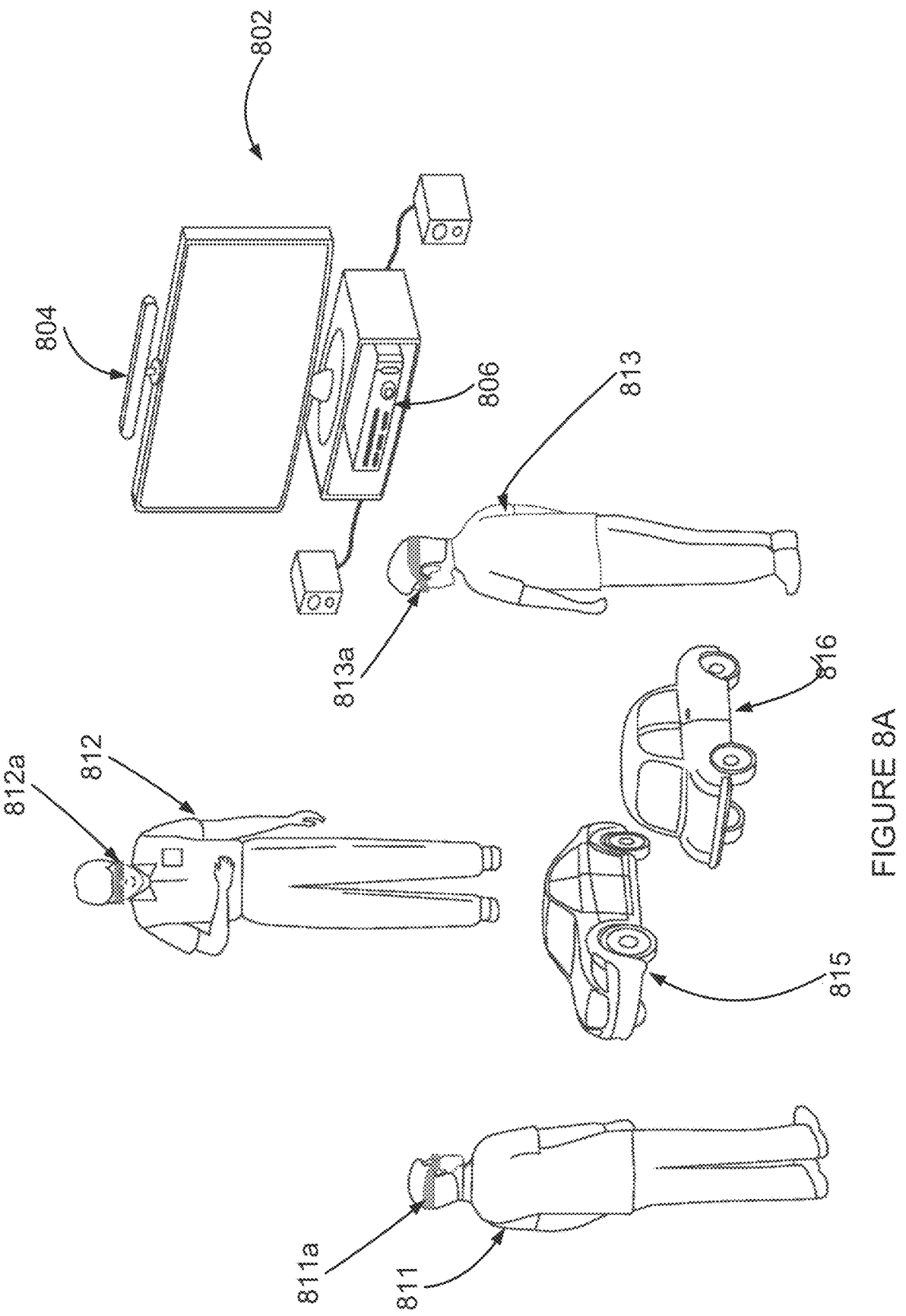
FIG. 8A is a simplified illustration of tracking HMD location and/or orientation according to an example embodiment of the invention.

Reference is now made to FIG. 8A, which is a simplified illustration of tracking HMD location and/or orientation according to an example embodiment of the invention.

FIG. 8A depicts several people wearing head mounted displays (HMDs) 811a 812a 813a in a system which includes tracking HMD 811a 812a 813a location in space and/or orientation, and optionally includes coordination of what each viewer sees.

In some embodiments the system of FIG. 8A enable several users to interact together having an experience as if the users are all interacting with a real object which they see at a same location in space.

FIG. 8A depicts an example embodiment of a system 802 for tracking HMD location in space and/or orientation in space. An example such system 802 can be a system which includes one or more camera(s) 804 and a corresponding processing unit 806.

FIG. 8A also depicts a first user 811 wearing an HMD 811a, a second user 812 wearing an HMD 812a, and a third user 813 wearing an HMD 813a.

By way of a non-limiting example, the first user 811 is displayed a first object 815, and the second user 812 is displayed the same first object 815 in the same location and same orientation in space, as if the first object 815 were a real object. Since the first user 811 and the second user 812 are at different locations in space, and looking in different directions, if they were displayed a CGH image using the same SLM pixel settings and the same HMD optical settings, the first user 811 and the second user 812 see the first object 815 at different locations in space, at a same direction and distance relative to each one of their HMDs 811a 812a 813a.

In some embodiments the system 802 for tracking HMD location in space and/or orientation locates the HMDs 811a 812a worn by the first user 811 and the second user 812, and detects directions in which the HMDs 811a 812a worn by the first user 811 and the second user 812 are directed. Using the locations and directions of the HMDs 811a 812a, it is possible to calculate settings for the SLM pixel values and the optical components of the first user 811 HMD 811a and the second user 812 HMD 812a so that the first user 811 and the second user 812 see the first object 815 at a same location and optionally appearing at a same orientation in space, that is, the first user 811 can see the front-left of the first object 815, and the second user 812 can see the back-right of the first object 815.

In some embodiments the third user 813 is optionally displayed the same first object 815 at the same location in space and same orientation in space as is displayed to the first user 811 and the second user 812.

In some embodiments the third user 813 is optionally displayed a second object 816 different from the first object 815 displayed to the first user 811 and the second user 812. The second object 816 is optionally not displayed to the first user 811 and the second user 812.

Optionally the device tracking the surroundings of the HMD can be mounted on the HMD. Optionally several HMD-mounted surrounding-trackers may share at least part of the tracked surroundings in a common database in one or all of the HMD mounted device/s or at a separate device.

Reference is now made to FIG. 8B, which is a simplified flow chart illustration of an example method for coordinating display of a CGH scene among several displays, according to an example embodiment of the invention.

The method of FIG. 8B includes:

determining a desired apparent location and orientation of a CGH image scene in a space (881). The location and orientation may use any coordinate system, based on any reference location and direction;

determining a location and orientation of a first display in the space (883). Optionally using the above-mentioned coordinate system;

calculating settings of a Spatial Light Modulator (SLM) comprised in the first display to produce the CGH image scene in the desired apparent location and orientation in the space (885);

determining a location and orientation of a second display in the space (887). Optionally using the above-mentioned coordinate system; and calculating settings of a Spatial Light Modulator (SLM) comprised in the second display to produce the CGH image scene in the desired apparent location and orientation in the space (889).

In some embodiments the displays may be HMDs such as the HMDs 812a 813a depicted in FIG. 8A. In some embodiments, the displays may be displays such as the CGH image display 120 of FIG. 1C.

In some embodiments the determining a location and orientation of the first display in the space may be done by a tracking unit external to the displays, such as the camera(s) 804 and the processing unit 806 depicted in FIG. 8A.

In some embodiments the determining a location and orientation of the first display in the space may be done by a tracking unit on one or both of the displays, optionally using distance measuring sensor(s), such as optionally placed at locations 840a 840b of the HMD 833, and/or the at locations 842a 842b on the HMD 834. Such a non-limiting example embodiments is described in further detail below, with reference to FIG. 8C.

In some embodiments the determining a location and orientation of the first display in the space may be done by a camera and processing unit on one or both of the displays.

In some embodiments, the calculating may be fully or partially performed in a processing unit external to the displays, such as the processing unit 806 depicted in FIG. 8A.

In some embodiments, the calculating may be fully or partially performed in a processing unit included in one of the display systems, and optionally coordinated by communicating with another display system.

In some embodiments, the calculating may be fully or partially performed in a processing unit included in each one of the display systems, optionally with relative or absolute coordinates and/or relative or absolute orientations communicated to each of the displays.

In some embodiments, a central system for tracking HMD location in space and/or orientation performs such tracking of HMDs. The central system optionally calculates SLM pixel settings for one or more of the HMDs, and optionally transmits the SLM pixel settings to the HMDs.

In some embodiments, a central system for tracking HMD location in space and/or orientation performs such tracking of HMDs. The central system optionally transmits location and orientation values of the HMDs, optionally using a common reference frame, and transmits the values to the HMDs, which perform their own calculations of SLM pixel settings in order to display an object in space, and optionally different HMDs calculate SLM pixel settings, taking into account the location and orientation values, in order to display a same object at a same place and orientation in space.

In some embodiments, one or more of the HMDs includes components for determining another one or more HMD's locations in space and/or orientations, and optionally transmits location and orientation values of the HMDs, optionally using a common reference frame or relative values of locations in space and/or orientations. The HMDs optionally perform their own calculations of SLM pixel settings in order to display an object in space, and optionally different HMDs calculate SLM pixel settings, taking into account the location and orientation values, in order to display a same object at a same place and orientation in space.

Figure 8C:
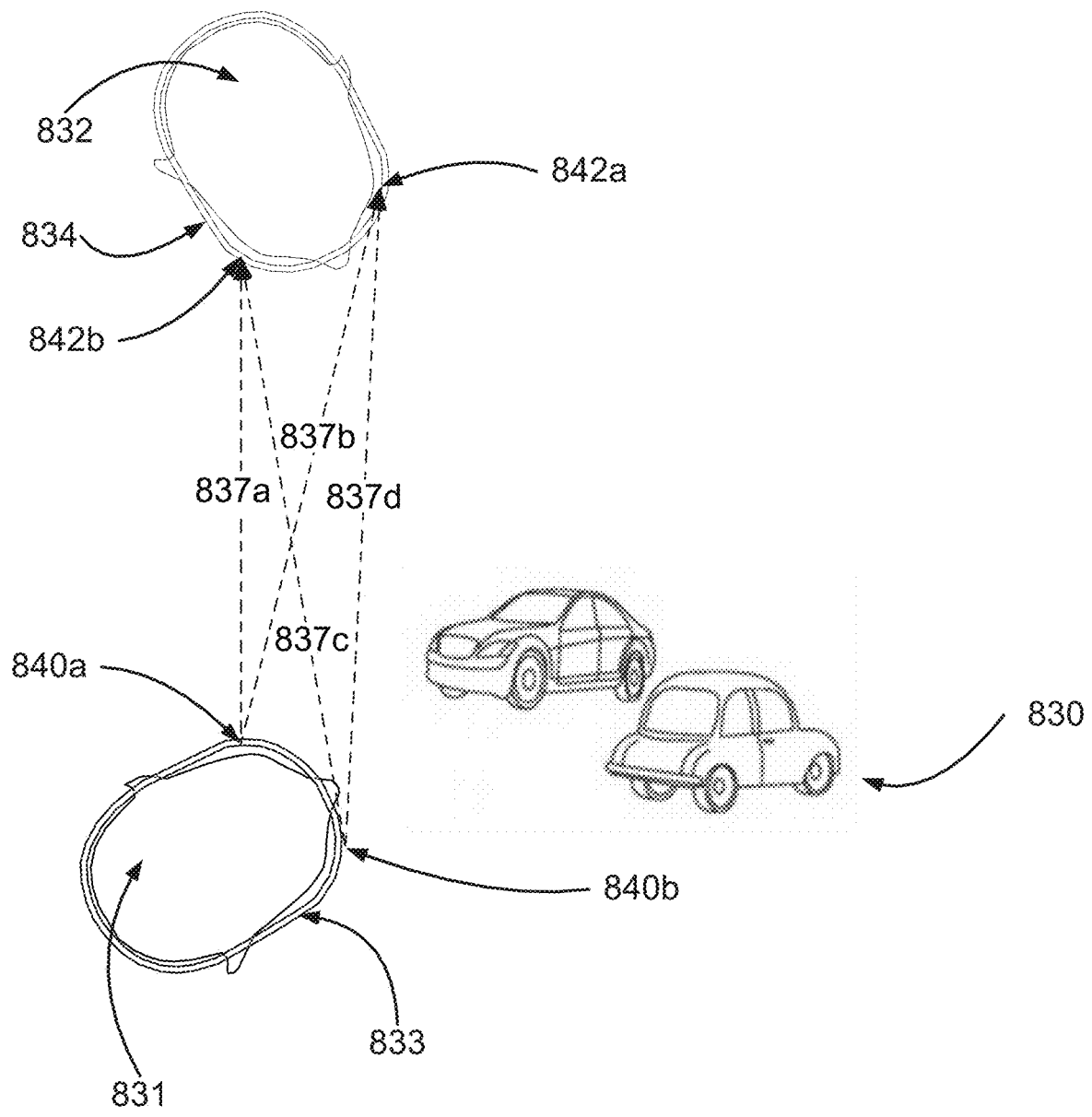
FIG. 8C is a simplified illustration of an HMD tracking location and/or orientation of another HMD according to an example embodiment of the invention.

Reference is now made to FIG. 8C, which is a simplified illustration of an HMD tracking location and/or orientation of another HMD according to an example embodiment of the invention.

FIG. 8C depicts two viewers 831 832 wearing HMDs 833 834, both of which display CGH images of a three dimensional scene 830.

In some embodiments, the CGH image 830 is displayed having a same real-space location and orientation to both of the viewers 831 832. Persons skilled in the art will appreciate that the HMDs 833 834 are each showing a different CGH image of a same scene 830. A first viewer 831 sees a front of one car and a back of another car, and a second viewer 832 sees a right side of one car and a left side of the other car.

In some embodiments, at least one of the HMDs 833 834 has a sensor or sensors for determining distance and orientation of the other HMD. When a distance and orientation of one HMD to another HMD are known, a three dimensional transformation is optionally used to transform coordinates of the scene 830 from the one HMD to the other, and SLM pixels may optionally be calculated so as to display the scene 830 having a same real-space location and orientation to both of the viewers 831 832.

In order to obtain relative distance and orientation of one HMD to another, in some embodiments, a central sensor such as the camera 804 depicted in FIG. 8A may be used. In some embodiments, a sensor may be mounted on or built into at least one of the HMDs.

In some embodiments, a suitable sensor may be a camera which performs image processing to determine distance and orientation based on a shape of the other HMD as seen by the camera.

In some embodiments, a suitable sensor may be one or more distance measuring sensor(s), optionally placed at locations 840a 840b of the HMD 833. In some embodiments, the distance sensor may optionally be augmented by orientation determination of the other HMD by a camera on the first HMD.

In some embodiments, one or more marker(s) may be added to an HMD, such as at locations 842a 842b on the HMD 834, so that measurements of distances 837a 837b 837c 837d may be made between locations 840a 840b on the HMD 833 to locations 842a 842b on the other HMD 834.

In some embodiments, the marker(s) may be geometric designs suitable for optical detection, and/or distance determination, and/or orientation determination.

In some embodiments, the marker(s) may be corner reflectors, reflecting light from light sources, optionally infrared light sources, on a measuring HMD.

In some embodiments, an infrared Light Emitting Diode (LED) may optionally be added to a marker to assist in detecting and tracking a position of the marker on a real object. In some embodiments, the markers are a pattern reflecting IR illumination.

Figure 8D:
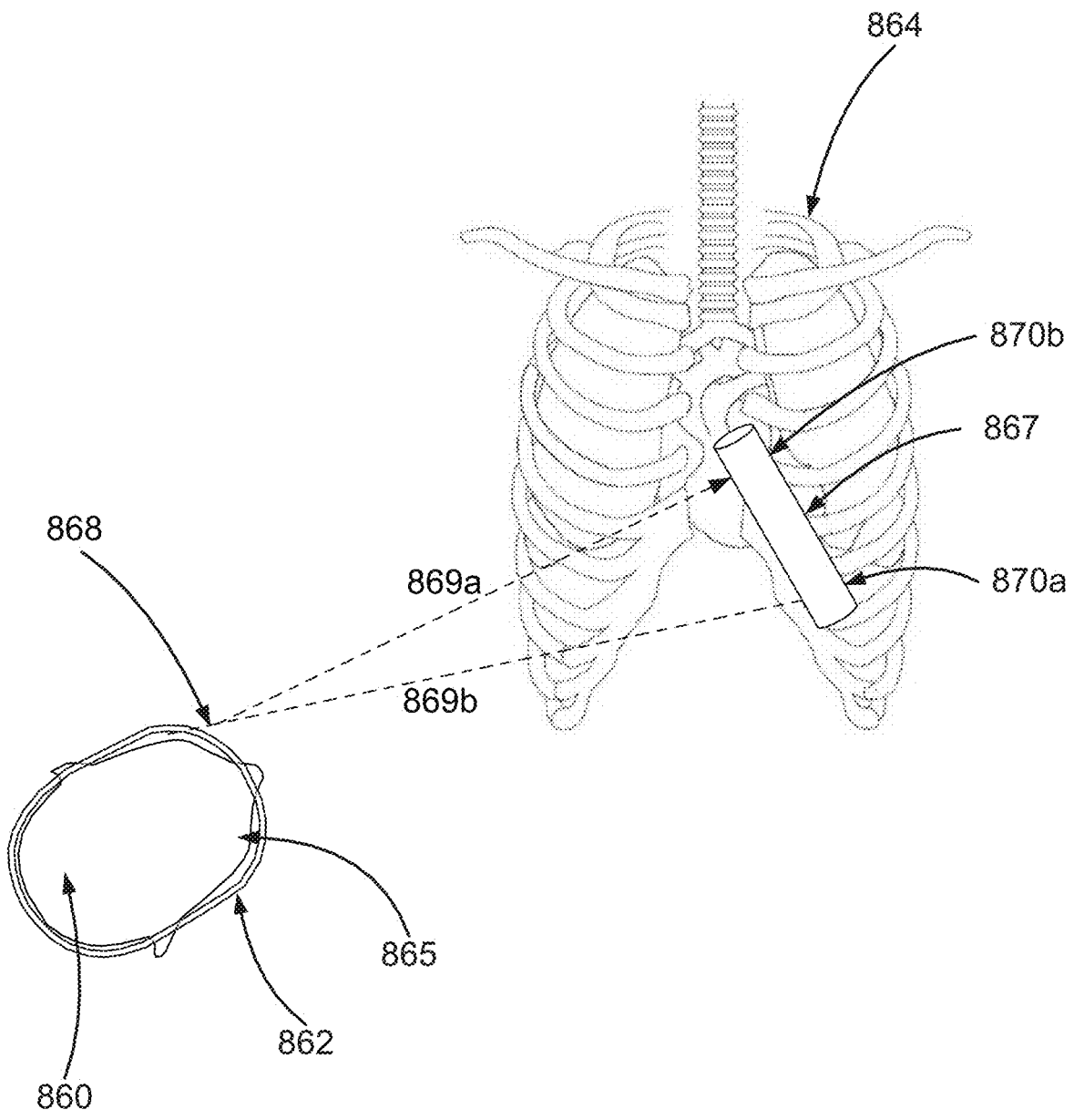
FIG. 8D is a simplified illustration of an HMD tracking location and/or orientation of markings on a real object according to an example embodiment of the invention.

Reference is now made to FIG. 8D, which is a simplified illustration of an HMD tracking location and/or orientation of markings on a real object according to an example embodiment of the invention.

FIG. 8D depicts a viewer 860 wearing an HMD 862, which displays a three-dimensional scene 864; in this case, the scene is, by way of a non-limiting example, a medical scene of a medical data set, showing ribs and lungs of a human subject.

The HMD 862 also optionally has a sensor mounted at a location 868, which reads a location of an object 867 inserted into the same space as the scene 864. The scene 864 is a virtual CGH image, which does not block the space it appears in from having the object 867 inserted. The sensor at the location 868 optionally measures distance and/or angle toward one or more markings 870a 870b on the object 867, along lines 869a 869b. The measurement potentially enables the HMD 862 to determine a location of the object 867 relative to the scene 864.

The sensor at the location 858 may optionally be any one of the sensors described above with reference to FIG. 8C.

The markings 870a 870b may optionally be any one of the markings described above with reference to FIG. 8C.

In some embodiments, knowing the location of the object 867 relative to the scene 864 enables the HMD to implement a man-machine-interface (MMI) which may optionally provide the viewer 860 with an appearance that the object 867 is manipulating the scene 864.

In some embodiments, the MMI may optionally be as described in above-mentioned U.S. Pat. No. 8,500,284; and/or as in above-mentioned U.S. Patent Application Publication Number 2014/0033052; and/or as in above-mentioned PCT Patent Application Publication WO 2015/004670.

It is noted that a CGH image produced by a SLM and projected toward a viewer's eye typically spans a rather small viewing window at the viewer's eye; the viewing window may be a few millimeters in size, such as 2-8 mm. The rather small viewing window at the viewer's eye corresponds to a small apparent field of view or angle of view in which a CGH image may appear, floating in the air within a full field of view. In some embodiments, an optical component, such as a controllable tilting mirror, controlled in order to project an image of the SLM onto a viewer's eye and/or to track the viewer's pupil, is optionally used in order to jitter or wiggle the viewing window of the image of the SLM across a viewer's pupil. The jittered viewing window spans a larger area than a steady viewing window, producing effectively a larger viewing window.

In some embodiments, the field of view available for the CGH image is enlarged, using one or more of several such methods for enlarging a CGH image field of view.

Some such methods are described in above-mentioned PCT Patent Application Publication number WO2014/020603 of Gelman et al, the contents of which the contents of which are incorporated herein by reference in their entirety.

In some embodiments, tracking a display's orientation in space is optionally performed by an external system tracking the display.

In some embodiments, tracking a display's orientation in space is optionally performed by the display itself, by optically tracking location of objects, external to the display, in space; by optically tracking specific markings in a vicinity of the display in space; by using direction finding similarly to direction finding by smart phones; by using an accelerometer; by using a gravity sensor; and in case of a display mounted on an adjustable arm, optionally measuring angles of the adjustable arm.

In some embodiments, a tracking system for determining three dimensional coordinates is optionally an optical tracking system monitoring objects in a same space as the CGH image is displayed.

In some embodiments, the tracking system for determining three dimensional coordinates is mounted on a HMD, and a relative position of a real object to the HMD is measured. A relative position of the CGH image is also known to the HMD system, so that registration is calculable between the real object and the CGH image.

Example embodiments of a CGH image display as described herein potentially enable to integrate real objects and virtual CGH images and provide a natural appearance to a scene. For example, in gaming a real person may extend a hand, which may appear to grip a virtual ball, or racquet, which can be displayed without the real hand ruining a display of the virtual object, since the hand, while being apparently where the displayed object is, is actually not in the optical path of the display, and so not blocking any light used to display the virtual object.

Scattered Observation Windows

Figures 9A, 9B:
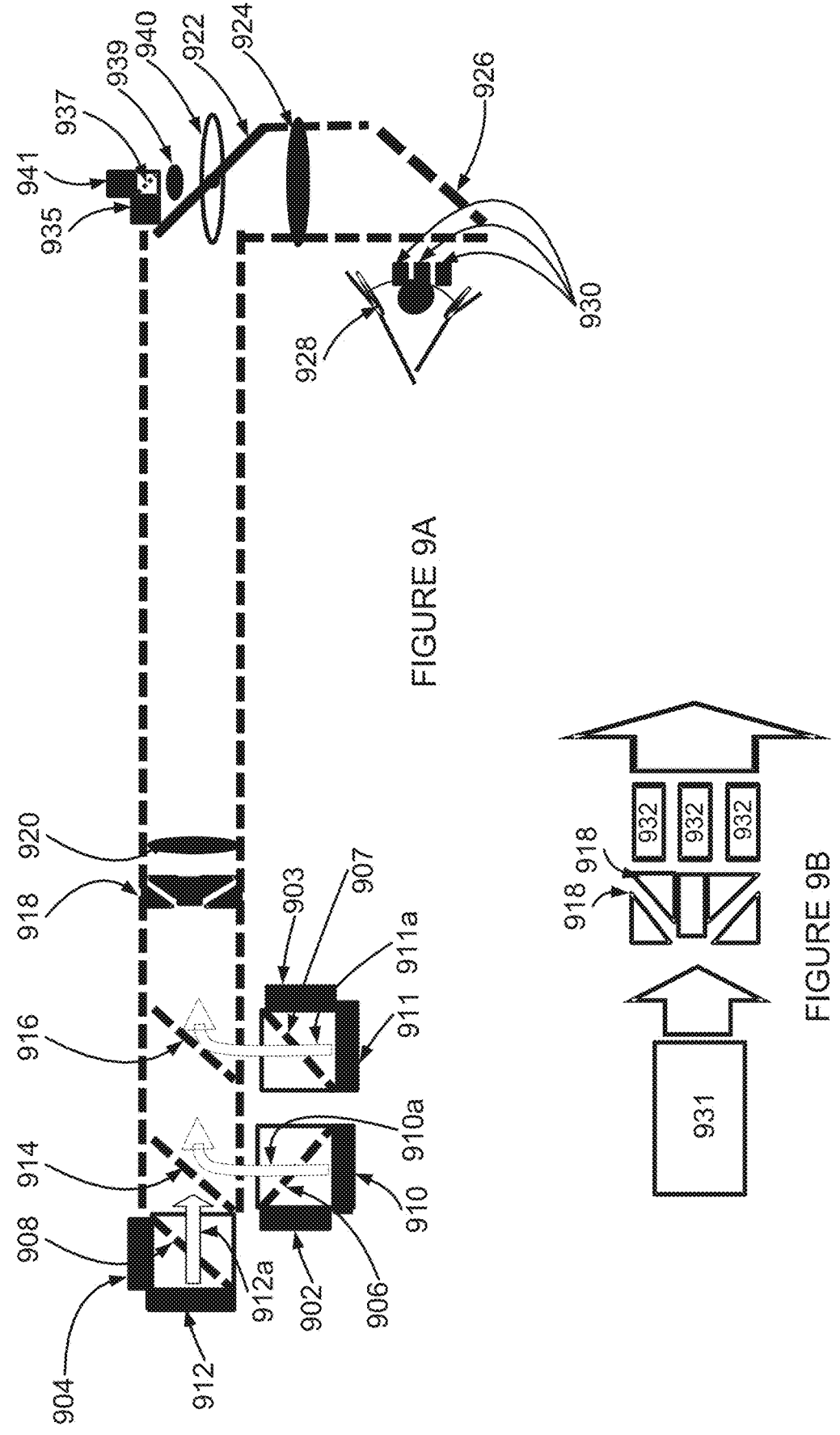
FIG. 9A is a simplified illustration of enlarging an observation window of a holographic image according to an example embodiment of the invention.
FIG. 9B is a simplified illustration of a prism array acting upon a beam of light and splitting the beam of light into several parallel beams of light covering a larger cross sectional area according to an example embodiment of the invention.

Reference is now made to FIG. 9A, which is a simplified illustration of enlarging an observation window of a holographic image according to an example embodiment of the invention.

FIG. 9A depicts how a CGH image may be produced and an observation window for the CGH image may be enlarged by duplication of the image of the SLM or splitting the image of the SLM at a location of a viewer's eye.

FIG. 9A depicts a folded optical path which corresponds to locating SLMs alongside and/or above a viewer's head, projecting light forward, and folding the optical path to project into the viewer's eye.

FIG. 9A depicts:

coherent light sources in three colors: a red coherent light source 902, a green coherent light source 903, and a blue coherent light source 904;

a first partially-reflecting/partially transmitting mirror 906 for reflecting light from the red light source 902 onto a first SLM 910 for modulating the coherent light from the red light source 902 and reflecting modulated red light 910a;

a second partially-reflecting/partially transmitting mirror 907 for reflecting light from the green light source 903 onto a second SLM 911 for modulating the coherent light from the green light source 903 and reflecting modulated green light 911a;

a third partially-reflecting/partially transmitting mirror 908 for reflecting light from the blue light source 904 onto a third SLM 912 for modulating the coherent light from the blue light source 904 and reflecting modulated blue light 912a;

a partially-reflecting/partially transmitting mirror 914 for transmitting blue light and reflecting red light;

a partially-reflecting/partially transmitting mirror 916 for transmitting blue and red light and reflecting green light;

an optional prism array 918;

an optional lens 920 termed herein a SLM lens. In some embodiments, an optional additional lens or lenses (not shown) may form images of the SLMs at the location of the SLM lens 920;

a partially-reflecting/partially-transmitting mirror 922. In some embodiments, the mirror 922 is reflective in red green and blue and transmissive in Near-Infra-Red;

a second lens 924; and a mirror or partially-reflecting/partially-transmitting mirror 926.

In some embodiments, such as depicted in FIG. 9A, the HMD also includes components used for tracking a location of a viewer's pupil, similar to the components and function depicted in FIG. 7: a light source 935 for illuminating the viewer's eye 928; a partially-reflecting/partially-transmitting mirror 937; a lens 939; and a light reception component 941.

In some embodiments coherent light in one and/or two, and/or three colors, from the red green and blue coherent light sources 902 903 904 is optionally projected through the partially-reflecting/partially-transmitting mirrors 906 907 908 onto the corresponding SLMs 910 911 912. The SLMs 910 911 912 optionally modulate the coherent light, optionally producing CGH images in the three colors. The CGH images are optionally projected from the SLMs 910 911 912 to the corresponding partially-reflecting/partially-transmitting mirrors 906 907 908, and transmitted through the partially-reflecting/partially-transmitting mirrors 906 907 908. The blue and the red light also optionally pass through the partially-transmitting mirrors 914 916, as depicted in FIG. 9A. Light in all of the three colors which are used optionally passes through the optional prism array 918. In such embodiments, the prism array 918 is optically designed to produce, at a viewer's eye 928, several observation windows 930 adjacent to each other, termed herein scattered observation windows. In some embodiments, a lens or lenses (not shown) are used to image the SLMs to the vicinity of prism array 918. In some embodiments, light exiting from the prism array 918 passes through an optional lens 920, optionally for assisting in setting focus of CGH image and/or images of the SLM. Light continues toward the mirror 922, and reflected from the mirror 922 onto the mirror 926, onto the viewer's eye 928.

It is noted that the several observation windows 930 adjacent to each other are adjacent or separated at a small distance, and preferably not partially overlapping.

Reference is now additionally made to FIG. 9B, which is a simplified illustration of a prism array 918 acting upon a beam of light 931 and splitting the beam of light 931 into several parallel beams of light 932 covering a larger cross sectional area according to an example embodiment of the invention.

In some embodiments the prism array 918 is optionally replaced by beam splitters (not shown) which duplicates the image of the SLM (as will be described with reference to FIGS. 9C and 9D), generating multiple observation windows 930 at the location of the viewer's eye 928.

It is noted that FIG. 9A depicts an example embodiment in which a real CGH image 940 is located at the mirror 922.

In some embodiments calculation of values for the SLM pixel array take into account different points of view corresponding to the multiple observation windows 930 so that a CGH image appears to a viewer at one location regardless of which one or more observation window(s) overlap the viewer's pupil.

Figures 9C, 9D:
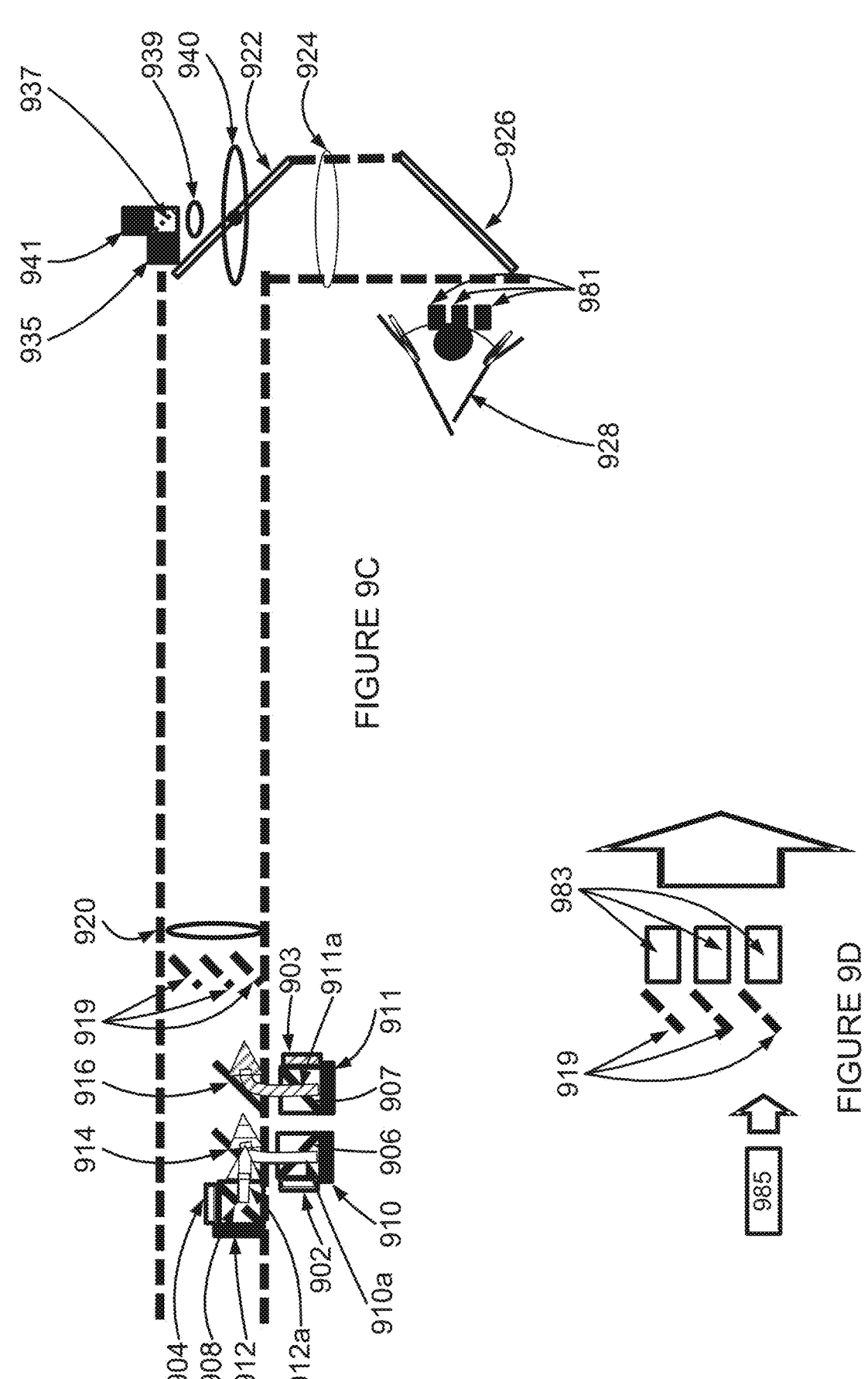
FIG. 9C is a simplified illustration of enlarging an observation window of a holographic image according to an example embodiment of the invention.
FIG. 9D is a simplified illustration of a prism array acting upon a beam of light and splitting the beam of light into several parallel beams of light covering a larger cross sectional area according to an example embodiment of the invention.

Reference is now made to FIG. 9C, which is a simplified illustration of enlarging an observation window of a holographic image according to an example embodiment of the invention.

FIG. 9C depicts how a CGH image may be produced and an observation window for the CGH image may be enlarged by duplication of the image of the SLM or splitting the image of the SLM at a location of a viewer's eye.

FIG. 9C depicts a folded optical path which corresponds to locating SLMs alongside and/or above a viewer's head, projecting light forward, and folding the optical path to project into the viewer's eye.

FIG. 9C depicts:

coherent light sources in three colors: a red coherent light source 902, a green coherent light source 903, and a blue coherent light source 904;

a first partially-reflecting/partially transmitting mirror 906 for reflecting light from the red light source 902 onto a first SLM 910 for modulating the coherent light from the red light source 902 and reflecting modulated green light 910a;

a second partially-reflecting/partially transmitting mirror 907 for reflecting light from the green light source 903 onto a second SLM 911 for modulating the coherent light from the green light source 903 and reflecting modulated green light 911a;

a third partially-reflecting/partially transmitting mirror 908 for reflecting light from the blue light source 904 onto a third SLM 912 for modulating the coherent light from the blue light source 904 and reflecting modulated green light 912a;

a partially-reflecting/partially transmitting mirror 914 for transmitting blue light and reflecting red light. In some embodiments, the partially-reflecting/partially transmitting mirror 914 is a chroic mirror tuned to reflect red light and transmit blue light;

a partially-reflecting/partially transmitting mirror 916 for transmitting blue and red light and reflecting green light. In some embodiments, the partially-reflecting/partially transmitting mirror 916 is a chroic mirror tuned to reflect green light and transmit blue light and red light;

an optional partially-reflecting/partially transmitting mirror array 919;

an optional lens 920 termed herein a SLM lens. In some embodiments, a lens or lenses (not shown) are used to image the SLMs to the vicinity of the array 919;

a partially-reflecting/partially-transmitting mirror 922;

a second lens 924; and a mirror or partially-reflecting/partially-transmitting mirror 926.

In some embodiments, such as depicted in FIG. 9C, the HMD also includes components used for tracking a location of a viewer's pupil, similar to the components and function depicted in FIG. 7: a light source 935 for illuminating the viewer's eye 928; a partially-reflecting/partially-transmitting mirror 937; a lens 939; and a light reception component 941.

In some embodiments coherent light in one and/or two, and/or three colors, from the red green and blue coherent light sources 902 903 904 is optionally projected through the partially-reflecting/partially-transmitting mirrors 906 907 908 onto the corresponding SLMs 910 911 912. The SLMs 910 911 912 optionally modulate the coherent light, optionally producing CGH images in the three colors. The CGH images are optionally projected from the SLMs 910 911 912 to the corresponding partially-reflecting/partially-transmitting mirrors 906 907 908, and transmitted through the partially-reflecting/partially-transmitting mirrors 906 907 908. The blue and the red light also optionally pass through the partially-transmitting mirrors 914 916, as depicted in FIG. 9C. In some embodiments, a lens or lenses (not shown) are used to image the SLMs to a vicinity of the mirror array 919. Light in all of the three colors which are used optionally passes through the optional mirror array 919. In such embodiments, the mirror array 919 is optically designed to produce, at a viewer's eye 928, several observation windows 981 adjacent to each other, termed herein duplicated observation windows. In some embodiments, light exiting from the prism array 919 passes through an optional lens 920, optionally for assisting in setting focus of CGH image. Light continues toward the mirror 922, and reflected from the mirror 922 onto the mirror 926, onto the viewer's eye 928.

It is noted that the several observation windows 981 adjacent to each other are adjacent or separated at a small distance, and preferably not partially overlapping.

Reference is now additionally made to FIG. 9D, which is a simplified illustration of a mirror array 919 acting upon a beam of light 985 and splitting the beam of light 985 into several parallel beams of light 983 covering a larger cross sectional area according to an example embodiment of the invention.

In some embodiments the mirror array 919 is optionally replaced by beam splitters (not shown) which duplicate the image of the SLM, generating multiple observation windows 981 at or near a plane of the viewer's eye 928.

It is noted that FIGS. 9C and 9D depict an example embodiment in which a real CGH image 940 is located at the mirror 922.

In some embodiments calculation of values for the SLM pixel array take into account different points of view corresponding to the multiple observation windows 981 so that a CGH image appears to a viewer at one location regardless of which one or more observation window(s) overlap the viewer's pupil.

Jittering an Observation Window

Reference is still made to FIGS. 9A-9D.

In some embodiments, modulated light in one, two, or even three colors is optionally projected through optical components onto the mirror 922. In some embodiments, the prism array 918 or the mirror array 919 and/or the lens 920 may optionally not be included, and the modulated light does not pass the above-mentioned optical components. The mirror 922 may optionally be jittered, or wiggled, in one and/or two dimensions. The jittering produces an effect of shifting an observation window sideways in one and/or two directions across the viewer's eye 928. Shifting the observation window across the viewer's eye 928 enlarges an area from which the viewer's eye 928 may see the CGH image, apparently enlarging the observation window.

When the jittering is by a small angle, values of the SLM pixels do not need to be recalculated, and a viewer does not notice a shifting of the CGH image, while benefitting from an enlarged observation window. In some embodiments, by way of a non-limiting example, when an image is at an apparent distance of 300-600 millimeters, 500-700 millimeters, 600-10000 millimeters and the jittering is by less than 150 microns, 200 microns, 1500 microns there is optionally no recalculation of SLM pixel values.

Combined Enlarging of an Observation Window and Eye/Pupil Tracking

In some embodiments an HMD according to FIG. 9A optionally also includes eye tracking and/or pupil tracking components, including a light source 935, an additional partially-reflecting/partially-transmitting mirror 937, an optional lens 939 and a light reception component 941.

In some embodiments the HMD of FIG. 9A performs eye and/or pupil tracking as described above with reference to FIG. 7, and an enlarging of an observation window, either by jittering the mirror 922, and/or by shifting the scattered observation windows produced by the prism array 918, optionally by shifting the prism array 918 sideways in one and/or two dimensions to shift the scattered observation windows 930 across the viewer's eye 928.

In some of the example embodiments described herein use is made of partially-transmitting/partially-reflecting mirrors. In some embodiments, the partially-transmitting/partially-reflecting mirrors are optionally chroic mirrors, which transmit/reflect at specific wavelengths, and let light through at other wavelength. However, in some cases, light loss may affect systems using partially-transmitting/partially-reflecting mirrors.

An example embodiment is now described which does not make use of partially-transmitting/partially-reflecting mirrors, or in some cases makes use of a partially-transmitting/partially-reflecting mirror only for tracking a viewer's pupil, optionally at a near-IR wavelength, which potentially minimizes light loss at visible wavelength.

Figure 9E:
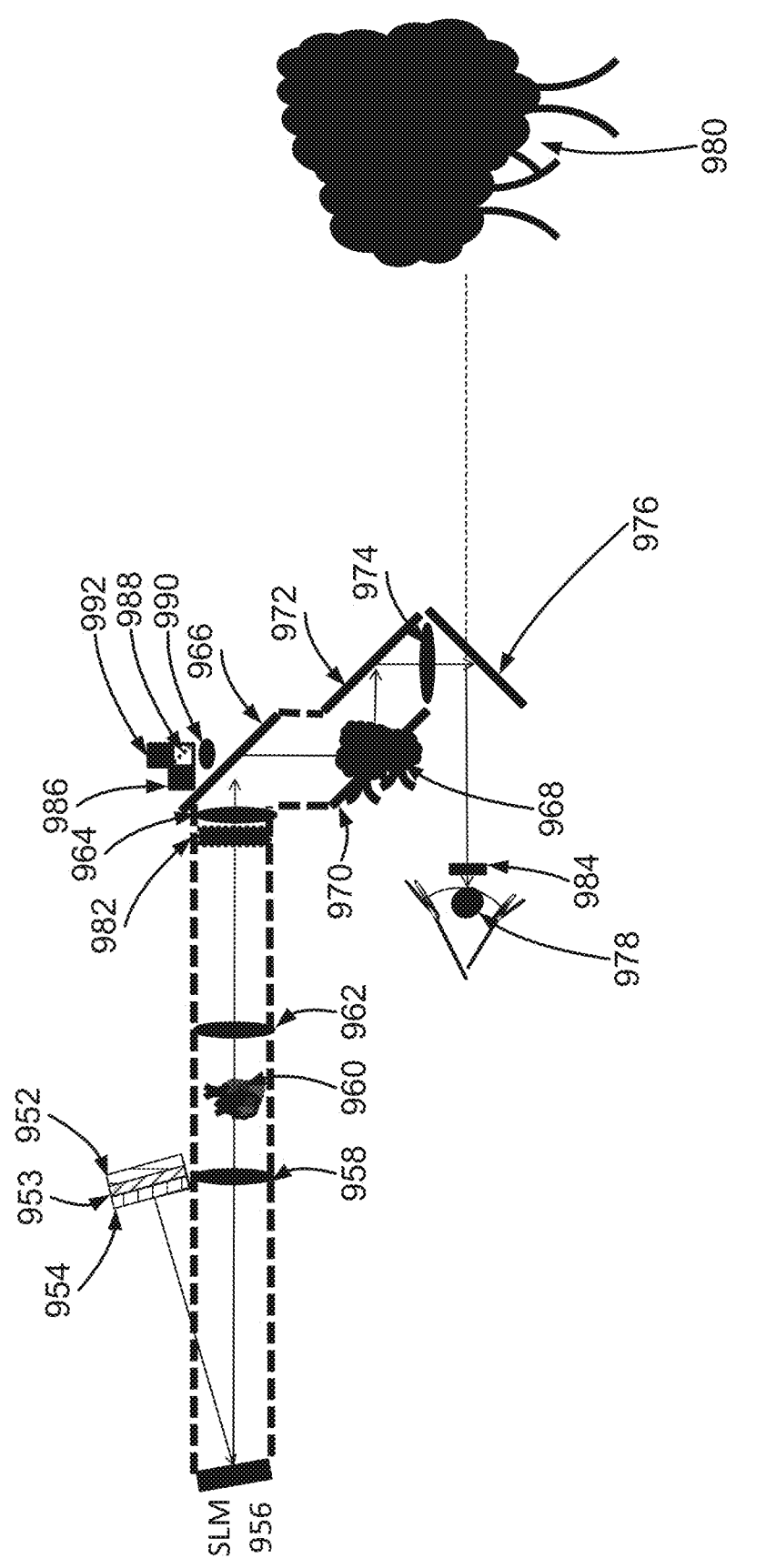
FIG. 9E is a simplified illustration of an optical system in a HMD according to an example embodiment of the invention.

Reference is now made to FIG. 9E, which is a simplified illustration of an optical system in a HMD according to an example embodiment of the invention.

FIG. 9E depicts an example embodiment which does not make use of partially-transmitting/partially-reflecting mirrors, or in some cases makes use of a partially-transmitting/partially-reflecting mirror only for tracking a viewer's pupil.

FIG. 9E depicts an optical path starting at three sources of coherent light at three colors: a red source 952; a green source 953; and a blue source 954. The three sources 952 953 954 illuminate SLM 956 at an angle, and the light is reflected toward a first lens 958. A first, optionally three-colored, CGH image 960 is formed after the first lens 958.

In some embodiments, the first CGH image 960 optionally includes a zero-order bright spot. In some embodiments, a transparent optical element (not shown) having a non-transparent spot for blocking the zero-order bright spot is placed at a location of the bright spot.

Light continues to propagate, through a second lens 962, and optionally through a third optional lens 964, off a diagonal mirror 966, and produces a second CGH image 968. The second CGH image 968 is located at a location of a second diagonal mirror 970.

In some embodiments, the diagonal mirror 970 is optionally controllable, and is tilted to track the viewer's pupil 978, and/or to compensate for inter-pupillary distance by pupil tracking.

In some embodiments, the third optional lens 964 is optionally selected to produce a Fourier holographic image as the second CGH image 968.

Light continues to propagate, so the second CGH image 968 is re-imaged by reflection off a mirror 972, optionally through a lens 974 onto a mirror 976, and onto a viewer's pupil 978.

The second CGH image 968 appears to the viewer as directly in front, at a location of an apparent CGH image 980.

In some embodiments, the mirror 976 may be a partially-transmitting/partially-reflecting mirror, in which case the viewer can also see the real world through the mirror 976.

In some embodiments, the mirror 976 may be a trichroic RGB at narrow wavelengths typical to the coherent lighting and Near-IR reflector which is mostly transparent at other wavelengths.

In some embodiments, the three light sources 952 953 954 are optionally operated sequentially, one at a time, and the SLM 956 is optionally set to pixel values corresponding to each one of the three colors separately.

In some embodiments a rate of cycling through the three colors is optionally 5 full cycles (three colors) per second, 8 full cycles per second (cps), 15 cps, 20 cps, 24 cps, 25 cps, 30 cps, 50 cps, 60 cps, 100 cps and greater.

In some embodiments, the optical elements along the path from the SLM 956 to the pupil 978 also produce a first image 982 of the SLM 956 following the second lens 962, and a second image 984 of the SLM 956 is produced by re-imaging the first image 982 of the SLM 956. The second image 984 of the SLM 956 is produced right on the viewer's pupil 978, or close to the viewer's pupil 978, even if it does not appear so in FIG. 9E, for the sake of clarity.

In some embodiments the first image 982 of the SLM 956 is located in a vicinity of the mirror 966.

FIG. 9E also depicts components of the HMD used for tracking a location of a viewer's pupil in conjunction with some of the components used for displaying a CGH image.

FIG. 9E depicts a light source 986 for illuminating the viewer's pupil 978, a partially-reflecting/partially-transmitting mirror 988, a lens 990, and a light reception component 992. In the embodiments which include the pupil tracking components, the mirror 966 is at least partially transparent at the wavelength of the light source 986. The light source 986 may optionally be located at a different location within the optical system or even outside the optical system.

In some embodiments, the light source 986 produces Near Infra-Red (Near-IR) light. In some embodiments, the light reception component 992 is designed to detect Near-IR.

Light from the light source 986 is optionally projected onto the partially-reflecting/partially-transmitting mirror 988; reflected from the partially-reflecting/partially-transmitting mirror 988, through the lens 990, through the mirror 966 onto the mirror 970, to the mirror 972, through the lens 974, reflected off the mirror 976 onto a viewer's pupil 978 or an area around the viewer's pupil 978.

Light reflected from the viewer's pupil 978, optionally from the pupil 978 and the area around it, passes back through the optical system through the mirror 966, through the lens 990, through the partially-reflecting/partially-transmitting mirror 988, onto the light reception component 992.

Various embodiments contemplated for the light reception components 992 include a camera, image sensors, photo-electric sensors, photovoltaic sensors, and a quadrant detector.

Optionally the mirror 966 is used to shift a direction that the CGH image 980 appears to the viewer, compensating for a change in the HMD orientation.

It is noted that CGH images may be limited by a small diffraction angle of an SLM, which typically span a relatively small field of view, and enable a viewing of relatively small CGH images, as if limited by tunnel vision. The field of view can be as small as few degrees, for example 2, 3, 4 or 5 degrees. In some embodiments the mirror 966 is optionally used to generate an apparently enlarged observation window from which the CGH image may be viewed, by tilting the mirror 966 in one or two dimensions rapidly back and forth, displaying an enlarged image in an enlarged field of view across the viewer's pupil 978. Different portions of the enlarged CGH image are optionally calculated and projected upon the viewer's pupil in a manner synchronized with the tilt of the mirror 966 and a direction of projection. When the tilting and synchronized projection are performed rapidly enough, for example scanning an entire larger image 20 or 24 or 25 or 30 or 60 or more times per second, the eye and brain merge the CGH image portions into a large CGH image.

In some embodiments, controllable tilt of the mirror 970 is optionally used to shift an observing window, which is the second image 984 of the SLM 956, keeping the observing window at least partially on the viewer's pupil 978, optionally generating an effective larger observing window. Optionally, controllable tilt of mirror 970 is used to compensate for a change in the viewer's pupil 978 location with respect to the HMD.

Computation of SLM Pixel Setting in Order to Produce Images for Display by the HMD In some embodiments, the HMD includes an onboard computing unit for computing SLM pixel settings for display by the HMD.

Figure 10:
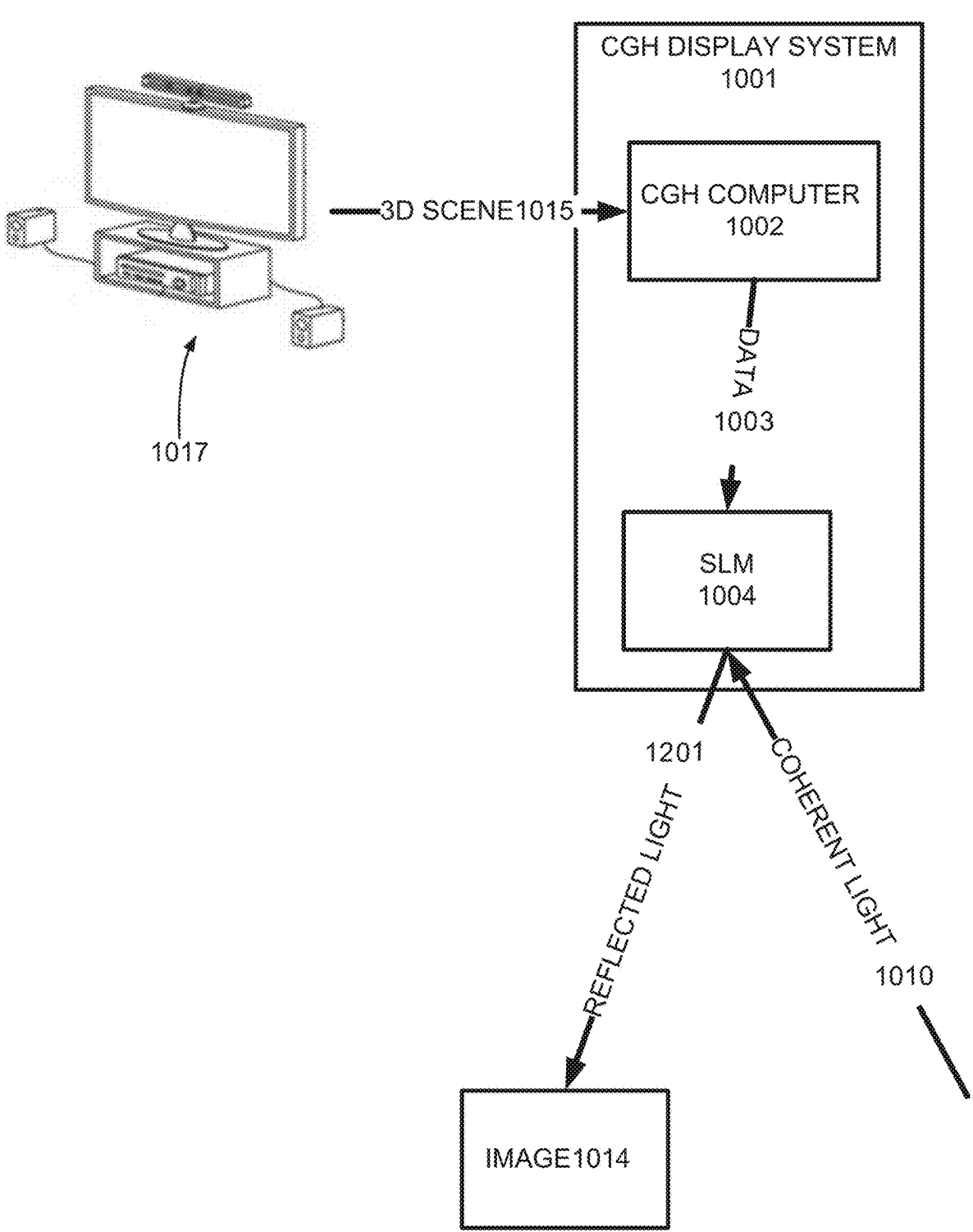
FIG. 10 is a simplified block diagram illustration of a CGH image production system according to an example embodiment of the invention.

Reference is now made to FIG. 10, which is a simplified block diagram illustration of a CGH image production system according to an example embodiment of the invention.

FIG. 10 illustrates a system 1001 and a process of producing a CGH image 1014 by reflected light 1012 from a SLM 1004. Coherent light 1010 is optionally projected onto the SLM 1004, and the reflected light 1012 produces the CGH image 1014.

It is noted that in various embodiments, the SLM, e.g. the SLM 1004, may be a transmissive SLM and not only a reflective SLM.

A CGH computing unit 1002 optionally transmits data 1003 including values for pixels of the SLM, to produce the CGH image 1014 by the reflected light 1012.

The CGH computing unit 1002 optionally receives data 1015 describing a 3D scene which it is desired to display as a 3D CGH image 1014, optionally from an off-board computation unit 1017.

In some embodiments, the HMD includes an onboard communication unit for receiving data for determining SLM pixel settings for display by the HMD, the data being fully or partially calculated at the off-board computation unit 1017. Optionally, the communication is wireless using Wi-Fi, RF, Bluetooth or other wireless communication, or by wire.

In some embodiments, the HMD includes an onboard communication unit which receives settings for SLM pixels which were calculated off-board.

In some embodiments, the HMD includes an onboard communication unit which receives setting for a tile of a partial size relative to the pixel count of the on-board SLM.

It is noted that a computation unit, in some embodiments the off-board computation unit 1017 and in some embodiments, the CGH computing unit 1002 optionally receives: a 3D scene for display, optionally in a form of raw data of the 3D image; and optionally a scene manipulation command such as included in possible interactive commands. The computation unit, whether the off-board computation unit 1017 or the CGH computing unit 1002, iteratively calculate an interference pattern. Output of the computation is optionally an interference pattern for setting pixel values of the SLM. Optionally, output of the off-board computation unit 1017 is an interference pattern of a 2D image, sent to the CGH computing unit 1002 where it is optionally transformed into 3D data.

It is noted that calculating digital holograms is in general a heavy computational task, and it is often desirable to reduce the computational load. Computation complexity in FFT-based (Fast Fourier Transform-based) or DFT-based (Discrete Fourier Transform-based) calculations depends on a matrix size and a number of matrices needed to represent a volume to be displayed. When calculating an FFT It is often more efficient to calculate a 1024×1024 matrix than to calculate a 600×600 matrix, depending on hardware optimization, among other factors, even though the latter is the size which may actually be desired. By way of a non-limiting example, a full HD SLM, having 1920×1080 pixels, may use for calculation purposes a 2048×2048 matrix.

In some embodiments, data and/or computation of SLM pixel settings for generating the CGH image may optionally come from and/or be done and come from a remote computer and may be provided wired or wirelessly.

Tiling

Tiling is a method based on an important property of DFT (Discrete Fourier Transform), which is circularity. A DFT is a circular Fourier transform resulting from its finite size, as opposed to a classic Fourier transform which is typically defined as equivalent to infinite in size. Circularity implies that circularly connecting edges of a calculation matrix results in a continuity. The DFT can be thought of as a standing wave resonator. The DFT size determines the lowest frequencies the DFT can support, and the DFT resolution the highest. Because of circularity, a matrix in the frequency domain can be duplicated and tiled in both dimensions to cover a larger area than the area of the matrix without abrupt discontinuities and projection artifacts.

In some embodiments, covering a full HD SLM having 1920×1080 pixels is optionally achieved by calculating a smaller matrix, say 1024×1024, 512×512, rather than 2048× 2048, and tiling the smaller matrix to cover a larger area than the SLM, and optionally also cropping to the SLM actual size.

Tile size selection: Tile size can determine an amount of information one can represent in a CGH image. A 512×512 tile can represent 512×512 voxels in a CGH image. If the image size is, by way of a non-limiting example, 100×100 mm, a distance between adjacent voxels is 100/512=~0.2 mm. The human visual system typically does not resolve better than 0.2 mm. In some embodiments, a tile larger than 512×512 is not required.

Using tiling potentially provides advantages, such as, by way of some non-limiting examples:

(1) A reduction of computation time. Since CGH calculation according to some embodiments of the invention involves iterative FFT-based optimization, which includes several FFT calculations per optimization, the time saved by using tiling is multiplied by the number of FFTs needed for optimization.

Since CGH calculation usually involves an optimization process containing multiple FFT calculations, the time saved by using a smaller calculation matrix exceeds the time consumed by a copying process used for tiling. For example: if a time to calculate a FFT for a 1024×1024 matrix is $T_{1024}$ and the time to calculate a FFT for a 2048×2048 matrix is $T_{2048}$, and $T_{2048} > T_{1024}$, then in a case of a 10 iteration optimization where each iteration involves 2 FFT calculations, selecting a 1024×1024 tile will result in reducing calculation time by a factor of:

$$[20*(T_{2048}-T_{1024})-\text{Tiling\_Copy\_Time}\approx20*(T_{2048}-T_{1024})$$

Furthermore, if 512×512 tile calculation is selected, tiling results in additional reduction of calculation time. The tiling approach is potentially more efficient as long as time saved by tiling is larger than a time it takes to duplicate tiles to complete a full frame (data copy time).

(2) Providing a potential degree of freedom in a design of a 3D system.

(3) Uses less memory.

(4) Can be used to distribute calculation: one of the limiting factors in distributed computation is communication needed to share data and collect computational results. It is more efficient to pass a tile, optionally with meta-data describing depth of the tile in an image volume, time stamp etc. to be tiled and super imposed at an end point.

In some embodiments, it is potentially possible to save computation power and still calculate SLM pixel setting such that a CGH image appears to react smoothly and continuously to movement of the HMD or a computer-controlled movement of the CGH image. Sensors on the HMD optionally sense a location and/or direction in space of a viewer's eye and optionally sense a user's command gestures.

It is noted that the sensors may include, by way of some non-limiting examples, Kinect gesture recognition, Leap Motion gesture recognition and Intel RealSense technology.

It is noted that command gestures may include, by way of some non-limiting examples, gestures such as described in PCT Patent Application Publication number WO 2015/004670 of Gelman et al.

Information from the sensors is optionally sent to a remote computer, optionally using wireless technology.

Figure 11:
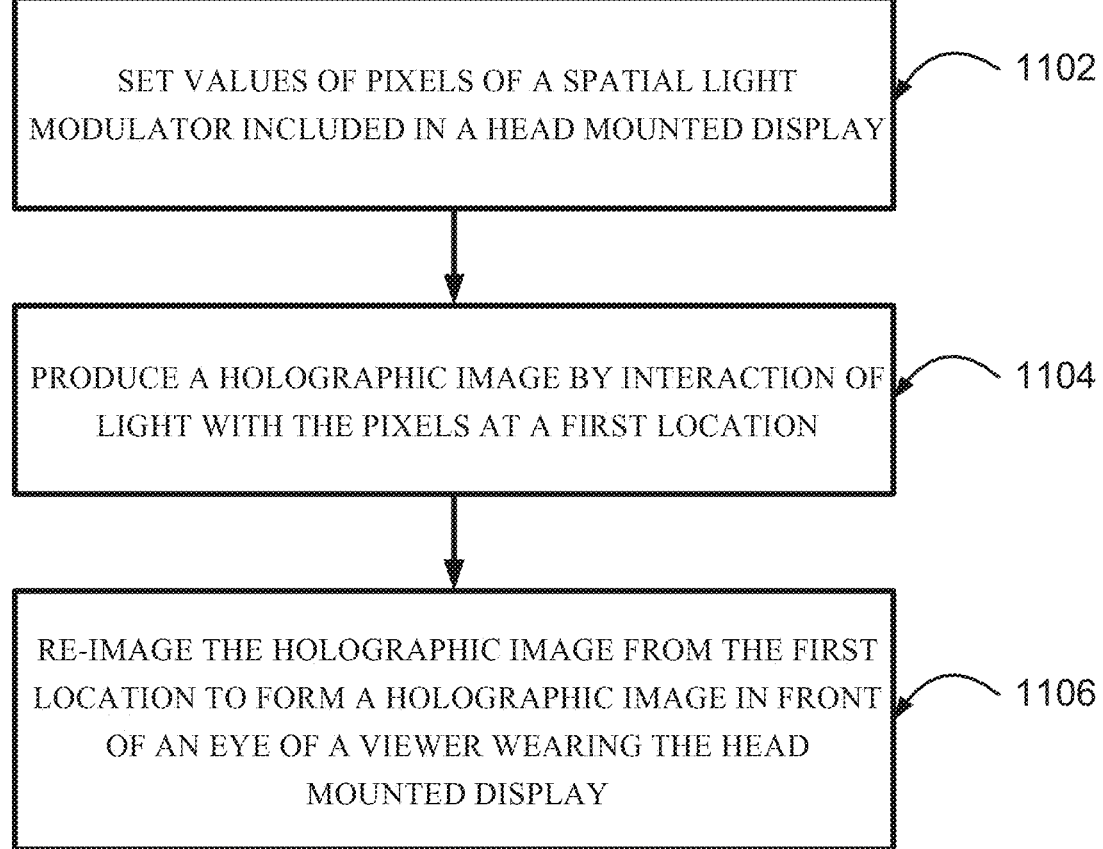
FIG. 11 is a simplified flow chart illustration of a method of displaying a computer generated holographic (CGH) image by a display according to an example embodiment of the invention.

Reference is now made to FIG. 11, which is a simplified flow chart illustration of a method of displaying a computer generated holographic (CGH) image by a display according to an example embodiment of the invention.

The method of FIG. 11 includes:

setting values of pixels of a Spatial Light Modulator (SLM) comprised in a Head Mounted Display (HMD) (1102);

producing a holographic image produced by interaction of light with said pixels at a first location (1104); and re-imaging said holographic image from said first location to form a holographic image in front of an eye of a viewer wearing said HMD (1106).

Background Blocking

In some embodiments, an optional optical component is added between a display which displays a holographic image and an apparent location of the holographic image, to block light from a portion of a field of view of a viewer.

In some embodiments, an optional optical component is added between a display which displays a holographic image and the real world viewable through the display to block light from a portion of a field of view of a viewer.

Blocking the light may optionally improve contrast of the holographic image, by stopping background light coming from an apparent direction of the holographic image.

The portion of the field of view which is blocked is optionally controlled to include:

exactly an area and shape corresponding to a field of view of the entire holographic image;

approximately an area and shape corresponding to a field of view of the entire holographic image;

an area and shape smaller than a field of view of the entire holographic image; and exactly an area and shape larger than a field of view of the entire holographic image.

A few example embodiments of such a component are now described.

Figure 12A:
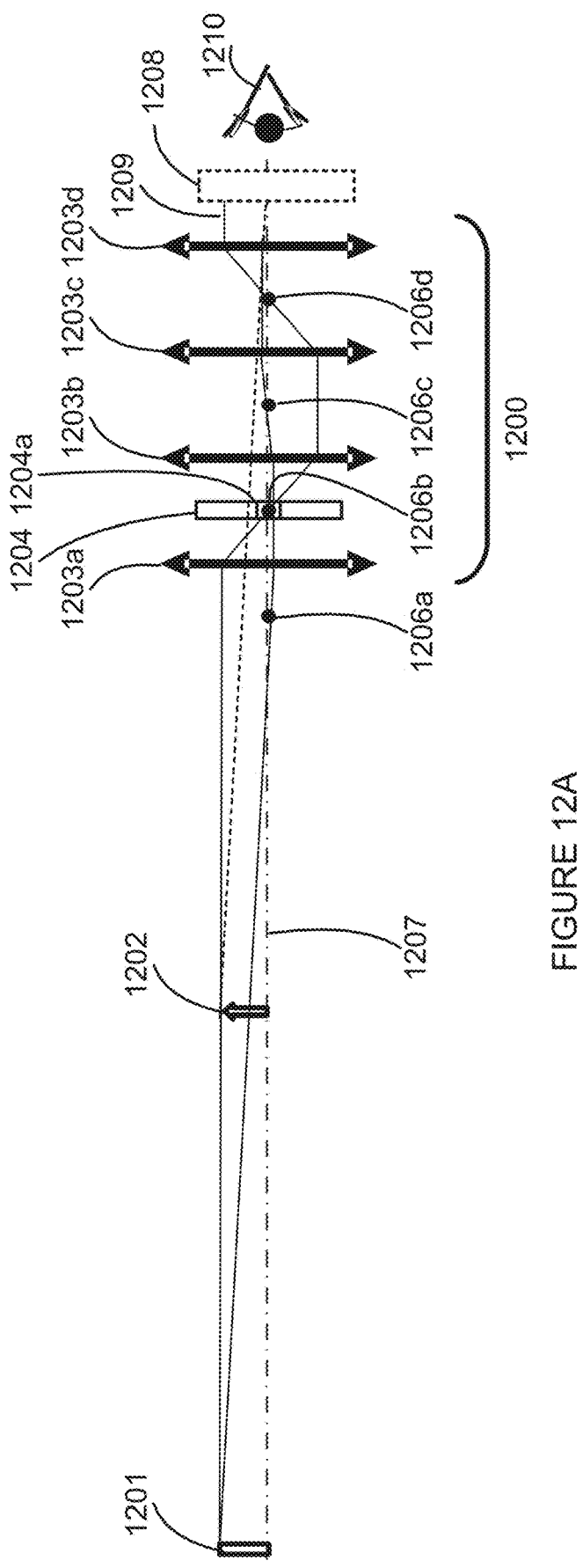
FIG. 12A is a simplified illustration of an optical component for blocking light from a portion of a field of view according to an example embodiment of the invention.

Reference is now made to FIG. 12A, which is a simplified illustration of an optical component for blocking light from a portion of a field of view according to an example embodiment of the invention.

FIG. 12A shows an example optical component 1200 constructed of 4 lenses 1203a 1203b 1203c 1203d, the lenses having equal focal lengths f. The 4 lenses are optionally arranged so that each adjacent pair of lenses is at a distance 2f from each other on a shared optical axis 1207. FIG. 12A shows 4 focal points 1206a 1206b 1206c 1206d, each at a distance off from one or two of the lenses 1203a 1203b 1203c 1203d, as will be understood by a person skilled in the art.

FIG. 12A also shows a filter 1204 in the optical component 1200, placed at a location of the focal point 1206b, at a distance of f from each one of the lenses 1203a and 1203b.

In some embodiments the filter 1204 may optionally be placed at a location of the focal point 1206d.

In some embodiments the optical component 1200 provides a magnification of 1, and an upright image.

A description is now provided of using the optical component 1200 shown in FIG. 12A.

A background object 1201, or just light coming from a portion of the background, travels toward the first lens 1203a, and is focused at a center of the filter 1204, at the focal point 1206a.

The filter 1204 optionally lets light through in some of its area, and blocks light in a portion 1204a of its area. In some embodiments, the blocking portion 1204a is at a center of the filter 1204, where the light from the background object 1201 is focused.

Light from the background object 1201 is blocked, while light from other portions of the background, which passes through the filter 1204 through a non-blocking portion of the filter 1204, is not blocked.

The other three lenses 1203b 1203c 1203d are placed so that an image of the background, which was focused by the lens 1203a, will, by passing through the three lenses 1203b 1203c 1203d and emerging as light 1209, be presented as a right-side-up image to a viewer 1210. The example embodiment of the component 1200 shown in FIG. 12A is sometimes called a 4f system by persons skilled in the art.

In some embodiments the viewer 1210 views the background, or the background object 1201, through a display 1208 such as described herein, which optionally has the component 1200 added. The viewer 1210 sees light from the display 1208 as a holographic image 1202 floating in space, yet benefits from the background object 1201 being blocked from appearing in the viewer's view and interfering with a clear view of the holographic image 1202.

In some embodiments the filter 1204 is a dynamic filter, which can block a dynamically controlled portion of the background light. In some embodiments the filter 1204 is a liquid crystal filter. In some embodiments the filter 1204 is a liquid crystal on silicon (LCOS) filter.

In some embodiments a determination of what area of the filter 1204 should block light is made based on data from a computing unit used to produce the holographic image as a computer generated holographic (CGH) image.

In some embodiments the component 1200 is included as part of the display 1208.

In some embodiments control of the dynamic filter 1204 is performed by the same computing unit which is used to produce the holographic image as a computer generated holographic (CGH) image.

Figure 12B:
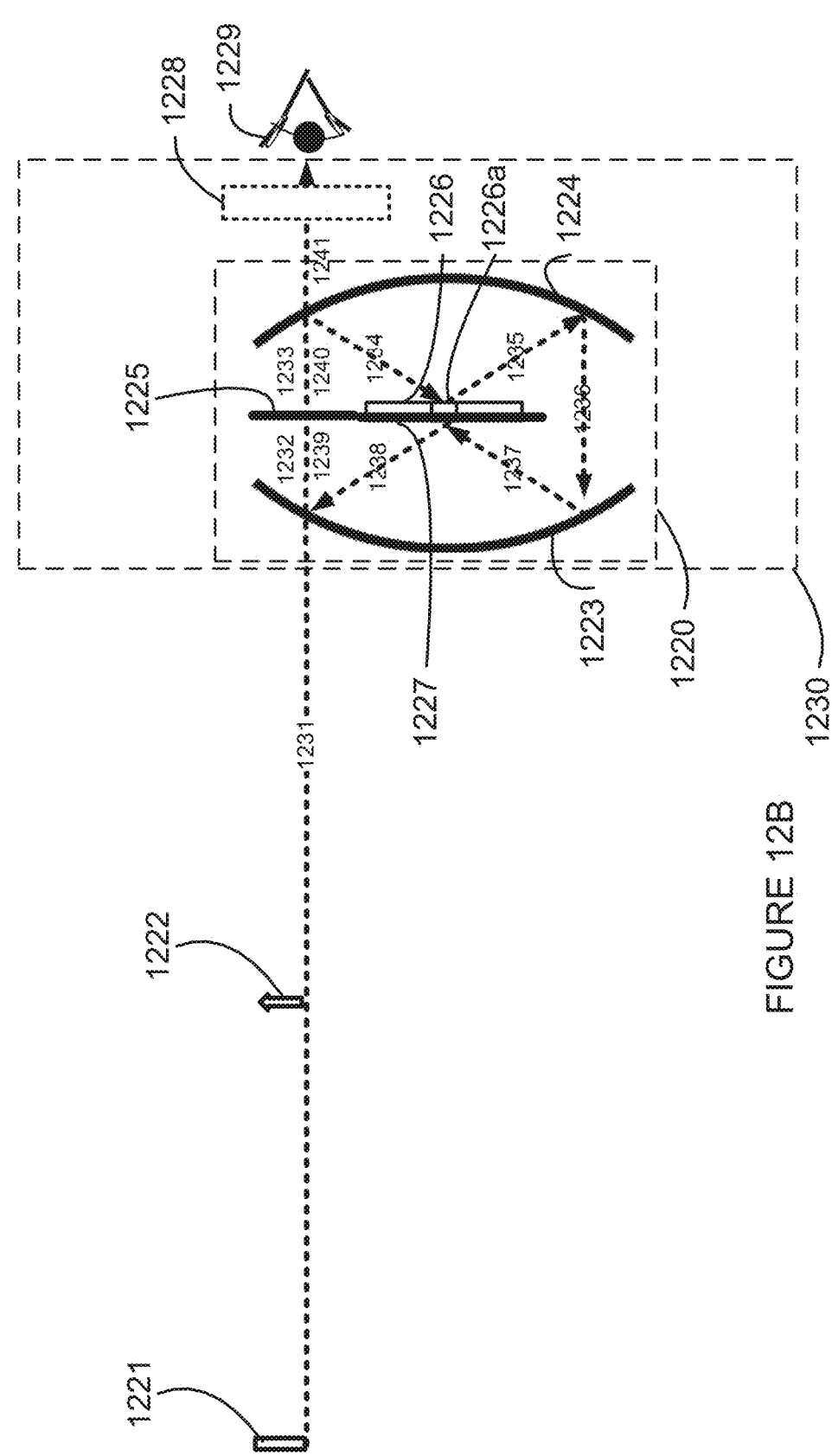
FIG. 12B is a simplified illustration of a display with an optical component for blocking light from a portion of a field of view according to an example embodiment of the invention.

Reference is now made to FIG. 12B, which is a simplified illustration of a display with an optical component for blocking light from a portion of a field of view according to an example embodiment of the invention.

FIG. 12B shows an example display 1230 with an example optical component 1220 which is potentially shorter than the component 1200 of FIG. 12A.

FIG. 12B shows the example optical component 1220 including 2 curved polarizing surfaces 1223 1224, a $\lambda/2$ plate 1225, a filter 1226, and a mirror 1227.

In some embodiments the optical component 1220 provides a magnification of 1, and an upright image.

A description is now provided of using the optical component 1220 shown in FIG. 12B.

Light 1231 from a background object 1221, or just light 1231 coming from a portion of the background, travels toward the first curved polarizing surface 1223, and passes through, emerging as light 1232 polarized with a plane polarization.

The light 1232 impinges upon the $\lambda/2$ plate 1225, which rotates the plane of polarization of the light 1232 by 90 degrees, and emerges as light 1233.

The light 1233 impinges upon the second curved polarizing surface 1224, which is optionally polarized in a same of polarization as the first curved polarizing surface 1223, and reflects the light 1233, which is polarized at 90 degrees to the plane of polarization of the second curved polarizing surface 1224, as light 1234.

The light 1234 impinges upon the filter 1226. The filter 1226 optionally lets light through in some of its area, and blocks light in a portion 1226a of its area. In some embodiments, the blocking portion 1226a is at a center of the filter 1226, where the light from the background object 1221 is focused.

Light from the background object 1221 is blocked, while light from other portions of the background, which passes through the filter 1226 through a non-blocking portion of the filter 1226, is not blocked.

Light 1235 from the filter 1226 continues, containing light from the non-blocking portions of the filter 1226, and impinges upon the second curved polarizing surface 1224.

The light 1235 is reflected from the second curved polarizing surface 1224 as light 1236, again since the light 1235 is still plane polarized at 90 degrees to the plane of polarization of the second curved polarizing surface 1224.

The light 1236 is reflected from the first curved polarizing surface 1223 as light 1237, again since the light 1236 is still plane polarized at 90 degrees to the plane of polarization of the first curved polarizing surface 1223.

The light 1237 is reflected from the mirror 1227 as light 1238, and reflected from the first curved polarizing surface 1223 as light 1239, since the light 1239 is still plane polarized at 90 degrees to the plane of polarization of the first curved polarizing surface 1223.

The light 1239 passes through the $\lambda/2$ plate 1225, which rotates the plane of polarization of the light 1239 by 90 degrees, and emerges as light 1240.

The light 1240 passes through the second curved polarizing surface 1224, emerging as light 1241, since the light 1240 has been rotated twice 90 degrees, and is now polarized parallel to the plane of polarization of the second curved polarizing surface 1224.

A viewer 1229 views the background, less whatever portion of the background has been blocked by the filter 1226.

In some embodiments the viewer 1229 views the background, or the background object 1221, through a display 1228 such as described herein, which optionally has the component 1220 added. The viewer 1229 sees light from the display 1228 as a holographic image 1222 floating in space, yet benefits from the background object 1221 being blocked from appearing in the viewer's view and interfering with a clear view of the holographic image 1222.

In some embodiments the filter 1226 is a dynamic filter, which can block a dynamically controlled portion of the background light. In some embodiments the filter 1226 is a liquid crystal filter. In some embodiments the filter 1226 is a liquid crystal on silicon (LCOS) filter.

In some embodiments a determination of what area of the filter 1226 should block light is made based on data from a computing unit used to produce the holographic image as a computer generated holographic (CGH) image.

In some embodiments the component 1220 and the display 1228 are both included as part of the display 1230.

In some embodiments control of the dynamic filter 1226 is performed by the same computing unit which is used to produce the holographic image as a computer generated holographic (CGH) image.

Figure 12C:
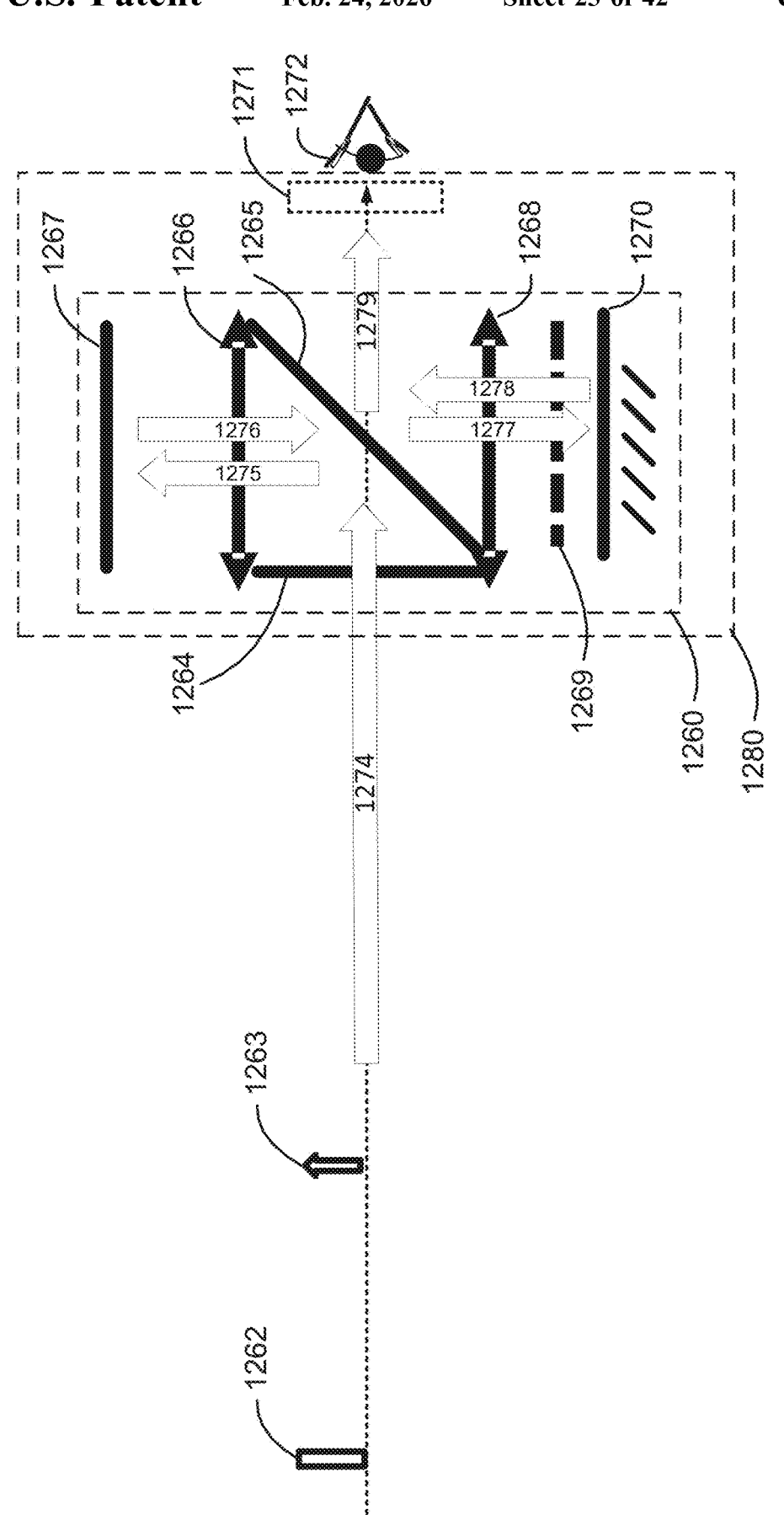
FIG. 12C is a simplified illustration of a display with an optical component for blocking light from a portion of a field of view according to an example embodiment of the invention.

Reference is now made to FIG. 12C, which is a simplified illustration of a display with an optical component for blocking light from a portion of a field of view according to an example embodiment of the invention.

FIG. 12C shows an example display 1280 with an example optical component 1260 which is potentially shorter than the component 1200 of FIG. 12A.

FIG. 12C shows the example optical component 1260 including a polarizer 1264; a polarizing beam splitter 1265; a first optional focusing component such as a first lens 1266; a reflecting polarization-rotating component 1267, such as a Liquid Crystal On Silicon (LCOS), optionally without the typical polarizer in a typical LCOS; a second optional focusing component such as a second lens 1268; a λ/4 plate 1269; and a mirror 1270.

In some embodiments the optical component 1260 provides a magnification of 1, and an upright image. In such embodiments the optical component 1260 does not change magnification of a display in which it is included.

In the example embodiment shown in FIG. 12C the LCOS component is used without a polarizer filter which typically comes with LCOS components.

A description is now provided of using the optical component 1260 shown in FIG. 12C.

Light 1274 from a background object 1262, or just light 1274 coming from a portion of the background, travels toward the polarizer 1264 and partially passes through, emerging as polarized light 1274, polarized with a plane polarization.

The polarized light 1274 impinges upon the polarizing beam splitter 1265, which reflects light polarized in one plane, and lets through light polarized in a perpendicular plane. The plane of polarization of the polarizer 1264 and the polarizing beam splitter 1265 are selected so that the polarized light 1274 is reflected off the polarizing beam splitter 1265 as polarized light 1275.

The polarized light 1275 passes through the optional first lens 1266, and impinges upon the LCOS component 1267. In some embodiments the LCOS component 1267 is placed at a location of the focal point of the first lens 1266, and the distance between the LCOS component 1267 and the first lens 1266 is termed f, as described above with reference to FIG. 12A.

The LCOS component 1267 reflects the light 1275, as light 1276, and optionally rotates polarization of the reflected light, optionally rotates polarization of just a portion of the reflected light, optionally in just a portion of an area of the LCOS component 1267.

The light 1276 is optionally partly reflected without a change in polarization, and partly reflected with a change of 90 degrees in polarization. Optionally, a portion of the light which is reflected without a change of 90 degrees in polarization is reflected off an area of the LCOS 1267 which is controlled so as to block view of a background object such as the background object 1262, or to block background light from a specific portion of the background which optionally corresponds to a background of an object or corresponds to a background of a scene displayed by a display 1271. The area or portion of the light which is reflected without a change of polarization is the area or portion of the light which it is desired to block. The area or portion of the light which is reflected with a change of polarization is the area or portion of the light which it is desired not to block.

The light 1276 partly passes through the optional first lens 1266 and the polarizing beam splitter 1265, and is partly reflected. The part of the light 1276 which was reflected without a change in polarization is again reflected off the polarizing beam splitter 1265, and returns in a direction opposite to the light 1274. The part of the light 1276 which was reflected with a change in polarization passes through the polarizing beam splitter 1265, as polarized light 1277.

In some embodiments a distance between the first lens 1266 and the second 1268 is 2f, and the two lenses have the same focal lens f.

The polarized light 1277 passes through the optional second lens 1268, and impinges upon the λ/4 plate 1269. In some embodiments the mirror 1270 is placed at a location of the focal point of the second lens 1268, and the distance between the mirror 1270 and the second lens 1268 is termed f, as described above with reference to FIG. 12A.

The polarized light 1277 passes through the λ/4 plate 1269 and its plane of polarization is rotated by 45 degrees, and is reflected off the mirror 1270 as polarized light 1278.

The polarized light 1278 passes through the λ/4 plate 1269 and its plane of polarization is rotated by 45 degrees, and passes through the optional second lens 1268.

The polarized light 1278 impinges upon the polarizing beam splitter 1265, having a plane of polarization changed by a total of 90 degrees since last passing through the polarizing beam splitter 1265. The polarized light 1278 is now reflected off the polarizing beam splitter 1265 as light 1279.

In some embodiments the light 1279 reaches a viewer's eye 1272, optionally with a portion of the background blocked from view.

In some embodiments the light 1279 passes through a display 1271. The viewer eye 1272 sees what is displayed by the display 1271, and sees a view of the background, except what was blocked by the LCOS component 1267.

A viewer's eye 1272 sees the background, less whatever portion of the background has been blocked by the optical component 1260.

In some embodiments the LCOS component 1267 is a dynamic component, which can block a dynamically controlled portion of the background light.

In some embodiments a determination of what area of the LCOS component 1267 should block light is made based on data from a computing unit used to produce a holographic image as a computer generated holographic (CGH) image for display by the display 1271.

In some embodiments the component 1260 and the display 1271 are both included as part of the display 1280.

In some embodiments control of the LCOS component 1267 is performed by the same computing unit which is used to produce the holographic image as a computer generated holographic (CGH) image.

Reference is now made to FIG. 12D, which is a simplified flow chart illustration of a method of displaying a Computer Generated Holographic (CGH) image by a display.

The method of FIG. 12D includes:

setting pixel values of a Spatial Light Modulator (SLM) comprised in a Head Mounted Display (HMD) (1242);

producing an interference based holographic image at a first location by projecting coherent light onto said SLM (1244);

re-imaging said holographic image from said first location to form a holographic image in front of an eye of a viewer wearing said HMD (1246);

enabling the eye of the viewer to view a real world view in addition to the holographic image (1248); and blocking a portion of the real world view, the portion of the real world view being blocked overlapping, at least in part, at least a portion of the holographic image (1250).

Zero Order Diffraction (ZOD) Bright Spot Blocking Using a Distributed Bragg Reflector (DBR)

A distributed Bragg reflector (DBR) is a reflector sometimes used in waveguides, such as optical fibers. It is a structure formed from multiple layers of alternating materials with varying refractive index, or by periodic variation of some characteristic (such as height) of a dielectric waveguide, resulting in periodic variation in the effective refractive index in the guide. Each layer boundary causes a partial reflection of an optical wave. For waves whose wavelength is close to four times the optical thickness of the layers, the many reflections combine with constructive interference, and the layers act as a reflector at the above-mentioned wavelength. A range of wavelengths that are reflected is called a photonic stopband. Within the photonic stopband, light is "forbidden" to propagate forward in the structure.

DBR are known to have selective reflection of optical waves at a specific wavelength and for a specific direction. This is optionally used to block the zero order diffraction light, optionally before a focusing lens.

In some embodiments, a DBR is used to block a plane wave of light reflected off a face of an SLM, which is light which would produce the ZOD bright spot. The DBR is specific to a wavelength of light and to an angle of light impinging upon it. Light with wavelength $\lambda$, impinging at an angle $\alpha$ to a normal to a face of the DBR is treated by the DBR as light having a wavelength $\lambda$, $\cos(\alpha)$, which is slightly different than $\lambda$, and is therefore potentially not reflected or blocked, but allowed through.

An equation describing behavior of a DBR is the Bragg equation:

$$2\pi n\Lambda \cos)\theta)=m\lambda \qquad \text{Equation 2}$$

where $\Lambda$ is a distance between the DBR layers, n is a refractive index of the material of the DBR, $\theta$ is a relative angle between impinging light and a direction of a normal to the DBR layers, and $m\lambda$ is an integer number of wavelengths.

The specific angular response can be calculated according to textbooks such as above-mentioned "Optical Waves in Layered Media", Pochi Yeh, Wiley, 3 Mar. 2005-Science, pages 129-134.

When the SLM is used to produce a holographic image, the SLM produces light propagating at various angles. A portion of the light for producing the holographic image is blocked by the DBR, and another portion is allowed through.

In some embodiments, a DBR is placed on an optical axis of the light coming from the SLM prior to other optic elements, optionally prior to focusing optic elements, which may change direction of the light coming from the SLM.

In some embodiments, for example when three coherent light sources are used to produce a color holographic image, three DBR are placed on an optical axis of the light coming from the SLM, each one of the DBRs blocking on-axis light at a specific wavelength corresponding to one of the three coherent light sources, and allowing through light at other wavelengths.

Figure 13A:
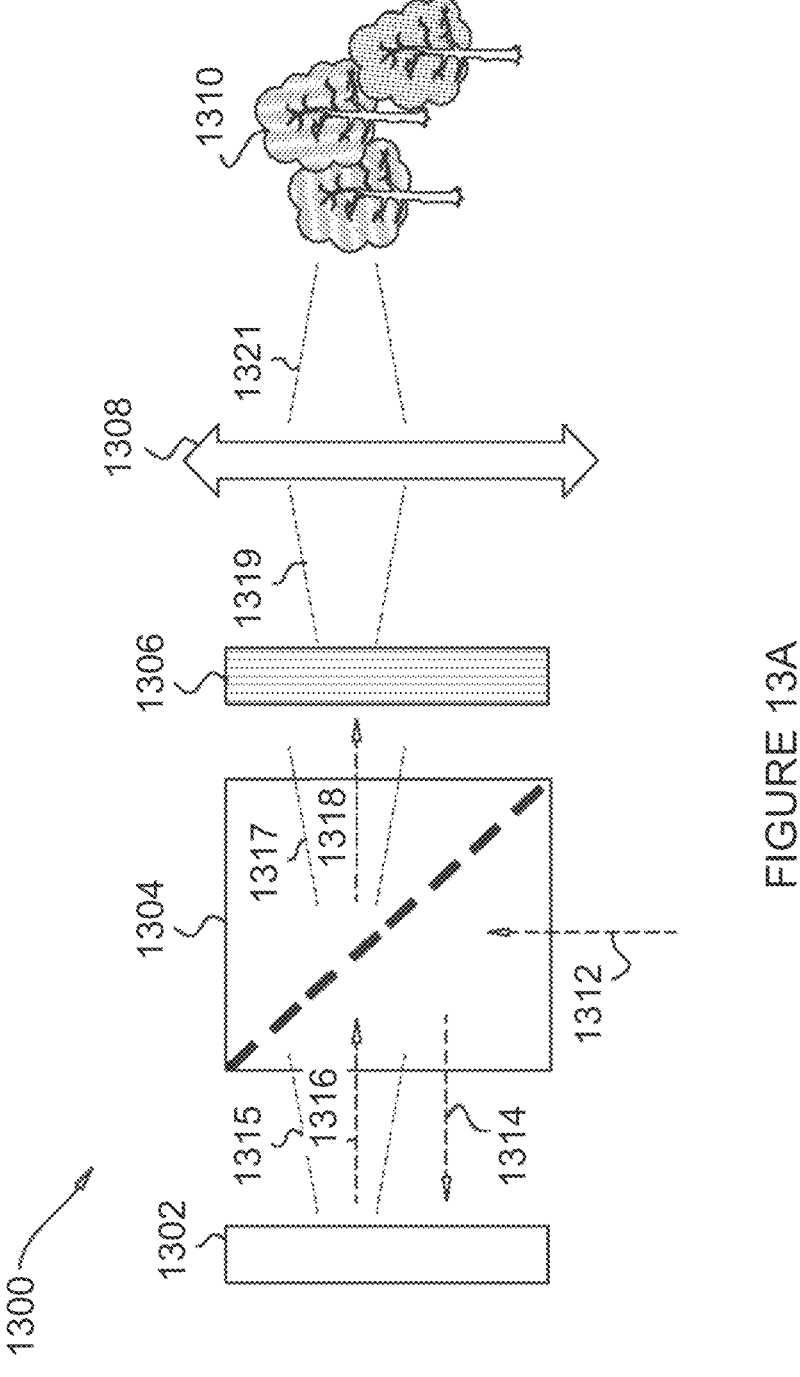
FIG. 13A is a simplified line drawing illustration of a system for displaying a holographic image using a distributed Bragg reflector (DBR) to block light for producing a ZOD bright spot according to an example embodiment of the invention.

Reference is now made to FIG. 13A, which is a simplified line drawing illustration of a system for displaying a holographic image using a distributed Bragg reflector (DBR) to block light for producing a ZOD bright spot according to an example embodiment of the invention.

FIG. 13A shows a system 1300 for displaying a holographic image, including:

a Spatial Light Modulator (SLM) 1302;

a beam splitter 1304;

a distributed Bragg reflector (DBR) 1306; and an optional optical focusing element 1308.

An example description of a light path through the system 1300 is now provided:

Coherent light 1312 enters the beam splitter 1304, and is reflected as light 1314 toward the SLM 1302.

The SLM 1302 reflects some of the light 1314 as reflected light 1316 from a face of the SLM 1302, and produces modulated light, for producing a holographic image, which is drawn in FIG. 13A as a light cone 1315.

The light 1316 and the light cone 1315 pass through the beam splitter 1304 and onto the DBR 1306, as light 1318 and light cone 1317 respectively.

The DBR 1306 blocks the light 1318, which represents an on-axis reflection of light 1316 from a face of the SLM 1302, and also an on-axis portion of the light from the light cone 1317.

Light passes through the DBR and out the other side of the DBR 1306 as a light cone 1319, which includes of-axis light from the light cone 1317, which corresponds to some of the modulated light cone 1315 for producing a holographic image.

In some embodiments the light cone 1319 is viewed by a viewer as displaying a holographic image 1310.

In some embodiments the light cone 1319 optionally passes through one or more focusing optical elements, such as the optional optical focusing element 1308, and, when viewed by a viewer, displays the holographic image 1310.

Figure 13B:
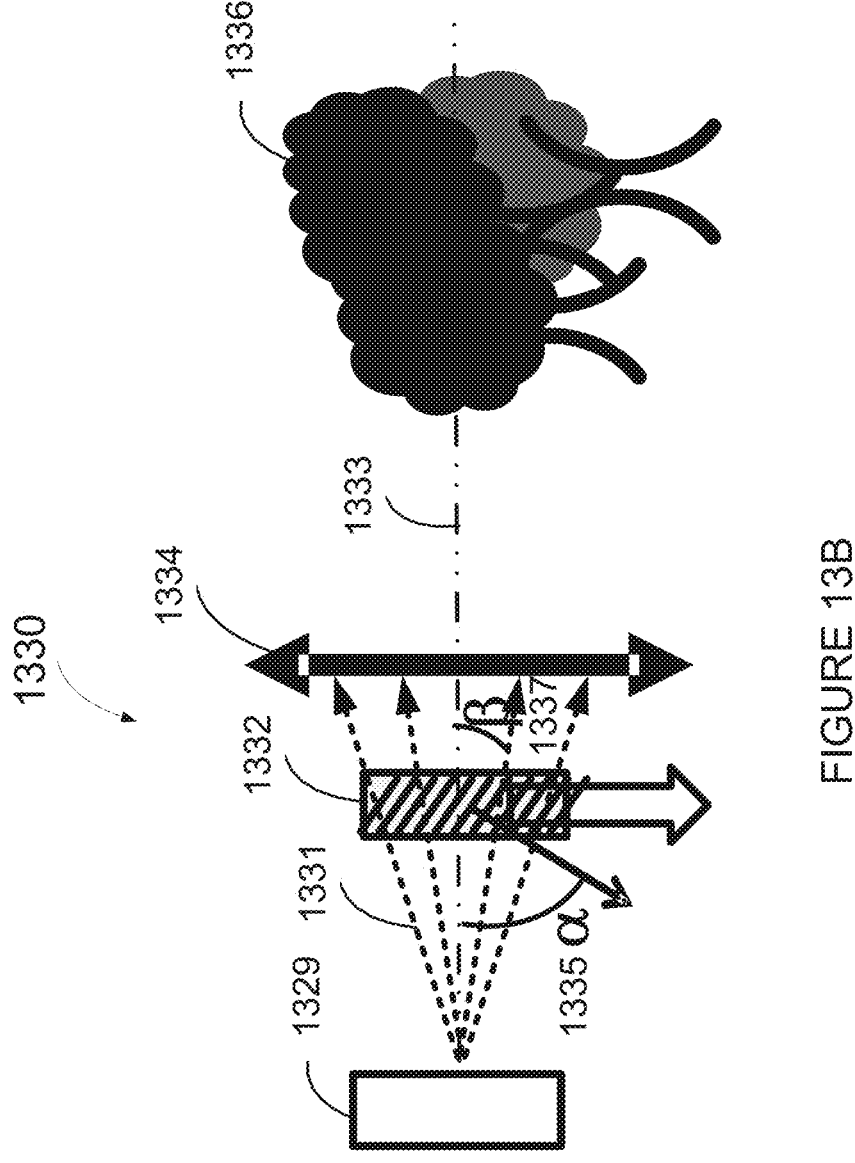
FIG. 13B is a simplified line drawing illustration of a system for displaying a holographic image using a distributed Bragg reflector (DBR) to block light for producing a ZOD bright spot according to an example embodiment of the invention.

Reference is now made to FIG. 13B, which is a simplified line drawing illustration of a system for displaying a holographic image using a distributed Bragg reflector (DBR) to block light for producing a ZOD bright spot according to an example embodiment of the invention.

FIG. 13B shows a system 1330 for displaying a holographic image, including:

a SLM 1329;

a distributed Bragg reflector (DBR) 1332; and an optional optical focusing element 1334.

An example description of a light path through the system 1330 is now provided: Coherent light 1331 travels from the SLM 1329, partly including modulated light, and partly as a plane-wave which is light which will produce the ZOD bright spot.

The coherent light 1331 travels from the SLM 1329 onto a DBR 1332.

The DBR 1332 reflects the plane-wave component of the light 1331, and allows through all light that is not at the same wavelength and propagation direction as the plane wave component.

In some embodiments the BDR comprises multiple layers of materials with varying refractive index, a normal to a face of the layers at an inclination angle α 1335 to an optical axis 1333 of the system 1330.

The plane-wave component of the light 1331 which travels along the optical axis is reflected (not shown) at an angle 2·α from the DBR.

Portions of the light 1331 at an angle β to the optical axis 1333 pass through the DBR 1332, optionally through the optional optical focusing element 1334, and form a holographic image, without a ZOD bright spot, or at least with a reduced-intensity ZOD bright spot.

A DBR positioned after the SLM 1329 and before the lens 1334 eliminates light traveling along the optical axis at angles smaller than a diffraction angle β and reduces a ZOD bright spot.

In some embodiments, such as when producing a Fresnel CGH image, there is no focusing lens such as the lens 1334 along an optical path from the SLM 1329 to the holographic image 1336. A DBR positioned after the SLM 1329, even without any focusing lens such as the lens 1334, eliminates light traveling along the optical axis at angles smaller than a diffraction angle β and potentially reduces background noise in the holographic image 1336.

In some embodiments a Fresnel CGH image is produced by an optical system without using a lens such as the lens 1334. In such systems there is no ZOD spot to block, yet plane wave blocking potentially reduces noise in the holographic image by blocking a reflection from a front face of the SLM 729.

In some embodiments, in order to achieve an angular filtering of light for angles greater than approximately β=1 mrad, a Photo-Thermo-Refractive (PTR) holographic element is optionally used, by way of a non-limiting example with a refractive index change in an order of magnitude of approximately ~$10^{-4}$ and with an order of magnitude of approximately 20,000 layers, each approximately 100 nm thick, for a total PTR component thickness of approximately 2 mm.

In some embodiments a DBR is used which has an inclination angle α 1335 of the DBR layers.

In some embodiments an inclination angle α 1335 is chosen, by way of a non-limiting example, to be at least α=20 degrees or greater.

In some embodiments, taking a typical refractive index of glass of –1.5, a 30 degrees value for the angle α is selected.

In some embodiments the angle α is optionally implemented by tilting the DBR element with respect to the optical axis of an incident beam.

In some embodiments, the angle α is optionally implemented by tilting a writing procedure used to produce the DBR, for example in a PTR, relative to a direction of incident light. In FIG. 7B a defines the DBR tilt it cannot be relative to the DBR it is the angle of the DBR with respect to the incident light. In some embodiments such an implementation is preferable, since the DBR may be placed normal to the optical axis and contributes less length to the optical system.

FIG. 13B shows an angle α>20 degrees.

An equation governing the DBR is the above-mentioned Bragg equation.

Some potential advantages of using a DBR to block a ZOD bright spot are:

a length of the optical system can be made shorter than in some other embodiments described herein; and a DBR provides an ability to block the ZOD bright spot entirely, or almost entirely, while passing through much of the light for producing a holographic image, so the holographic image is without a dark spot which may require filling in, as described with reference to some other embodiments described herein.

In some embodiments, a ZOD bright spot size and shape are optionally calculated, optionally taking into account an optical configuration designed for projecting the holographic image. Typically for a square aperture SLM, the ZOD bright spot intensity is a sinc function in two transverse directions. In some embodiments a DBR is designed to produce a reflection function in Fourier space, at the focal plane, corresponding to the sinc function of the ZOD bright spot. In some embodiments the DBR is optionally designed to have a sinc response in an angular direction of propagation.

In some embodiments, spatial and/or temporal coherence desired of the coherent light source(s) are calculated and designed so as to provide light coherence equal to or better than required by the DBR to block on-axis light reflected from a face of the SLM.

Reference is now made to FIG. 13C, which is a simplified flow chart illustration of a method for blocking non-modulated light from a Spatial Light Modulator (SLM) and allowing through modulated light for projecting a holographic image according to an example embodiment of the invention.

The method of FIG. 13C includes:

illuminating the SLM with coherent light, thereby producing light modulated by the SLM and light not modulated by the SLM (1342); and projecting the mix of the modulated light and the not modulated light along an optical axis onto a distributed Bragg reflector (DBR) (1344);

wherein the DBR reflects the not modulated light and allows through modulated light which is at an angle to the optical axis (1346).

Apodization

A ZOD bright spot intensity is partially caused by reflection of light from features of a size that is in the order of the SLM size. For example, light reflected from a front surface of an SLM doesn't pass through the SLM, is not modulated to form a specific image, and diffracts to the ZOD bright spot. An SLM front surface with a rectangular or square shape produces a ZOD bright spot with an intensity distribution typically shaped in a "sinc-function" pattern, with side lobes. The side-lobes include a few percent of the total ZOD intensity. Due to a high ZOD intensity it is useful, in some embodiments, to block a large portion, for example above 99.9%, of the ZOD intensity, which causes some embodiments of a ZOD blocking spot to cover up to at least a first, sometimes more, of the side-lobes. Such a blocking spot may potentially block a large portion of an image.

An aspect of some embodiments of the invention includes reducing intensity and spatial extent of the ZOD bright spot by placing an apodization filter in front of an SLM producing the holographic image.

Apodization is an optical filtering technique. It is a technical term for changing a shape of a mathematical function, in the present specification and claims the term is used for changing a shape of an intensity profile of light travelling from the SLM.

In some embodiments apodization modulates amplitude of light leaving SLM boundaries, or boundaries of an aperture. The apodization reduces an intensity of side-lobes of the ZOD bright spot, and a ZOD blocker is optionally made smaller.

In some embodiments apodization can be such that an average amplitude at an edge of the SLM, be it rectangular, square, or some other shape, is optionally reduced by 50%. Additional values for percentage of reduction include percentage values in a range from 5% to 99%.

In some embodiments, the apodization provides a smooth intensity gradient profile. The smooth amplitude edge is optionally extended from the boundaries of the SLM to a distance in a range of 1 to 2 to 500 wavelengths and more. The distance corresponds, in case of visible light, to approximately between 0.5 to 1 to 250 microns from the SLM edge for a non-limiting example of green light which has 0.5 micron wavelength.

The edge of the SLM is considered, in the present specification and claims, as a location where the amplitude vanishes.

In some embodiments the edge of the SLM is optionally defined by illuminating only part of the SLM, the edge being where illumination drops to below, by way of a non-limiting example, 10% of the maximal intensity.

In some embodiments the edge of the SLM is optionally defined by placing a filter in front of the SLM, the filter reducing intensity of light passing through the filter.

In some embodiments apodization is achieved by placing an optic stop along the optical axis leading from the SLM to a location of a holographic image, optionally at a location in a vicinity of a location where a real image of an SLM is in focus.

In some embodiments apodization is achieved by placing an optic stop along an optical axis leading from coherent illumination toward the SLM, so the optic spot performs apodization to coherent light illuminating the SLM.

In some embodiments the edge of the SLM is optionally smaller than the physical boundaries of the SLM.

Figure 14B:
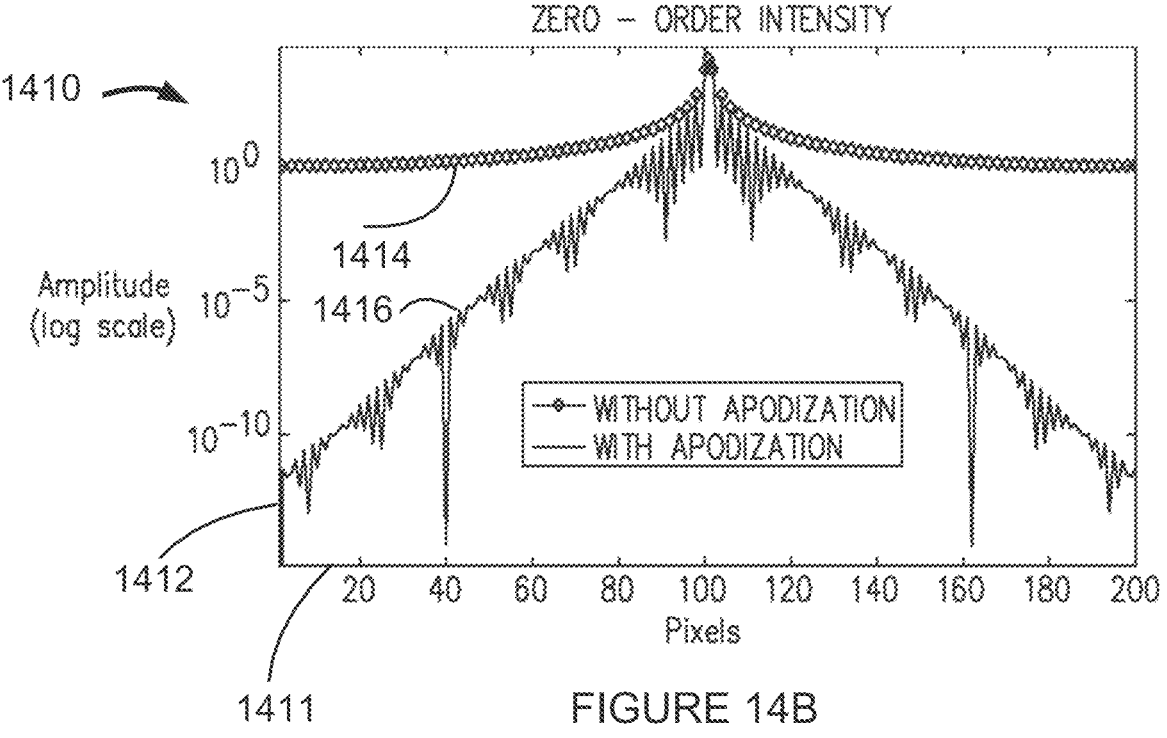
FIG. 14B is a graph showing normalized intensity of the light of FIG. 14A when the light reaches a plane of zero-order diffraction, according to an example embodiment of the invention.
Figure 14A:
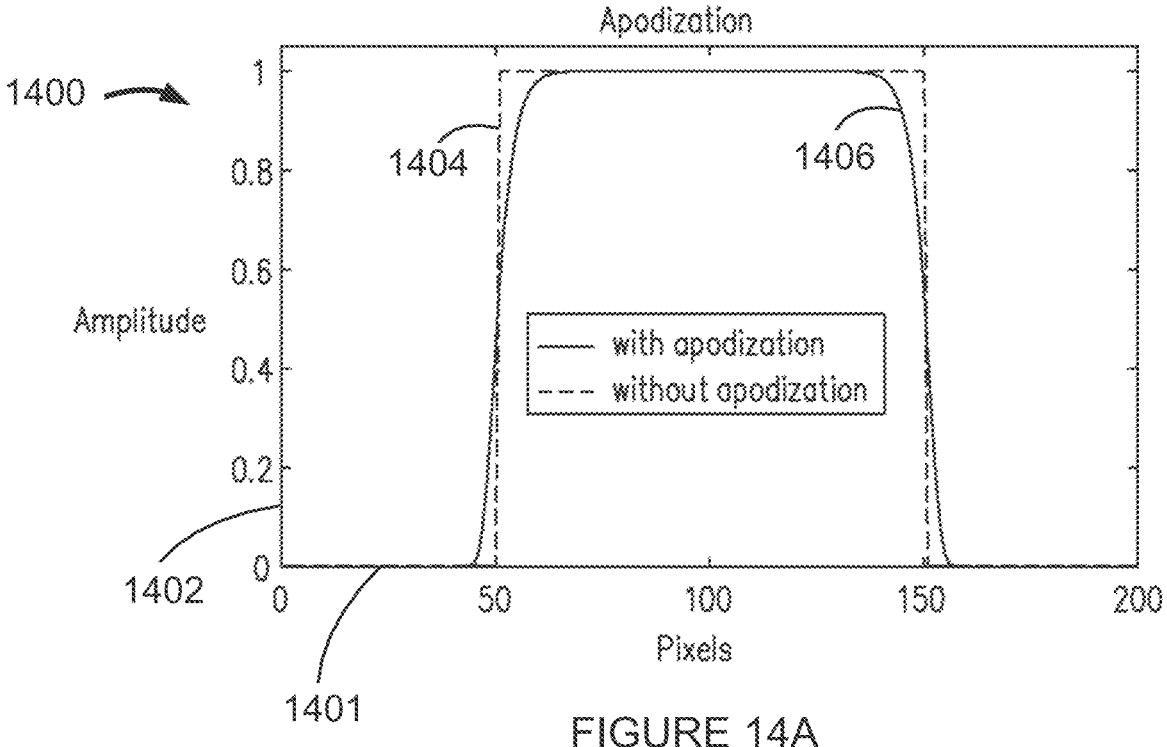
FIG. 14A is a graph showing normalized light intensity leaving from at least a portion of an SLM according to an example embodiment of the invention.

Reference is now made to FIG. 14A, which is a graph showing normalized light intensity leaving from at least a portion of an SLM according to an example embodiment of the invention.

FIG. 14A is a graph 1400, having an x-axis 1401 in units of SLM pixels, and a y-axis 1402 in normalized light intensity.

FIG. 14A shows, using a dashed line 1404, intensity of light leaving the SLM without apodization, and using a solid line 1406, intensity of light leaving the SLM with apodization. The maximum intensity of the light is as a normalized value of "1", without units.

Reference is now made to FIG. 14B, which is a graph showing normalized intensity of the light of FIG. 14A when the light reaches a plane of zero-order diffraction, according to an example embodiment of the invention.

FIG. 14B is a graph 1410, having an x-axis 1411 in units of length expressed as a length of pixels of the SLM of FIG. 14A, and a y-axis 1412 in a logarithmic scale of normalized light intensity.

FIG. 14B shows, using a first line 1414, intensity of light at the plane of zero-order diffraction without apodization, and using a second line 1416, intensity of light at the plane of zero-order diffraction with the apodization of the solid line 1406 of FIG. 14A.

The second line 1416 of shows how apodization reduces an intensity of the side-lobes of the zero order at the focal plane.

In the non-limiting example embodiment of FIGS. 14A and 14B the edge is not the physical edge of the SLM, which is at pixels 1 and 200. The edge is the interface between vanishing amplitude and non-vanishing amplitude, which for the dashed line 1404 of FIG. 14A is at pixels 50 and 150.

FIGS. 14A and 14B show a non-limiting example with and without apodization at the SLM and how apodization reduces intensity of side-lobes of the zero order at a focal plane.

Figure 14C:
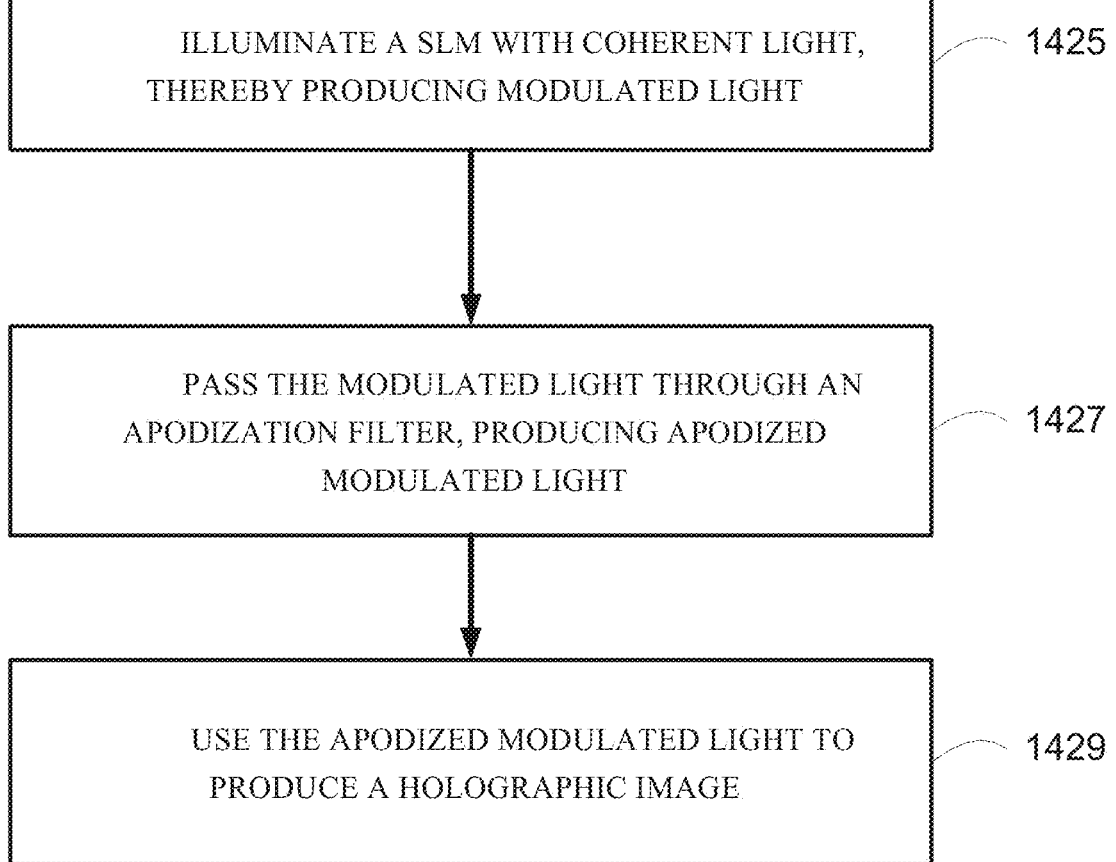
FIG. 14C is a simplified flow chart illustration of a method for reducing Zero Order Diffraction (ZOD) bright spot intensity in Spatial Light Modulator (SLM) projection of holographic images according to an example embodiment of the invention.

Reference is now made to FIG. 14C, which is a simplified flow chart illustration of a method for reducing Zero Order Diffraction (ZOD) bright spot intensity in Spatial Light Modulator (SLM) projection of holographic images according to an example embodiment of the invention.

The method of FIG. 14C includes:

illuminating a SLM with coherent light, thereby producing modulated light (1425); and passing the modulated light through an apodization filter, producing apodized modulated light (1427); and using the apodized modulated light to produce a holographic image (1429).

In some embodiments the apodization filter is optionally placed just before the SLM. In some embodiments the apodization filter is optionally placed at a vicinity of an SLM real-image.

Figure 14D:
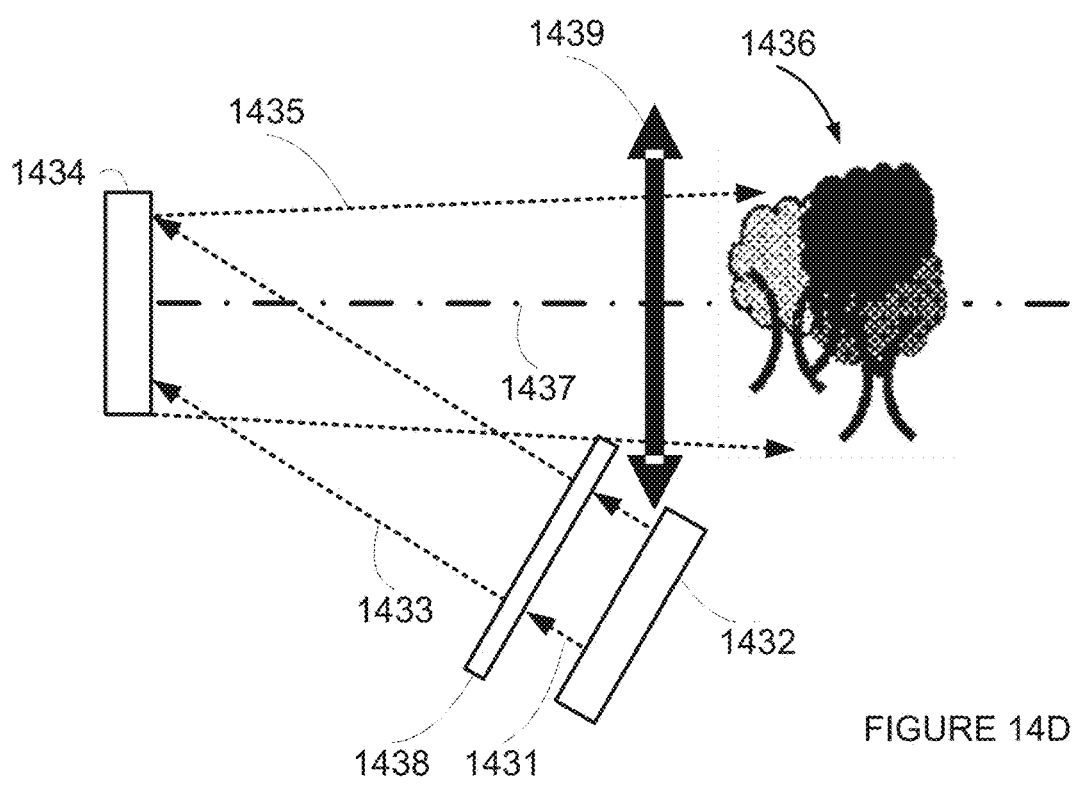
FIG. 14D is a simplified line drawing illustration of a system for displaying a holographic image and reducing an intensity of a Zero Order Diffraction (ZOD) bright spot associated with the holographic image according to an example embodiment of the invention.

Reference is now made to FIG. 14D, which is a simplified line drawing illustration of a system for displaying a holographic image and reducing an intensity of a Zero Order Diffraction (ZOD) bright spot associated with the holographic image according to an example embodiment of the invention.

FIG. 14D shows a display which includes apodizing coherent illumination which is used for producing the holographic image.

FIG. 14D shows a coherent light source 1432, an apodizing filter 1438, and a SLM 1434.*a* SLM 1434 and a focusing optical element such as a lens 1439.

In some embodiments the distance of the apodizing filter 538 from the SLM 534 is less than a distance z which corresponds to a Fresnel number $N_f{>}50$, where the Fresnel number is defined as follows:

$$N_f{=}w^2/\lambda z$$

Where w is a width of a light beam or a width of the SLM, $\lambda$ is a wavelength of the light, and z is the distance.

Light 1431 from the coherent light source 1432 passes through the apodizing filter 1438, emerging as light 1433. The light 1433 impinges upon the SLM 1434, emerging as modulated light 1435 along an optic axis 1437, passes through the lens 1439, forming a holographic image 1436.

Figure 14E:
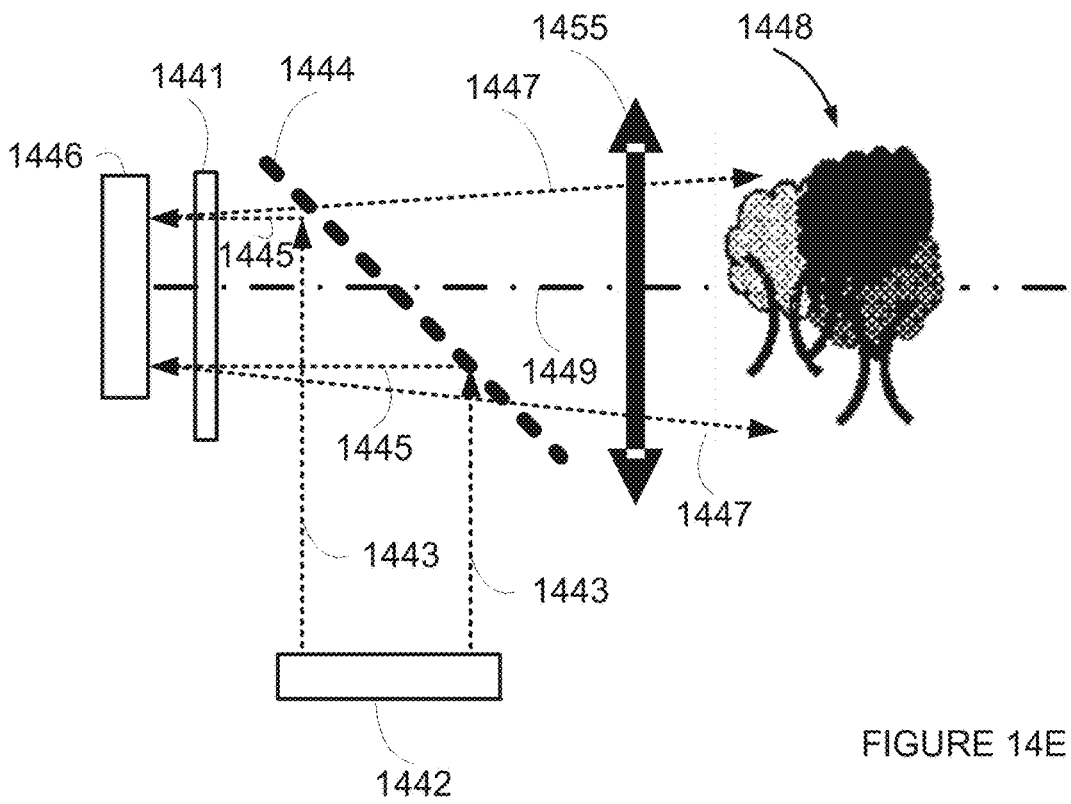
FIG. 14E is a simplified line drawing illustration of a system for displaying a holographic image and reducing an intensity of a Zero Order Diffraction (ZOD) bright spot associated with the holographic image according to an example embodiment of the invention.

Reference is now made to FIG. 14E, which is a simplified line drawing illustration of a system for displaying a holographic image and reducing an intensity of a Zero Order Diffraction (ZOD) bright spot associated with the holographic image according to an example embodiment of the invention.

FIG. 14E shows a display which includes apodizing coherent illumination and/or apodizing modulated light from an SLM which are used for producing the holographic image.

FIG. 14E shows a coherent light source 1442, a semi-transparent/semi reflecting mirror 1444 (or a beam splitter 1444), an apodizing filter 1441, a focusing optical element such as a lens 1455, and a SLM 1446.

Light 1443 from the coherent light source 1442 impinges upon the beam splitter 1444, changing direction and emerging as light 1445. The light 1445 passes through the apodizing filter 1441, impinges upon the SLM 1446, and continues as modulated light 1447, again passing through the apodizing filter 1441 and the semi-transparent/semi reflecting mirror 1444, and the lens 1455. The modulated light 1447 travels along an optic axis 1449, forming a holographic image 1448.

Figure 14F:
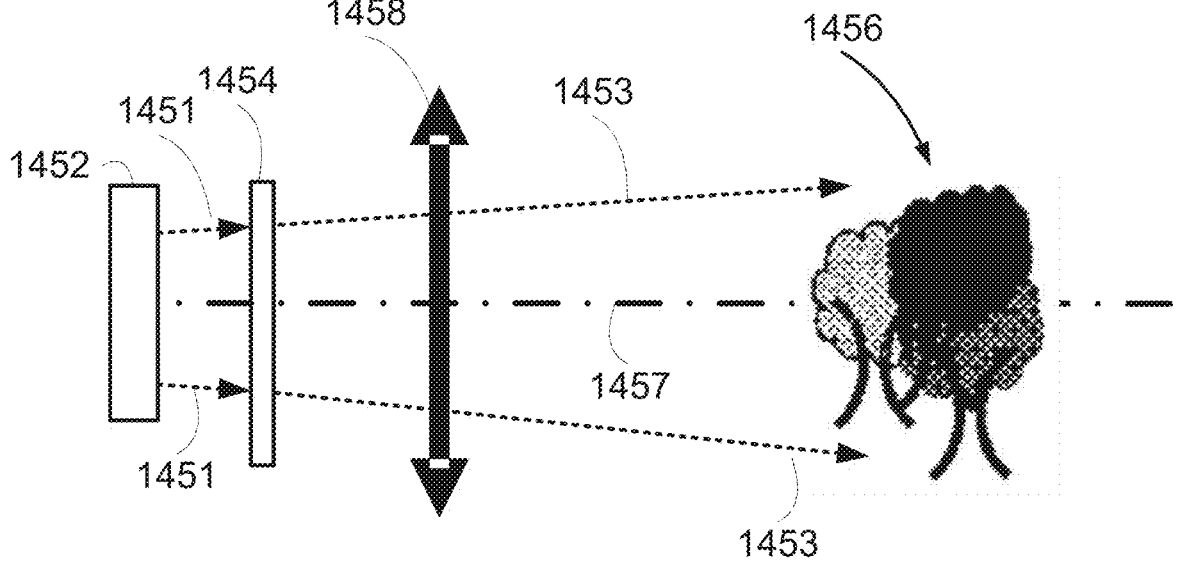
FIG. 14F is a simplified line drawing illustration of a system for displaying a holographic image and reducing an intensity of a Zero Order Diffraction (ZOD) bright spot associated with the holographic image according to an example embodiment of the invention.

Reference is now made to FIG. 14F, which is a simplified line drawing illustration of a system for displaying a holographic image and reducing an intensity of a Zero Order Diffraction (ZOD) bright spot associated with the holographic image according to an example embodiment of the invention.

FIG. 14F shows a display which includes apodizing already modulated light which is used for producing the holographic image.

FIG. 14F shows a SLM 1452, an apodizing filter 1454 and a focusing optical element such as a lens 1458.

Modulated light 1451 from the SLM 1452, passes through the apodizing filter 1454, emerging a modulated apodized light 1453, passes through the lens 1458, and travels along an optic axis 1457, forming a holographic image 1456.

FIG. 14F does not show a source for coherent illumination. FIG. 14F is appropriate for illustrating both a SLM 1452 which is a transmissive SLM, and a SLM 1452 which is a reflective SLM.

Diverging the ZOD Bright Spot Away from the Holographic Image

Figure 15A:
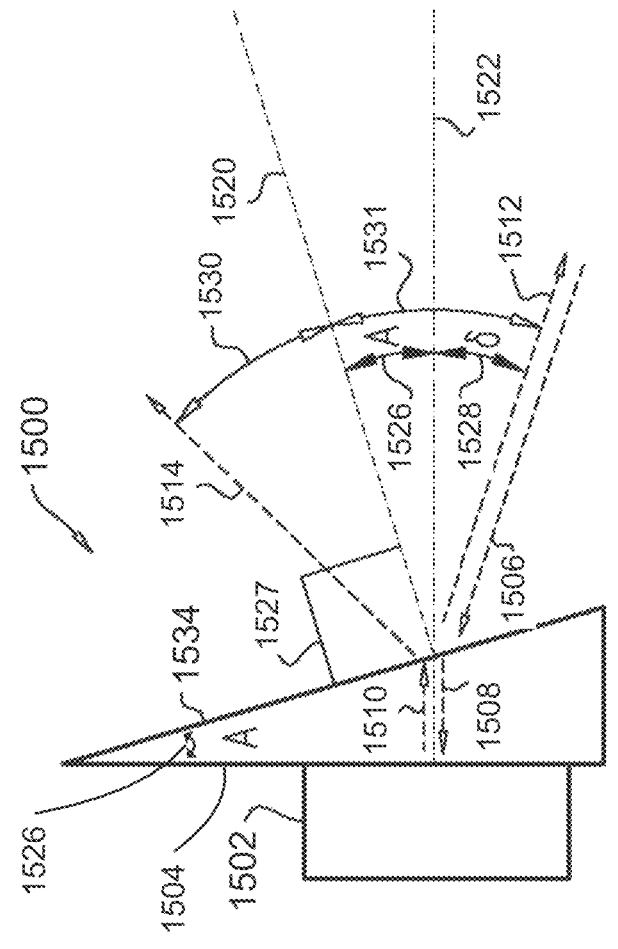
FIG. 15A is a simplified line drawing illustration of a wedge placed next to an SLM according to an example embodiment of the invention.

Reference is now made to FIG. 15A, which is a simplified line drawing illustration of a wedge placed next to an SLM according to an example embodiment of the invention.

FIG. 15A shows a SLM 1502 and a wedge 1504. The wedge 1504 is placed adjacent to the SLM 1502. As described above, an index matching fluid or other index matching material may optionally also be placed between the SLM 1502 and the wedge 1504.

In is noted that where the term wedge is used in the present specification and claims, a prism may also be understood as an example embodiment of a wedge.

Light 1506 impinging upon the wedge 1504 changes direction when entering the wedge 1504 and continues inside the wedge 1504 as light 1508. The change in direction depends upon an index of diffraction on an outside of the wedge 1504, where the light 1506 travels, and on an index of diffraction on an inside of the wedge 1504 where the light 1508 travels. In a typical embodiment the outside of the wedge 1504 is air, and the index of diffraction of air is substantially 1.

Light 1506 impinging upon the wedge 1504 is also reflected from a face 1534 of the wedge 1504 as light 1514. The light 1514 reflects off the wedge 1504 face 1534 at an angle 1530 from a direction 1520 normal to the face 1534 of the wedge 1504. The angle 1530 of the reflected light 1514 from the direction 1520 normal to the face 1534 of the wedge 1504 is equal to an angle 1531 of the light 1506 to the direction 1520 normal to the face 1534 of the wedge 1504.

The light 1508 illuminates the SLM 1502, and reflects as modulated light 1510, which exits the wedge 1504 as light 1512, at a same angle and opposite direction as the light 1506 entered the wedge 1504.

In some embodiments a front surface or cover of an SLM is optionally made wedge or prism like, so that light that is reflected from the front face 1534 of the wedge 1504 is reflected at an angle larger than a diffraction angle of light reflected from the SLM.

For a square-pixel SLM, a diffraction angle for the modulated light 1510 relative to a normal to the face of the SLM 1502 is typically up to a wavelength of the light divided by twice a pixel length. For an example of visible light, with a wavelength of half a micron, for example, and an example pixel length of 8 microns, the above-mentioned diffraction angle is: $\theta diff \cong \frac{1}{32}$ radians. A tilt angle $\delta$ 1528 generated by the wedge angle is $\cong A(n-1)$, where A 1526 is the wedge angle and n is the wedge 1504 refractive index. As shown in FIG. 15A, a reflection 1514 from a front face 1534 of the wedge 1504 is at a same angle as an angle of incident light 1506 with respect to the direction 1520 of the wedge 1504 face 1534 normal.

In some embodiments, the light 1508 reaches the SLM 1502 at an approximately normal incident angle, as shown in FIG. 15A, so the wedge head angle A 1526 is equal to the wedge normal angle with respect to the direction of the SLM normal. In some embodiments, the angle of the reflected light 1514 exceeds the diffraction angle, that is: $2(\delta+A)$ $\geq \theta diff$. in embodiments where this constraint is optionally maintained, the head angle is: $A \geq \theta diff/(2n)$, which, when using glass (typical refractive index of approximately nglass$\cong$1.5) in air (typical refractive index of approximately $n_{air}=1$), is typically $A \geq \frac{1}{3}$ *$\theta diff = \frac{1}{96}$ radians.

In some embodiments, the reflected angle 1530 of the reflected light 1514 is larger than the angle 1531 of the diffraction light 1512.

In some embodiments, the wedge 1504 surface 1534 is implemented as a blazed surface, producing an optically effective wedge less thick than the wedge 1504.

In some embodiments the wedge 1504 is replace with a blazed grating. In such embodiments the modulated light 1512 shifts away from the reflected light 1514 which can produce a zero order diffraction bright spot, as well as first order diffraction and other orders of diffraction.

Figure 15B:
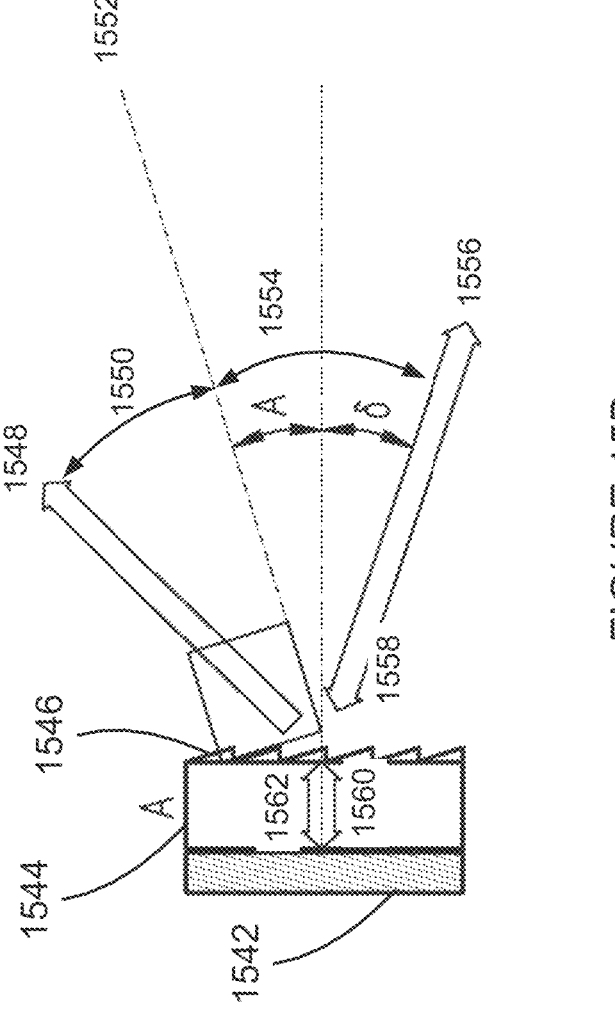
FIG. 15B is a simplified line drawing illustration of a blazed grating placed next to an SLM according to an example embodiment of the invention.

Reference is now made to FIG. 15B, which is a simplified line drawing illustration of a blazed grating placed next to an SLM according to an example embodiment of the invention.

FIG. 15B shows a SLM 1542 and a blazed grating 1544. The blazed grating 1544 is placed right next to the SLM 1542. As described above, an index matching fluid may optionally also be placed between the SLM 1542 and the blazed grating 1544.

Light 1558 impinging upon the blazed grating 1544 changes direction when entering the blazed grating 1544 and continues inside the blazed grating 1544 as light 1560. The change in direction depends upon an index of diffraction on an outside of the blazed grating 1544, where the light 1558 travels, and on an index of diffraction on an inside of the blazed grating 1544 where the light 1560 travels. In a typical embodiment the outside of the blazed grating 1544 is air, and the index of diffraction of air is substantially 1.

Light 1558 impinging upon the blazed grating 1544 is also reflected from angled surfaces 1546 of a face of the blazed grating 1544 as light 1548. The light 1548 reflects off the angled surfaces 1546 of the blazed grating 1544 at an angle 1550 from a direction 1552 normal to the angled surfaces 1546 of the blazed grating 1544. The angle 1550 of the reflected light 1548 from the direction 1552 normal to the angled surfaces 1546 of the blazed grating 1544 is equal to an angle 1554 of the light 1558 to the direction 1552 normal to the angled surfaces 1546 of the blazed grating 1544.

The light 1560 illuminates the SLM 1542, and reflects as modulated light 1562, which exits the blazed grating 1544 as light 1556, at a same angle and opposite direction as the light 1558 entered the blazed grating 1544.

In some embodiments an SLM includes several layers of different materials, with different refractive indexes, on a face of the SLM. The layers may include, for example: a face of the SLM; a transparent electrode, optionally made of Indium tin oxide (ITO); a Liquid Crystal (LC); a layer on a back face of the SLM; and a stack of such layers. Each interface between different refractive indexes may reflect light into the ZOD bright spot.

In some embodiments, in order to diverge these ZOD reflections, each layer is optionally designed in a wedge configuration.

Figure 16A:
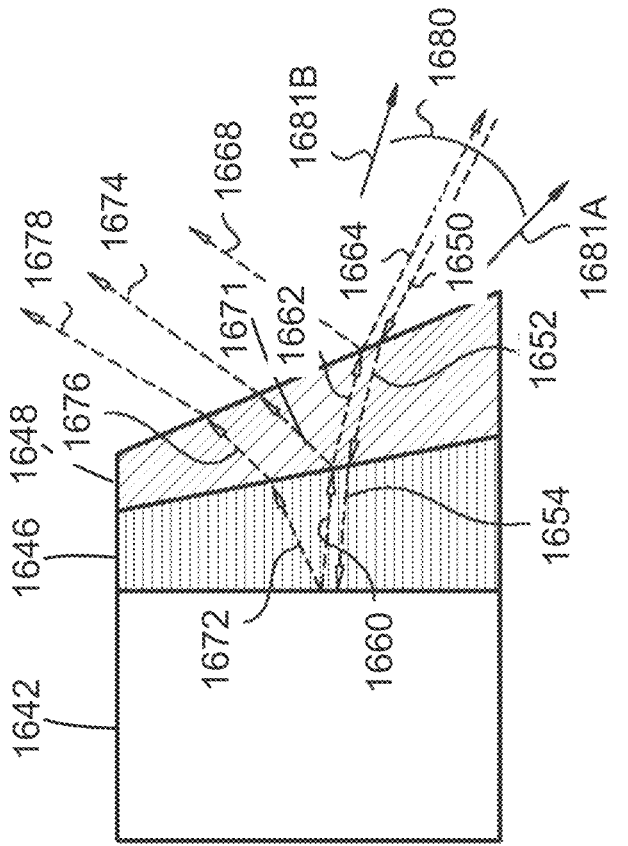
FIG. 16A is a simplified line drawing illustration of a stack of wedge shaped layers placed next to an SLM according to an example embodiment of the invention.

Reference is now made to FIG. 16A, which is a simplified line drawing illustration of a stack of wedge shaped layers placed next to an SLM according to an example embodiment of the invention.

FIG. 16A shows a SLM 1642 and a stack of two wedge shaped layers 1646 1648. The wedge shaped layers 1646 1648 are placed right next to the SLM 1642. As described above, an index matching fluid may optionally also be placed between the SLM 1642 and the wedge shaped layers 1646 1648 and/or between the wedge shaped layers 1646 1648.

FIG. 16A shows a stack of two wedge shaped layers 1646 1648. However, various embodiments are contemplated, including a stack of wedge shaped layers in any number ranging from 2 to 3, to 4, to 5, to 6, to 7, and so on up to tens and hundreds of layers. Furthermore, various embodiments are contemplated, where some of the layers are not necessarily wedge shaped, and wedge shaped layers may be stacked over, under, or interspersed with layers which are not wedge shaped.

Light 1650 impinging upon the first layer 1648 changes direction when entering the first layer 1648 and continues inside the first layer 1648 as light 1652.

The light 1652 impinges upon the second layer 1646, changes direction when entering the second layer 1646 and continues inside the second layer 1646 as light 1654.

The light 1654 impinges upon the SLM 1642, and is partly reflected by the SLM 1642 as reflected light 1672, and partly modulated by the SLM 1642, producing modulated light 1660.

The modulated light 1660 exits the second layer 1646 as modulated light 1662, at a same angle and opposite direction as the light 1652 which entered the second layer 1646. The modulated light 1662 exits the first layer 1648 as modulated light 1664, at a same angle and opposite direction as the light 1650 which entered the first layer 1648.

The various references to light are drawn as one example ray of light 1664, however, the various light 'rays' are actually broader than the example drawing of a ray or arrow, they are actually sheaves of light. For example the modulated light 1664 for producing a holographic image (not shown) is a cone of light 1680, between directions 1681A and 1681B.

Light 1650 impinging upon the first layer 1648 is also reflected from an angled surface of a face of the first layer

1648 as light 1668. Light 1652 impinging upon the second layer 1646 is also potentially reflected from an angled interface surface of a face of the second layer 1646 as light 1671.

In some embodiments one or more of the layers are optionally produced with a deflection angle of the reflected light 1671, that is larger than a diffraction angle in the material 1662. The diffraction angle in the material is a maximal diffraction angle in air divided by the refractive index, $n_{layer}$ at each layer.

The diffraction angle in the material is a maximal diffraction angle in air divided by the refractive index, $n_{layer}$ at each layer.

In some embodiments a head angle A in wedge shaped layers is optionally produced to be: $A_{layer} \geq \theta_{diff}/(2n_{layer})$ where $\theta_{diff}$ is an angle of diffraction in the layer, and $n_{layer}$ is a diffraction coefficient of the layer.

FIG. 16A shows a non-limiting example of a multi-layer structure where every layer 1646 1648 other than the SLM 1642 has a wedge or prism shape.

In some embodiments, the SLM 1642 is optionally also constructed as a wedge shape.

In some embodiments, each row or each column of cells, or pixels, of the SLM 1642 is optionally constructed as a wedge shape.

In some embodiments, each cell, or pixel, of the SLM 1642 is optionally constructed as a wedge shape.

In some embodiments, each liquid crystal (LC) cell, or pixel, of the SLM 1642 is optionally constructed as a wedge shape.

In some embodiments, each row of LC cells, or pixel, of the SLM 1642 is optionally constructed as a wedge shape.

In some embodiments a varying optical path of light within the wedge shaped SLM is optionally compensated for.

In some embodiments, such compensation is optionally done electronically, by way of a non-limiting example by thinner areas in the SLM having different voltages across the thinner areas than across thicker areas, to induce a similar phase shift as the thicker areas of the SLM.

In some embodiments, such compensation is optionally done electronically, by way of a non-limiting example by thinner areas in the SLM having different electric potentials across the thinner areas than across thicker areas, to induce a similar phase shift as the thicker areas of the SLM.

In some embodiments the compensation is optionally generated by a combination of electrodes with varying potential that are placed along the wedge, replacing a conventional common ground electrode.

In some embodiments, compensating the optical path difference along the wedge is performed by varying a voltage at each pixel of the SLM according to its thickness, typically determined by the pixel location on the wedge.

In some embodiments compensation for differences optical path length in the wedge structure is performed by optionally varying boundary conditions in the SLM. By way of a non-limiting example, the varying of the boundary conditions may be performed by optionally varying a local voltage on the SLM, optionally controlling orientation of liquid crystal (LC) molecules in the SLM.

Reference is now made to FIG. 16B, which is a simplified flow chart illustration of a method for directing light reflected from a Spatial Light Modulator (SLM) away from a direction of projecting a holographic image generated by the SLM according to an example embodiment of the invention.

The method of FIG. 16B includes:

placing a transparent component next to the SLM, with a first side of the transparent component facing the SLM and a second side at an angle to a plane of the SLM (1682);

illuminating the SLM with coherent light, through the transparent component, thereby producing reflected modulated light (1684); and projecting the reflected modulated light along an optical axis and focusing the reflected modulated light along the optical axis, producing a holographic image (1686); wherein reflections from the second side of the transparent component are reflected at an angle to the optical axis (1688).

In some embodiments the reflection angle is controlled, by an optical design, to be larger than the diffraction angle θdiff mentioned above.

Displaying a Wide Field of View Hybrid Holographic Display

Figure 17A:
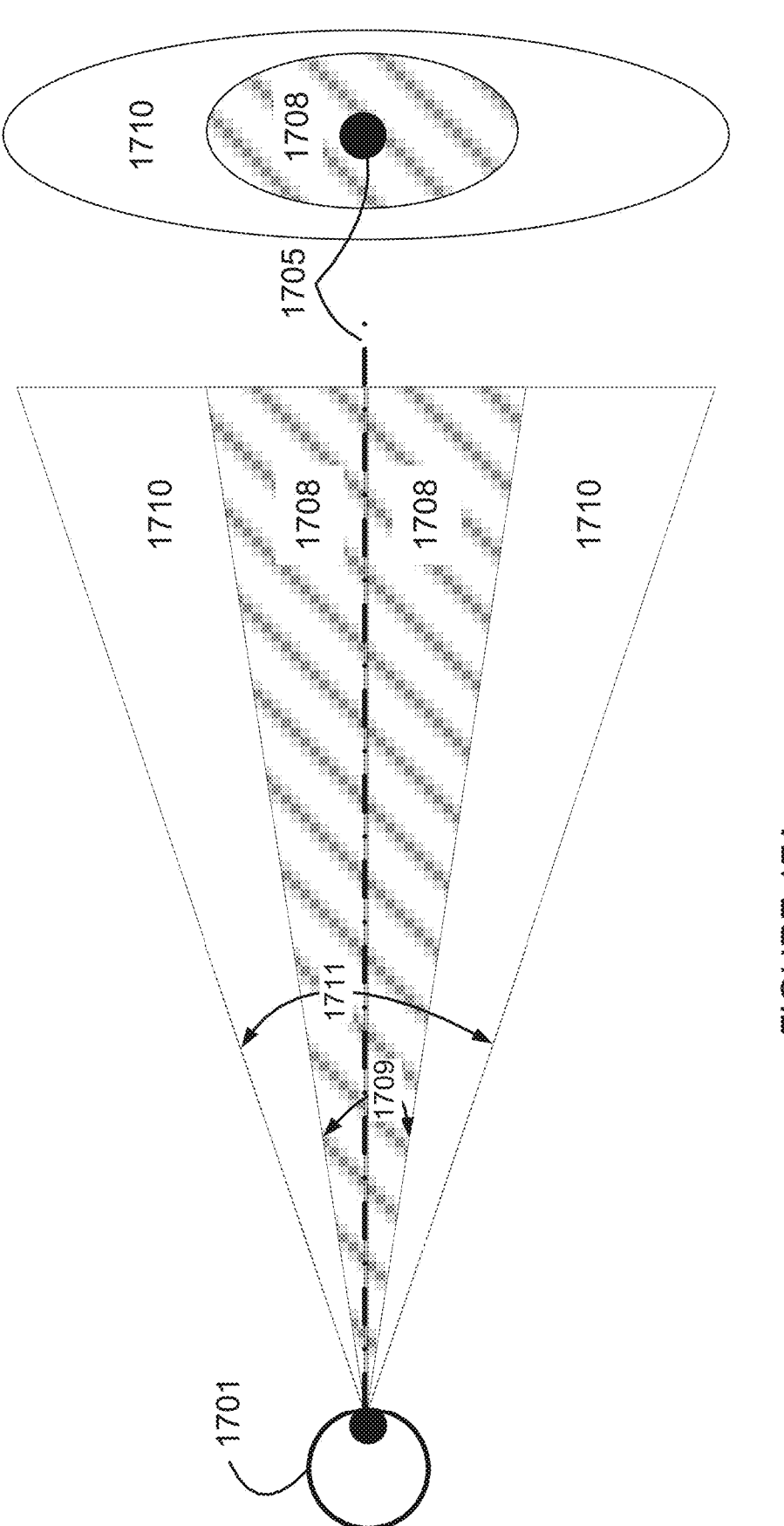
FIG. 17A is a simplified illustration of a various portions of a Field of View (FoV) of an eye relative to a center of the FoV, according to an example embodiment of the invention.

Reference is now made to FIG. 17A, which is a simplified illustration of a various portions of a Field of View of an eye relative to a center of the FoV, according to an example embodiment of the invention.

FIG. 17A shows an eye 1701 with a direction of a center 1705 of its FoV marked.

FIG. 17A depicts a first, inner section 1708 of the FoV subtending a first angle 1709 around the direction of the center 1705 of the FoV, and a second, larger section of the FoV 1710 subtending a second, larger angle, section 1711 around the direction of the center 1705 of the FoV.

In some embodiments the first, inner section 1708 of the FoV optionally subtends an angle of approximately 10 degrees from the FoV center 1705, which approximately corresponds to the FoV of a human viewer's fovea. In some embodiment the first, inner section 1708 of the FoV optionally subtends an angle of approximately 1 degree, 2 degrees, 3 degrees, 5 degrees, 7 degrees, 9 degrees, 11 degrees, 13 degrees, 15 degrees, 17 degrees, 19 degrees, 21 degrees, 23 degrees, 25 degrees, 27 degrees, 29 degrees, 31 degrees and 33 degrees from the FoV center 1705.

In some embodiments the second section 1711 of the FoV optionally subtends an angle of approximately 60 to 110 degrees across, from side to side.

In some embodiments a central area of an image which is to display a CGH image is implemented as a circular area and/or as an oval area, optionally covering the area of the fovea or larger, while in some embodiments the central area of an image which is to display a CGH image is implemented as a square or a rectangular area, optionally covering the area of the fovea or larger.

In some embodiments a surrounding area of an image which is to display a lower resolution and/or a non-holographic image is implemented as a circular area and/or as an oval area surrounding the central area, while in some embodiments the surrounding area of the image which is to display the lower resolution and/or non-holographic image is implemented as a square or a rectangular area.

Figure 17B:
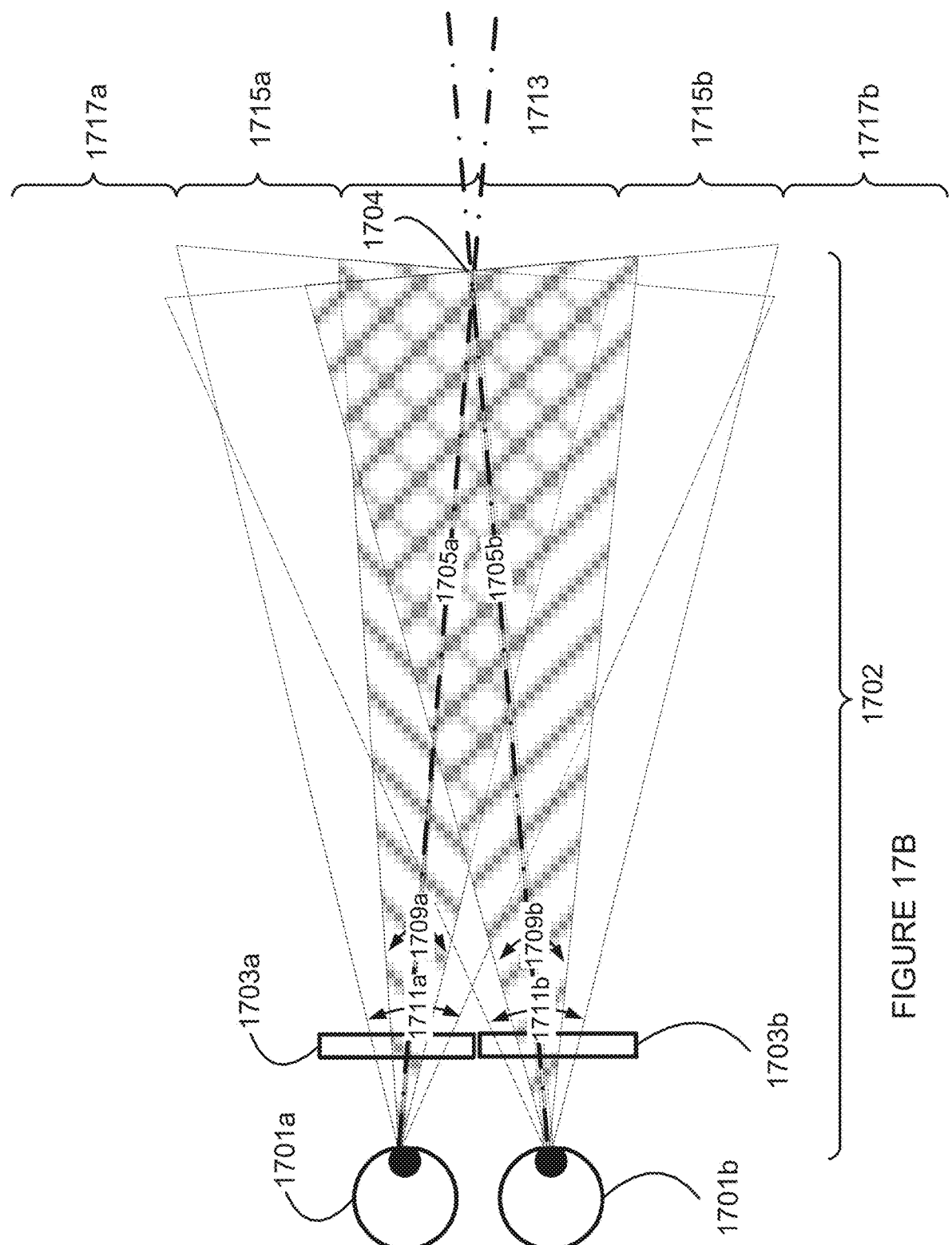
FIG. 17B is a simplified illustration of two eyes viewing a display, and various portions of their FoV relative to centers of their FoV, according to an example embodiment of the invention.

Reference is now made to FIG. 17B, which is a simplified illustration of two eyes 1701a 1701b viewing a display 1703a 1703b, and various portions of their FoV relative to centers 1705a 1705b of their FoV, according to an example embodiment of the invention.

FIG. 17B shows two eyes 1701a 1701b, each with a direction of a center 1705a 1705b of its FoV marked. FIG. 17B shows a non-limiting example embodiment where the two eyes' direction of the center 1705a 1705b of their FoV converge at a point 1704 at a distance 1702 from the eyes 1701a 1701b.

FIG. 17B depicts first, inner sections of the FoV depicted in FIG. 17A, subtending first angles 1709a 1709b around the direction of the centers 1705a 1705b of the FoV, and second, larger sections of the FoV subtending second, larger angles 1711a 1711b around the directions of the centers 1705a 1705b of the FoVs of the eyes 1701a 1701b.

FIG. 17B also shows displays 1703a 1703b in front of the eyes 1701a 1701b, which are designed to display an image or images to the eyes 1701a 1701b.

FIG. 17B illustrates various non-limiting example regions of a viewer's FoV: a first region 1713 where both eyes 1701a 1701b see with the first inner sections of the FoV; second regions 1715a 1715b, where both eyes 1701a 1701b see with the second outer sections of the FoV; and third regions 1717a 1717b, where only one eye sees with the second outer section of the FoV and the other does not see.

In some embodiments the field of view of the two eyes 1701a 1701b viewing the first region 1713 optionally subtends an angle of approximately 10 degrees side to side. In some embodiments the first region 1713 optionally subtends an angle of approximately 2-66 degrees side to side.

In some embodiments a total field of view of the two eyes 1701a 1701b viewing the first, second and third regions 1713 1715a 1715b 1717a 1717b optionally extends an angle of approximately 150-200 degrees across, from side to side.

In some embodiments the three regions 1713 1715(a,b) 1717(a,b) exactly border each other, as shown in FIG. 17B, when the first inner sections of the FoV of both eyes exactly overlap and have a common outer border. When the first inner sections of the FoV of both eyes do not exactly overlap additional regions can be defined. A person skilled in the art, having studied the present document, will understand the additional regions and options for display to the regions. In some embodiments the three regions 1713 1715(a,b) 1717 (a,b) do not exactly border each other and additional regions (not shown) can be defined.

In some embodiments the regions 1713 1715a 1715b 1717a 1717b of FIG. 17B correspond to regions suitable for displaying:

at the first region 1713 a portion of a scene with optionally all depth cues, such as, for example, a holographic image;

at the second region 1715a 1715b a portion of an scene with less depth cues, such as, by way of a non-limiting example, a stereoscopic image, or a lower-resolution holographic image; and at the third region 1717a 1717b a portion of a scene with even less depth cues or resolution, such as, by way of a non-limiting example a monoscopic image.

It is noted that FIG. 17B shows example FoV regions and display schemes for corresponding scene portions, however, similar FoV regions and display schemes for corresponding scene portions may be implemented to a display for a single eye.

Reference is now made again to FIG. 17A. In some embodiments the regions 1708 1710 of FIG. 17A correspond to regions suitable for displaying:

at the first region 1708 a portion of a scene with optionally all depth cues, such as, for example, a holographic image; and at the second region 1710 a portion of a scene with less depth cues, such as, by way of a non-limiting example, a stereoscopic image, or a lower-resolution holographic image.

In some embodiments, a third region (not shown in FIG. 17A) lying around the second region 1710 a portion of a scene with even less depth cues or resolution, such as, by way of a non-limiting example a monoscopic image, is displayed.

The following terms are hereby defined for use in the present application and claims:

a central portion of a Field of View of an eye;

an in-side of a more-peripheral portion of a Field of View of an eye, where in-side refers to a nasal direction, or an inner side, between two eyes of a viewer; and an out-side of a more-peripheral portion of a Field of View of an eye, where out-side refers to a temporal direction, opposite the nasal direction, or an outer side opposite a mid-point between the eyes.

Figure 17C:
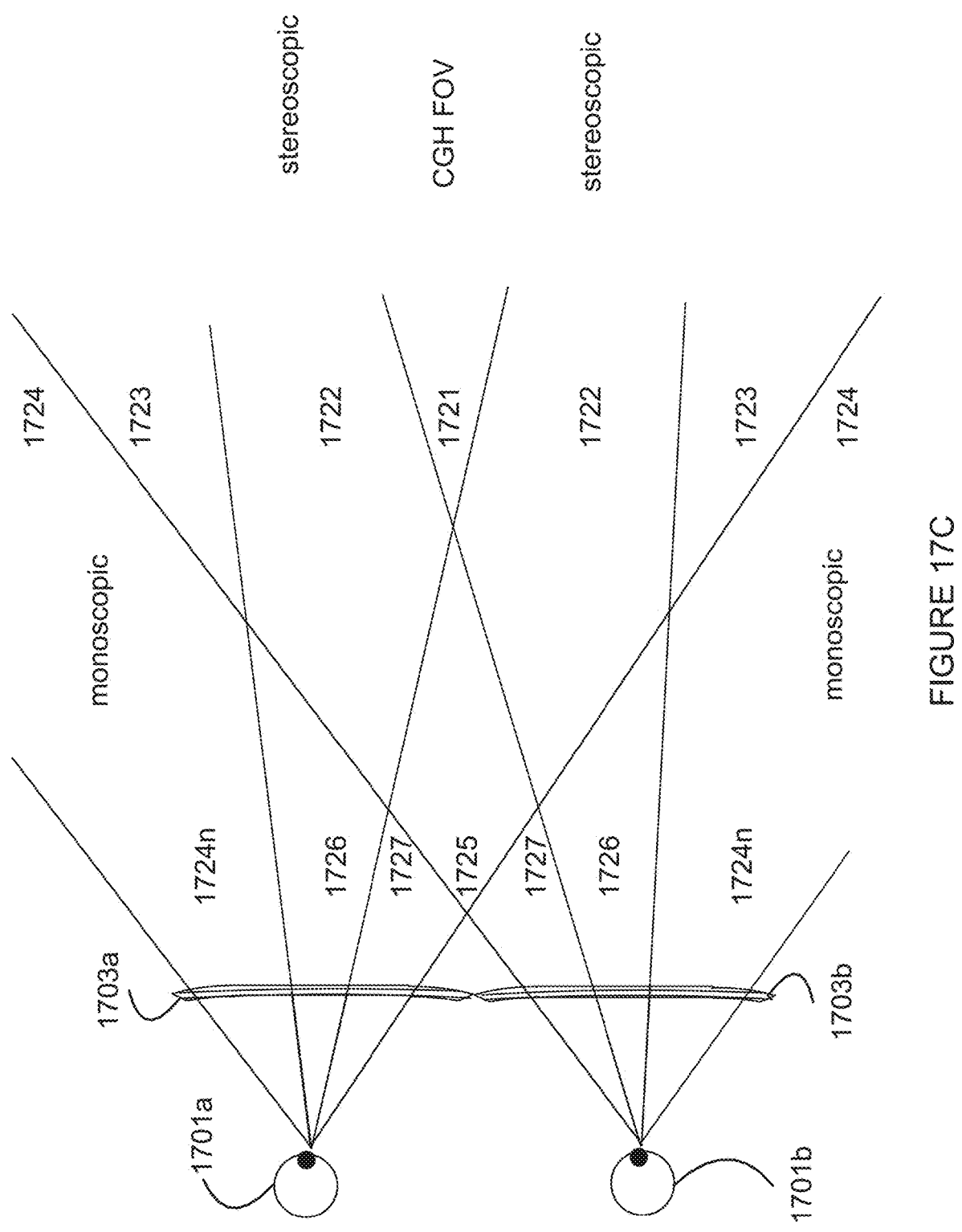
FIG. 17C is a simplified illustration of two eyes viewing a display, and various portions of their FoV according to an example embodiment of the invention.

Reference is now made to FIG. 17C, which is a simplified illustration of two eyes 1701a 1701b viewing a display 1703a 1703b, and various portions of their FoV according to an example embodiment of the invention.

FIG. 17C depicts:

a first region 1721 where a central portion of the FoV of both of the eyes 1701a 1701b overlaps;

a second region 1722 where a central portion of the FoV of a first one of the eyes 1701a 1701b overlaps an in-side more-peripheral portion of the FoV of a second one of the eyes 1701a 1701b;

a third region 1723 where an out-side more-peripheral portion of the FoV of a first one of the eyes 1701a 1701b overlaps an in-side more-peripheral portion of the FoV of a second one of the eyes 1701a 1701b; and a fourth region 1724 where an out-side more-peripheral portion of the FoV of a first one of the eyes 1701a 1701b does see, but the FoV of a second one of the eyes 1701a 1701b does not see.

The first region 1721, the second region 1722, the third region 1723 and the fourth region 1724 are depicted at a typical distance from the eyes 1701a 1701b and the displays 1703a 1703b where a scene is displayed.

FIG. 17C also depicts various portions of Fields of View of the eyes 1701a 1701b at a closer distance than the typical distance from the eyes 1701a 1701b and the displays 1703a 1703b than the first region 1721, the second region 1722, the third region 1723 and the fourth region 1724.

The closer portions of the FoV include, by way of some none-limiting examples:

a fifth region 1725 where an in-side more-peripheral portion of the FoV of a first one of the eyes 1701a 1701b overlaps an in-side more-peripheral portion of the FoV of a second one of the eyes 1701a 1701b;

a sixth region 1726 where a central portion of the FoV of a first one of the eyes 1701a 1701b does see, but the FoV of a second one of the eyes 1701a 1701b does not see;

a seventh region 1727 where an in-side more-peripheral portion of the FoV of a first one of the eyes 1701a 1701b does see, but the FoV of a second one of the eyes 1701a 1701b does not see; and an eighth region 1724n where an out-side more-peripheral portion of the FoV of a first one of the eyes 1701a 1701b does see, but the FoV of a second one of the eyes 1701a 1701b does not see.

In some embodiments:

the first region 1721 displays a CGH image;

the second region 1722 displays a scene using a stereoscopic image, that is, an slightly shifted image of the scene displayed to each eye; and the third region 1723 and the fourth region 1724 displays a scene using a monoscopic image.

In some embodiments the field of view of the two eyes 1701a 1701b viewing the first region 1721 optionally subtends an angle of approximately 25 degrees side to side. In some embodiments the first region 1721 optionally subtends an angle of approximately 2-66 degrees side to side.

In some embodiments a total field of view of the two eyes 1701a 1701b viewing the first, second, third and fourth regions 1721 1722 1723 1724 optionally extends an angle of approximately 150, 180, 200 and even 220 degrees and more across, from side to side.

Figure 18:
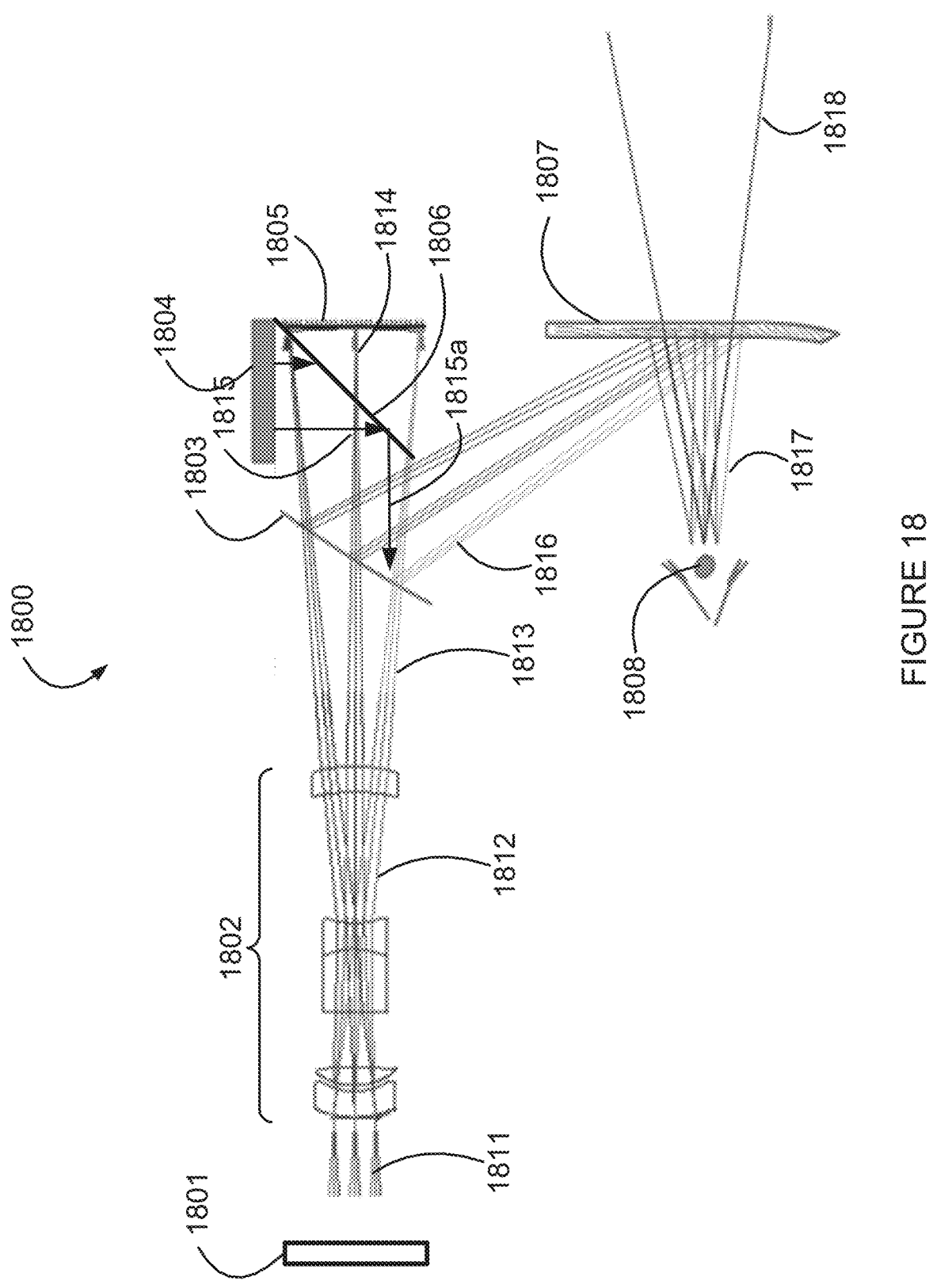
FIG. 18 is a simplified example of a display system for displaying a scene combining a central portion of the scene near a center of a FoV displayed as a holographic image from a holographic image display, surrounded by an additional portion of the scene displayed as an additional image from an additional display, according to an example embodiment of the invention.

Reference is now made to FIG. 18, which is a simplified example of a display system 1800 for displaying a scene combining a central portion of the scene near a center of a FoV displayed as a holographic image from a holographic image display, surrounded by an additional portion of the scene displayed as an additional image from an additional display, according to an example embodiment of the invention.

FIG. 18 shows one example embodiment for implementing the concept of a scene including a central holographic image surrounded by one or more additional images.

FIG. 18 shows components of the example embodiment: a Spatial Light Modulator (SLM) 1801; optional optical components 1802; a first semi-transparent mirror 1803; an image display 1804; a mirror 1805; a second semi-transparent mirror 1806; and a third semi-transparent mirror 1807.

An example light path through the display system 1800 is now described:

The SLM 1801 projects light 1811 (in some embodiments reflected light, in some embodiments light transferred through the SLM 1801) modulated to produce a holographic image. The light 1811 from the SLM may be at a single wavelength, that is one color, or more wavelengths, by way of a non-limiting example three colors. An example of producing a holographic image using three colors is described in above-mentioned U.S. Provisional Patent Application No. 62/298,070.

The light 1811 optionally passes through the optional optical components 1802, as light 1812, emerging as light 1813 for producing a holographic image.

The light 1813 passes through the first semi-transparent mirror 1803 and through the second semi-transparent mirror 1806, emerging as light 1814 for producing a holographic image.

The light 1814 for producing a holographic image is reflected back from the mirror 1805, through the second semi-transparent mirror 1806 and onto the first semi-transparent mirror 1803.

Additional light 1815 from the image display 1804 is projected toward the second semi-transparent mirror 1806, and is reflected 1815a from the second semi-transparent mirror 1806 onto the first semi-transparent mirror 1803. The additional light 1815a from the image display 1804 and the light 1814 for producing a holographic image are now traveling toward a same direction and through the same optical components.

Light 1816, which is a combination of the additional light 1815a from the image display 1804 and the light 1814, is reflected from the first semi-transparent mirror 1803 toward the third semi-transparent mirror 1807. The light is then reflected from the third semi-transparent mirror 1807 as light 1817 to the viewer's eye 1808. The viewer's eye 1808 sees a scene which is a combination of a CGH image produced by the SLM and an additional image produced by the image display 1804, the scene appearing to be in a direction 1818 in front of the viewer's eye 1808.

In some embodiments the viewer's eye 1808 can view a scene which is a combination of a CGH image produced by the SLM, an additional image produced by the image display 1804, and a view of the real world through the third semi-transparent mirror 1807, the scene appearing to be in a direction 1818 in front of the viewer's eye 1808.

In some embodiments, the image display 1804 projects light, for example the image display 1804 may be, by way of a non-limiting example, an LCD display with LED lights transmitting through the LCD display.

In some embodiments, illumination for the image display 1804 may be projected along and optionally through the same components as the light projected from the SLM 1811, and eventually be reflected off the second semi-transparent mirror 1806 onto the image display 1804, which reflects the light as the additional light 1815.

In some embodiments the image display 1804 reflects or projects an image only in portions of a scene in which the CGH does not appear.

In some embodiments such limiting of an image displayed by the image display 1804 is optionally done by switching off pixels which would appear at the portion of the scene where the CGH image appears.

In some embodiments the light illuminating the image display 1804 is optionally the same light source producing the CGH image, or from a light source adjacent to the light source producing the CGH image, which may also optionally additionally pass through a diffuser, to reduce potential speckles due to interference if coherent light was used without a diffuser.

In some embodiments the first semi-transparent mirror 1803 is a semi-transparent mirror.

In some embodiments the third semi-transparent mirror 1807 is a volume holographic optical element, optionally at a wavelength specific to the one or two or three or more illumination wavelength(s) used for displaying the scene.

In some embodiments the field of view of the eye 1808 for viewing the CGH image optionally subtends an angle of approximately 25 degrees side to side. In some embodiments the field of view of the eye 1808 for viewing the CGH image optionally subtends an angle of approximately 2-66 degrees side to side.

In some embodiments a total field of view of the eye 1808 optionally extends an angle of approximately 90 to 150 degrees and more across, from side to side.

It is noted that while the above description of FIG. 18 was provided with reference to the viewer's left eye, a similar and mirror image applies to the viewer's right eye, and a display for the right eye FoV regions is also taught, as can easily be understood by a person of ordinary skill in the art.

In some embodiments a total field of view of two eyes combined optionally subtends an angle of approximately 90 to 220 degrees and more across, from side to side.

In some embodiments the image display 1804 of FIG. 18 is placed on sides, optionally horizontal sides, or both horizontal and vertical sides, of the SLM 1801, and the light from the image display 1804 proceeds through the same optical path as the light from the SLM 1801.

In some embodiments the image display 1804 of FIG. 18 is placed on sides, optionally horizontal sides, or both horizontal and vertical sides, of the CGH display rays to form FoV separation as depicted in FIG. 1C.

FIG. 18 has described above, and FIG. 5 will describe below, some non-limiting examples of how to combine a holographic image and a non-holographic image.

Figure 19:
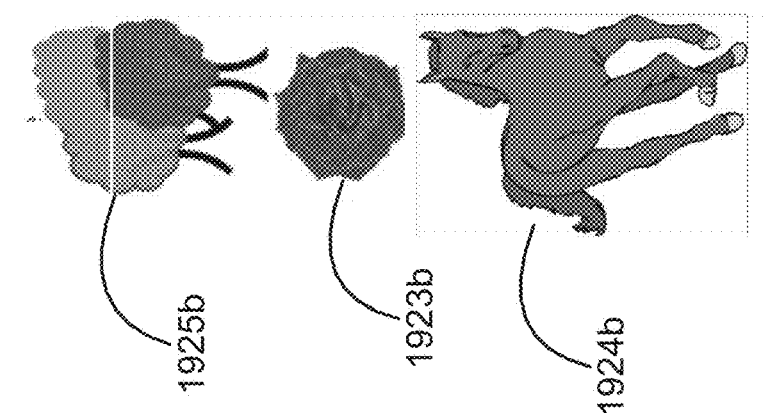
FIG. 19 is a simplified example of a display system for displaying a scene combining a central portion of the scene near a center of a FoV displayed as a holographic image from a holographic image display, surrounded by an additional portion of the scene displayed as an additional image from an additional display, according to an example embodiment of the invention.

Reference is now made to FIG. 19, which is a simplified example of a display system 1900 for displaying a scene combining a central portion of the scene near a center of a FoV displayed as a holographic image from a holographic image display, surrounded by an additional portion of the scene displayed as an additional image from an additional display, according to an example embodiment of the invention.

FIG. 19 shows an example embodiment for implementing the concept of a scene including a central holographic image surrounded by one or more additional images.

FIG. 19 shows components of the example embodiment: a coherent light illuminator 1901 (one or more wavelengths); a Spatial Light Modulator (SLM) 1902; one or more first optional optical component(s) 1903; an image display 1904a 1904b; an optional illuminator 1905; one or more second optional optical component(s) 1906; one or more third optional optical component(s) 1908; a first mirror 1909; a second semi-transparent/semi-reflective mirror 1910; and a third mirror 1911.

In some embodiments the image display(s) 1904a 1904b may be a flat display projecting images, such as, by way of a non-limiting example, a LED display or a LCOS display. In some embodiments the image display(s) 1904a 1904b may be a flat display with a hole in the middle for allowing the modulated light from the SLM 1902 to pass through. In some embodiments the image display(s) 1904a 1904b may be two or more flat displays with a space between the image display(s) 1904a 1904b for allowing the modulated light from the SLM 1902 to pass through.

In some embodiments an optional aperture stop is optionally placed in a location referenced by the reference number 1907 in the optical path.

In some embodiments optical components are designed so that an image of the SLM 1902 is produced in the location referenced by the reference number 1907 in the optical path.

An example light path through the display system 1900 is now described:

The coherent light illuminator 1901 projects coherent light 1931 (at one wavelength or at or two or three or more wavelengths at different times), which is modulated by the SLM 1902 to produce a holographic image. Modulated light 1932 from the SLM 1902 may be at a single wavelength, that is one color, or at more wavelengths at different time slots, synchronized with values of the SLM pixels. An example of producing a holographic image using three colors is described in above-mentioned U.S. Provisional Patent Application No. 62/298,070.

The modulated light 1932 optionally passes through the optional optical component(s) 1903, emerging as modulated light 1933 for producing a first holographic image 1921.

The first holographic image 1921 is optionally produced in a location along the optical path which is approximately at the location of the image display 1904a 1904b. In FIG. 19 the holographic image 1921 is a three-dimensional holographic image of a rose.

In some embodiments the image display(s) 1904a 1904b produces light travelling toward the first mirror 1909.

In some embodiments the optional illuminator 1905 optionally illuminates 1905a the image display(s) 1904a 1904b, which reflect light toward the first mirror 1909.

The modulated light from the SLM also travels toward the first mirror 1909. The combined light is marked as light 1934.

The light 1934 optionally passes through the one or more second optional optical component(s) 1906 emerging as light 1934a and through the one or more third optional optical component(s) 1908 emerging as light 1934b.

The light 1934b continues toward the first mirror 1909, and reflects as light 1935 off the first mirror 1909 toward the second semi-transparent/semi-reflective mirror 1910.

In some embodiments the light 1935 produces images approximately at the location of the second semi-transparent/semi-reflective mirror 1910. FIG. 19 shows, by way of a non-limiting example, a second holographic image of a rose 1923, reimaged by reflections 1936a 1936b from the first holographic image of the rose 1921, an additional image of a horse 1924, and an additional image of trees 1925.

The images 1923 1924 1925 reflect 1936a off the second semi-transparent/semi-reflective mirror 1910 toward the third semi-transparent/semi-reflective mirror 1911, and reflect 1936b off the third mirror 1911 toward a viewer's eye 1928.

In some embodiments the viewer's eye 1928 can view a scene which is a combination of a CGH image produced by the SLM, an additional image produced by the image display(s) 1904a 1904b, and a view of the real world through the third mirror 1911, which is optionally a semi-transparent mirror 1911, the scene appearing to be in a direction in front of the viewer's eye 1928.

In some embodiments the mirror 1911 is optionally a magnifying mirror, and the viewer optionally sees the images 1923 1924 19219 as larger and more distant images 1923b 1924b 1925b.

In some embodiments the CGH image is at different location along the optical path than display 1904a, and 1904b, which potentially shifts a focus distance of the surrounding images 1924 1925 1924 b 1925b relative to the focus distance of the CGH image 1923 1923b.

It is noted that while the above description of FIG. 19 was provided with reference to one of the viewer's eyes, a similar image applies to the viewer's other eye, and a display for the other eye FoV regions is also taught, as can easily be understood by a person of ordinary skill in the art. In some embodiments the display system 1900 of FIG. 19 is replicated for a viewer's other eye, and the viewer benefits from seeing the scene of images 1923 1924 1925 or magnified images 1923b 1924b 1925b with both eyes.

In some embodiments the third mirror 1911 is fully reflective, and the viewer sees what is termed a "virtual reality" scene.

In some embodiments the third mirror 1911 is semi-reflective/semi-transparent, and the viewer also sees, through the third mirror 1911, the real world, combined with the scene the scene of images 1923 1924 1925 or magnified images 1923b 1924b 1925b. Such a combination of the real world and a displayed image is termed "augmented reality."

In some embodiments the mirror 1911 only reflects the illuminating wavelength while it is transparent to other wavelengths.

In some embodiments the first mirror 1909 is optionally semi-transparent/semi-reflective, and optional pupil tracking components (not shown, but described in above-mentioned U.S. Provisional Patent Application No. 62/298,070) may be included behind the first mirror 1909, optionally tracking the viewer's pupil off the intervening optical components, potentially providing pupil tracking data to a computer controlling the SLM 1902 and the image display(s) 1904a 1904b, thereby optionally controlling production of the scene.

FIG. 19 shows a configuration of one side, or one eye, of a potential Head Mounted Display (HMD) where the image display(s) 1904a 1904b are adjacent to a holographic image

1921. In some embodiments the location of the holographic image 1921 may optionally also be a location of a zero-order diffraction bright spot blocker.

In some embodiments a tilting mirror, such as the mirror 1910, optionally directs an observing window to the eye 1928 even when the viewer shifts the eye 1928 to look to a different direction. The entire displayed image including the CGH and the stereoscopic FoV are tilted by the tilting mirror.

In some embodiments the mirror 1909 is optionally used to stabilize the images 1923 1924 1925 1923b 1924b 1925b against head movements.

In some embodiments the mirror 1909 is optionally used to maintain the CGH image in the FoV of the fovea even if the viewer moves his/her eyes away from a central axis direction.

In some embodiments an additional SLM tilting mirror (not shown) is optionally added to stabilize the images 1923 1924 1925 1923b 1924b 1925b against head movements. The SLM tilting mirror is optionally imaged to a pupil of the observer's eye 1928. When the SLM tilting mirror is tilted the images 1923 1924 1925 1923b 1924b 1925b shift to different parts of the eye 1928 FoV. Such tilting is optionally used to stabilize the displayed scene in the FoV, including both the holographic image and the additional, optionally stereoscopic regions of the FoV.

In some embodiments the SLM mirror is optionally used to expand a time average FoV by fast tilting and instantaneously projecting parts of the scene to increase FoV at a cost of a time-averaged intensity.

Additional Aspects

In some embodiments in order to camouflage a border between a central holographic image in a scene and a surrounding additional image, the holographic image and the surrounding image are optionally produced at similar levels of image brightness. In some embodiments, the image brightness is controlled by controlling an intensity of light illuminating the SLM and illuminating the additional image display. In some embodiments, the image brightness is controlled by illuminating both the SLM for producing the holographic image and the additional display for producing the additional image with the same coherent illumination. In some embodiments, because of the coherent illumination, interference speckles may appear which may reduce image quality of the scene.

In some embodiments, to reduce or eliminate interference speckles, an optical path length difference between the CGH image and the surrounding (optionally stereoscopic) image is produced, typically longer than a coherence length of the coherent illumination. Such an optical path length difference reduces or eliminates fringes or speckles at the boundary between the two images.

In some embodiments the optical path difference is produced by placing the image display(s) 1904a at a different location along the optical path than the location of the first holographic image 1921. The different locations are preferably different by a distance greater than a coherence distance of the coherent illumination.

In some embodiments the optical path difference is produced by separating the illumination of the image display(s) 1904a from the illumination of the SLM 1902, and causing one of the illumination paths of the coherent illumination to be different from the other by a distance greater than a coherence distance of the coherent illumination.

In some embodiments, two coherent light sources are used for illuminating the SLM and the additional display. Such embodiments also reduce or eliminate potential interference, since a coherence time of each of the coherent light sources, for example lasers, is typically at a nanosecond scale.

In some embodiments, a diffuser is placed in the optical path that smears the speckles, optionally at a frequency greater than 20 Hz which is a typical time of response of a human eye.

Figure 20:
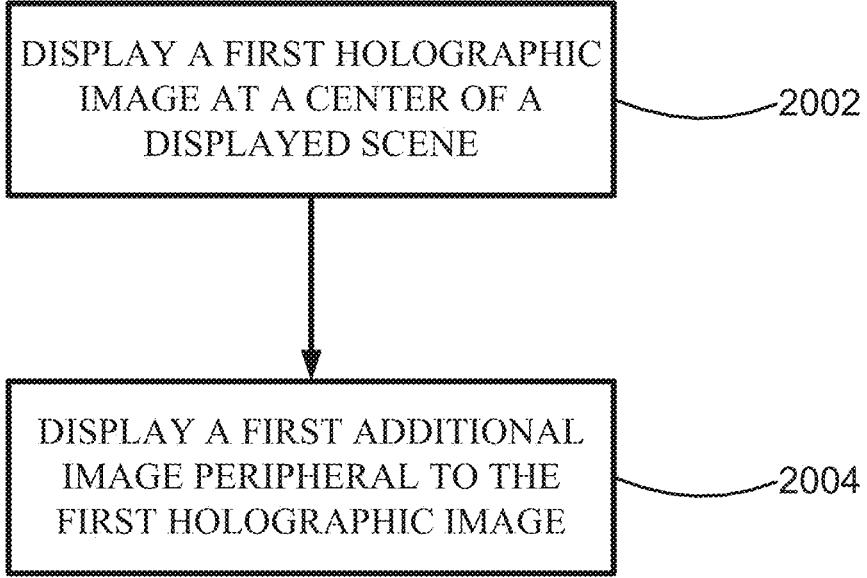
FIG. 20 is a simplified flow chart illustration of a method for displaying a wide Field of View (FoV) scene including a holographic image within the scene.

Reference is now made to FIG. 20, which is a simplified flow chart illustration of a method for displaying a wide Field of View (FoV) scene including a holographic image within the scene.

The method of FIG. 20 includes:

displaying a first holographic image at a center of a displayed scene (2002); and displaying a first additional image peripheral to the first holographic image (2004).

In some embodiments a viewer's pupil is tracked, and an optical system for displaying the first holographic image is controlled to display the first holographic image to the viewer's pupil.

In some embodiments the first additional image is a lower spatial resolution display than the first holographic image.

In some embodiments the first additional image is a stereoscopic image.

In some embodiments the first additional image is a second holographic image. The second holographic image may optionally be at a lower resolution than the first holographic image, and may optionally be displayed to an area of the viewer's eye which sees at a lower resolution, by way of some non-limiting examples away from the center of the viewer's FoV, and/or peripheral to the center of the viewer's FoV, and/or surrounding the first holographic image.

In some embodiments a second additional image is displayed, optionally adjacent to and/or peripheral and/or surrounding the first additional image.

In some embodiments the second additional image is a stereoscopic image.

In some embodiments the first holographic image and the additional image(s) are displayed by a Head Mounted Display (HMD).

In some embodiments the displaying a first holographic image and the additional image(s) includes displaying two first holographic images each one at a center of a displayed scene to each one of two eyes and displaying two additional images, or two sets of additional images to each one of the two eyes.

Figure 21:
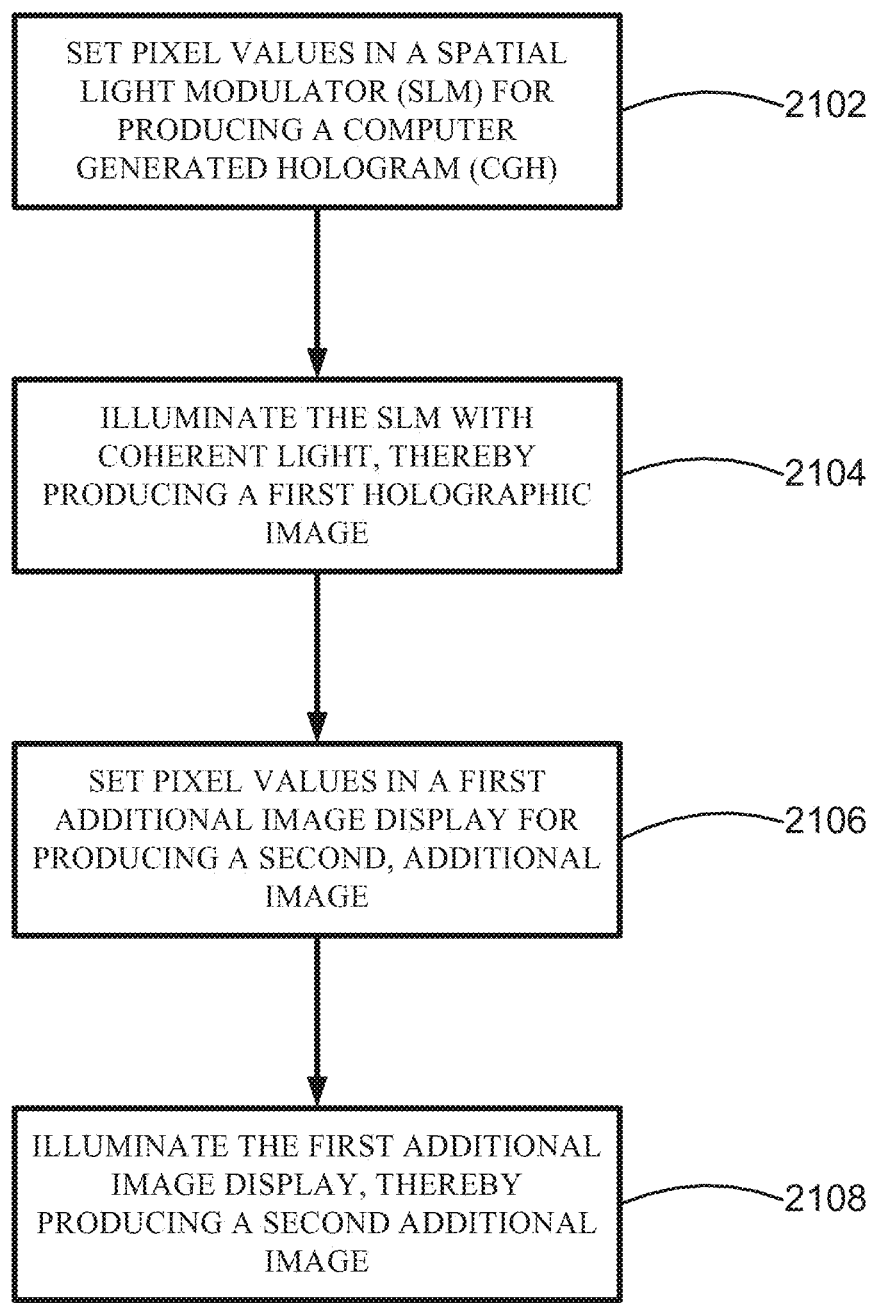
FIG. 21 is a simplified flow chart illustration of a method for displaying a wide Field of View (FoV) scene including a holographic image within the scene, according to an example embodiment of the invention.

Reference is now made to FIG. 21, which is a simplified flow chart illustration of a method for displaying a wide Field of View (FoV) scene including a holographic image within the scene, according to an example embodiment of the invention.

The method of FIG. 21 includes:

setting pixel values in a Spatial Light Modulator (SLM) for producing a Computer Generated Hologram (CGH) (2102);

illuminating the SLM with coherent light, thereby producing a first holographic image (2104);

setting pixel values in a first additional image display for producing a second, additional image (2106); and illuminating the first additional image display, thereby producing a second additional image (2108).

In some embodiments, the first holographic image is displayed at a center of a scene; and the second additional image is displayed as part of the scene and adjacent to the first holographic image.

In some embodiments, a viewer's pupil is tracked and the displaying the first holographic image is controlled to display the first holographic image to the viewer's pupil.

In some embodiments the displaying the first holographic image and the second additional image is performed by a Head Mounted Display (HMD).

In some embodiments, the displaying the first holographic image includes displaying two first holographic images, each one at a center of a displayed scene to each one of two eyes, and the displaying the second additional image includes displaying two first additional images to each one of the two eyes.

It is expected that during the life of a patent maturing from this application many relevant Spatial Light Modulators (SLMs) will be developed and the scope of the term SLM is intended to include all such new technologies a priori.

As used herein the term "about" refers to ±10%.

The terms "comprising", "including", "having" and their conjugates mean "including but not limited to".

The term "consisting of" is intended to mean "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a unit" or "at least one unit" may include a plurality of units, including combinations thereof.

The words "example" and "exemplary" are used herein to mean "serving as an example, instance or illustration". Any embodiment described as an "example or "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of displaying a Computer Generated Holographic (CGH) image by a display, comprising:

setting pixel values of a Spatial Light Modulator (SLM);

imaging said SLM at one location;

producing an interference based Fourier holographic image at a separate location from said one location, comprising reimaging a first interference based holographic image formed by projecting coherent light onto said SLM;

controlling a direction of a first direction-adjustable optical mirror at a vicinity of said separate location for directing said image of said SLM from said one location to another location at a pupil of a viewer, to enlarge an observation window from which said CGH may be viewed; and controlling a second direction-adjustable optical mirror at a vicinity of said one location to control a direction which said viewer views said interference based Fourier holographic image, wherein said image of said SLM is re-imaged at the another location at the viewer's pupil; and wherein the enlarged observation window is projected upon the viewer's pupil in synchrony with a tilt of the first direction-adjustable optical mirror, and a direction of projection controlled by the second direction-adjustable optical mirror.

2. The method of claim 1 and further comprising enabling the eye of the viewer to view a real world view in addition to the holographic image and blocking a portion of the real world view, the portion of the real world view being blocked overlapping, at least in part, at least a portion of the holographic image, wherein said blocking a portion of the real world view comprises using a liquid crystal display to block the portion of the real world view.

3. The method of claim 1 and further comprising enabling the eye of the viewer to view a real world view in addition to the holographic image and blocking a portion of the real world view, the portion of the real world view being blocked overlapping, at least in part, at least a portion of the holographic image, wherein said blocking a portion of the real world view comprises using a volumetric holographic element.

4. The method of claim 1 wherein setting pixel values of said SLM comprises setting pixel values of a plurality of SLMs.

5. The method of claim 1 and further comprising imaging said holographic image from said separate location to form a holographic virtual image and imaging said image of said SLM at said pupil of said viewer.

6. The method of claim 1 in which:

said setting pixel values of said SLM comprises setting a first set of pixel values of said SLM for producing a first portion of said holographic image;

said producing said holographic image at a separate location by projecting coherent light onto said SLM comprises projecting said first portion of said holographic image onto said separate location; and using said second direction-adjustable optical element to control a direction at which said first portion of said holographic image is viewed;

and further comprising after said producing said holographic image:

setting a second set of pixel values of said SLM for producing a second portion of said holographic image;

producing said second portion of said holographic image by projecting coherent light onto said SLM and projecting said second portion of said holographic image onto said separate location; and using said second direction-adjustable optical element to control a direction at which said second portion of said holographic image is viewed, such that said second portion of said holographic image appears adjacent to said first portion of said holographic image.

7. The method of claim 1 in which said controlling a second direction-adjustable optical mirror at said one location comprises adjusting a direction of said second direction-adjustable optical mirror to direct said holographic image from said separate location to form a holographic image in front of an eye of said viewer.

8. The method of claim 1 and further comprising:

tracking a location of a pupil of an eye of said viewer;

when a change in location of said pupil is detected, adjusting a location of said directing said image of said SLM to keep said image of said SLM at a vicinity of said viewer's pupil responsive to said change in location of said pupil by using said first direction-adjustable optical mirror.

9. The method of claim 1 in which said setting pixel values of said SLM comprised in said display and said producing a holographic image at a separate location comprises setting pixel values and producing a holographic image comprising multiple focal planes relative to said viewer's point of view.

10. The method of claim 1, wherein the Spatial Light Modulator (SLM) is comprised in a Head Mounted Display (HMD).

11. A system for displaying an interference based holographic image by a display, the system comprising:

a Spatial Light Modulator (SLM);

a coherent light source for projecting onto said SLM for producing an image of said SLM at one location and an interference based Fourier holographic image at a separate location;

an imaging component for re-imaging said image of said SLM from said one location to a viewer's pupil and re-imaging said holographic image from said separate location to form a holographic virtual image in front of an eye of said viewer, and;

a first direction adjustable optical mirror at said separate location for directing said image of said SLM to a pupil of said eye of said viewer, to enlarge an observation window from which said holographic image may be viewed;

a second direction-adjustable optical mirror at a vicinity of said one location to control a direction which said viewer views said interference based Fourier holographic image; and a controller for synchronizing projection of the enlarged observation window upon the viewer's pupil with a tilt of the first direction-adjustable optical mirror and a direction of projection controlled by the second direction-adjustable optical mirror.

12. The system of claim 11 and further comprising the system enabling the eye of the viewer to view a real world view in addition to the holographic image.

13. The system of claim 11 in which:

said producing an interference based holographic image at a separate location comprises producing a holographic real image; and said directing said holographic image from said separate location to form a holographic image in front of said eye of said viewer comprises re-imaging said holographic image and producing a holographic virtual image.

14. The system of claim 11 and further comprising a transparent liquid crystal display between a location of said holographic virtual image and said eye of said viewer, in which said liquid crystal display is configured to block light from a direction of said location of said holographic virtual image to said eye of said viewer, thereby increasing a contrast between said holographic virtual image and a background of said holographic virtual image.

15. The system of claim 11 in which:

said producing a holographic image at a separate location comprises producing said holographic image to comprise multiple focal planes; and said directing said holographic image from said separate location to form a holographic virtual image in front of said eye of said viewer comprises directing said multiple focal planes, relative to said viewer's point of view, to distances in a range from as close as 30 cm from said eye of said viewer to as far as optical infinity.

16. The system of claim 11 and further comprising a partially-reflecting mirror in front of an eye of a viewer.

17. The system of claim 11 and further comprising a volumetric holographic element between a location of said holographic virtual image and said eye of said viewer, in which said volumetric holographic element is configured to block light from a direction of said location of said holographic virtual image to said eye of said viewer, thereby increasing a contrast between said holographic virtual image and a background of said holographic virtual image.

18. The system of claim 11 wherein said SLM comprises a plurality of SLMs.

* * * * *